(12) United States Patent
Levien et al.

(10) Patent No.: US 9,794,209 B2
(45) Date of Patent: Oct. 17, 2017

(54) USER INTERFACE FOR MULTI-MODALITY COMMUNICATION

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/200,804

(22) Filed: Sep. 30, 2011

(65) Prior Publication Data

US 2013/0080961 A1    Mar. 28, 2013

Related U.S. Application Data

(63) Continuation-in-part of application No. 13/200,741, filed on Sep. 28, 2011, and a continuation-in-part of application No. 13/200,805, filed on Sep. 30, 2011.

(51) Int. Cl.
*H04M 1/00* (2006.01)
*H04L 12/58* (2006.01)
*G06Q 10/10* (2012.01)

(52) U.S. Cl.
CPC .......... *H04L 51/24* (2013.01); *G06Q 10/10* (2013.01); *H04L 51/36* (2013.01)

(58) Field of Classification Search
CPC ........ H04W 4/16; H04W 8/245; H04W 4/14; H04W 80/04; H04M 1/72519; H04M 19/04; H04M 1/6066; H04M 3/54; H04M 3/58; H04L 2012/5607; H04Q 3/66

USPC ...... 455/417, 418, 466, 550.1, 552.1, 553.1, 455/567, 569.1, 569.2; 370/310.2, 328; 379/211.01, 211.02, 212.01, 221.01
See application file for complete search history.

(56) References Cited

U.S. PATENT DOCUMENTS

| | | | |
|---|---|---|---|
| 5,280,521 A | 1/1994 | Itoh | |
| 5,710,806 A | 1/1998 | Lee | |
| 5,724,410 A | 3/1998 | Parvulescu | |
| 6,249,808 B1 | 6/2001 | Seshadri | |
| 6,259,706 B1 | 7/2001 | Shimada | |
| 6,301,338 B1 * | 10/2001 | Makela et al. | 379/88.21 |
| 6,366,651 B1 | 4/2002 | Griffith | |
| 6,504,910 B1 | 1/2003 | Engelke | |
| 6,701,162 B1 * | 3/2004 | Everett | 455/556.1 |
| 6,742,059 B1 | 5/2004 | Todd et al. | |

(Continued)

OTHER PUBLICATIONS

"Apache Wave;" Wikipedia, Sep. 24, 2011, pp. 1-6; located at: http://en.wikipedia.org/wiki/Apache_Wave.

(Continued)

*Primary Examiner* — Steve D Agosta

(57) ABSTRACT

Disclosed herein are example embodiments for multi-modality communication user interfaces. By way of example but not limitation, at least one user interface feature that is related to multi-modality communication may be provided, and manipulation of the at least one user interface feature may be detected. Described embodiments may include, but are not limited to, providing one or more communication modality options for user interaction with a communication device for a communication. By way of further example but not limitation, presentation or manipulation of example communication modality options are disclosed.

33 Claims, 50 Drawing Sheets

(56) References Cited

U.S. PATENT DOCUMENTS

| | | | |
|---|---|---|---|
| 6,954,781 B2 | 10/2005 | Bhattacharya | |
| 7,076,255 B2 * | 7/2006 | Parupudi et al. | 455/456.1 |
| 7,103,349 B2 | 9/2006 | Himanen | |
| 7,133,899 B2 | 11/2006 | Rowe | |
| 7,184,786 B2 | 2/2007 | Mumick | |
| 7,359,492 B2 | 4/2008 | Myers | |
| 7,428,580 B2 * | 9/2008 | Hullfish et al. | 709/207 |
| 7,496,625 B1 | 2/2009 | Belcher | |
| 7,523,226 B2 | 4/2009 | Anderson et al. | |
| 7,551,583 B1 * | 6/2009 | Gazzard | 370/331 |
| 7,555,521 B1 | 6/2009 | McLaughlin | |
| 7,702,792 B2 | 4/2010 | Shaffer | |
| 7,725,116 B2 | 5/2010 | Mumick | |
| 7,733,903 B2 | 6/2010 | Bhogal | |
| 7,814,160 B2 | 10/2010 | Burtner et al. | |
| 7,912,187 B1 | 3/2011 | Mikan | |
| 7,921,158 B2 | 4/2011 | Mandalia et al. | |
| 7,983,706 B2 | 7/2011 | Wolter | |
| 8,041,025 B2 | 10/2011 | Dolph et al. | |
| 8,260,332 B2 | 9/2012 | Reunamäki | |
| 8,315,361 B1 | 11/2012 | Becker et al. | |
| 8,620,265 B1 | 12/2013 | Gailloux et al. | |
| 2001/0033639 A1 | 10/2001 | Martin | |
| 2002/0046262 A1 | 4/2002 | Heilig et al. | |
| 2002/0055350 A1 | 5/2002 | Gupte et al. | |
| 2002/0077830 A1 | 6/2002 | Suomela et al. | |
| 2002/0169610 A1 | 11/2002 | Luegger | |
| 2003/0003926 A1 | 1/2003 | Peters et al. | |
| 2003/0028601 A1 | 2/2003 | Rowe | |
| 2003/0064716 A1 | 4/2003 | Gailey et al. | |
| 2003/0069997 A1 | 4/2003 | Bravin et al. | |
| 2003/0081739 A1 | 5/2003 | Hikishima | |
| 2003/0125952 A1 | 7/2003 | Engelke et al. | |
| 2003/0174155 A1 | 9/2003 | Weng et al. | |
| 2004/0015504 A1 | 1/2004 | Ahad et al. | |
| 2004/0015547 A1 | 1/2004 | Griffin et al. | |
| 2004/0034531 A1 | 2/2004 | Chou et al. | |
| 2004/0034690 A1 | 2/2004 | Schmitz et al. | |
| 2004/0057562 A1 | 3/2004 | Myers et al. | |
| 2004/0082317 A1 | 4/2004 | Graefen | |
| 2004/0117804 A1 | 6/2004 | Scahill et al. | |
| 2004/0139157 A1 | 7/2004 | Neely, III et al. | |
| 2004/0203708 A1 | 10/2004 | Khan et al. | |
| 2004/0267527 A1 | 12/2004 | Creamer et al. | |
| 2004/0268265 A1 | 12/2004 | Berger | |
| 2005/0021868 A1 | 1/2005 | Sharma et al. | |
| 2005/0049879 A1 * | 3/2005 | Audu et al. | 704/277 |
| 2005/0135595 A1 | 6/2005 | Bushey et al. | |
| 2005/0136955 A1 | 6/2005 | Mumick et al. | |
| 2005/0198096 A1 | 9/2005 | Shaffer et al. | |
| 2005/0250550 A1 | 11/2005 | Fields | |
| 2005/0255837 A1 | 11/2005 | Kwon | |
| 2006/0052127 A1 | 3/2006 | Wolter | |
| 2006/0066717 A1 | 3/2006 | Miceli | |
| 2006/0104293 A1 | 5/2006 | Kopp et al. | |
| 2006/0159099 A1 | 7/2006 | Hensley | |
| 2006/0168095 A1 | 7/2006 | Sharma et al. | |
| 2006/0189333 A1 | 8/2006 | Othmer | |
| 2006/0217159 A1 | 9/2006 | Watson | |
| 2006/0224623 A1 | 10/2006 | Graziadio et al. | |
| 2006/0293888 A1 | 12/2006 | Jindal | |
| 2007/0005366 A1 | 1/2007 | Sravanapudi et al. | |
| 2007/0082686 A1 | 4/2007 | Mumick et al. | |
| 2007/0130399 A1 | 6/2007 | Anderson et al. | |
| 2007/0190944 A1 | 8/2007 | Doan et al. | |
| 2007/0192418 A1 | 8/2007 | Adams et al. | |
| 2007/0203987 A1 | 8/2007 | Amis | |
| 2007/0238474 A1 * | 10/2007 | Ballas et al. | 455/466 |
| 2007/0260984 A1 | 11/2007 | Marks et al. | |
| 2008/0043733 A1 | 2/2008 | Liebermann | |
| 2008/0057925 A1 | 3/2008 | Ansari | |
| 2008/0068671 A1 | 3/2008 | Yoshida et al. | |
| 2008/0095332 A1 | 4/2008 | Myers et al. | |
| 2008/0119137 A1 | 5/2008 | Lee | |
| 2008/0148154 A1 | 6/2008 | Burrell et al. | |
| 2008/0192736 A1 | 8/2008 | Jabri et al. | |
| 2008/0232248 A1 | 9/2008 | Barave et al. | |
| 2008/0248818 A1 | 10/2008 | Venkatesulu et al. | |
| 2009/0028306 A1 | 1/2009 | Rhie | |
| 2009/0037170 A1 | 2/2009 | Williams | |
| 2009/0135741 A1 | 5/2009 | Mykhalchuck et al. | |
| 2009/0150574 A1 | 6/2009 | Kawahara et al. | |
| 2009/0171669 A1 | 7/2009 | Engelsma et al. | |
| 2009/0186636 A1 | 7/2009 | Salonen | |
| 2009/0216840 A1 | 8/2009 | Pajunen et al. | |
| 2009/0238346 A1 | 9/2009 | Toutain et al. | |
| 2009/0276539 A1 | 11/2009 | Huerta et al. | |
| 2009/0279455 A1 | 11/2009 | Wang et al. | |
| 2009/0290691 A1 | 11/2009 | Salonen | |
| 2009/0319918 A1 | 12/2009 | Affronti et al. | |
| 2009/0325546 A1 | 12/2009 | Reddy et al. | |
| 2010/0011069 A1 | 1/2010 | Haruna et al. | |
| 2010/0030557 A1 | 2/2010 | Molloy et al. | |
| 2010/0053212 A1 | 3/2010 | Kang et al. | |
| 2010/0057466 A1 | 3/2010 | Garg et al. | |
| 2010/0100809 A1 | 4/2010 | Thomas et al. | |
| 2010/0144278 A1 | 6/2010 | Van Harlingen et al. | |
| 2010/0150333 A1 | 6/2010 | Goodman et al. | |
| 2010/0169096 A1 | 7/2010 | Lv et al. | |
| 2010/0174421 A1 | 7/2010 | Tsai et al. | |
| 2010/0190513 A1 | 7/2010 | Andreasson | |
| 2010/0191590 A1 | 7/2010 | Hakkarainen et al. | |
| 2010/0211389 A1 | 8/2010 | Marquardt | |
| 2010/0211695 A1 | 8/2010 | Steinmetz et al. | |
| 2010/0239081 A1 | 9/2010 | Krantz et al. | |
| 2010/0251124 A1 | 9/2010 | Geppert et al. | |
| 2010/0269134 A1 | 10/2010 | Storan et al. | |
| 2010/0322395 A1 | 12/2010 | Michaelis et al. | |
| 2011/0028168 A1 | 2/2011 | Champlin et al. | |
| 2011/0038512 A1 | 2/2011 | Petrou et al. | |
| 2011/0047246 A1 | 2/2011 | Frissora et al. | |
| 2011/0081007 A1 | 4/2011 | Bar-Yoav | |
| 2011/0105087 A1 | 5/2011 | Toebes et al. | |
| 2011/0105089 A1 | 5/2011 | Ellis et al. | |
| 2011/0116610 A1 | 5/2011 | Shaw et al. | |
| 2011/0130168 A1 | 6/2011 | Vendrow et al. | |
| 2011/0170675 A1 | 7/2011 | Mikan et al. | |
| 2011/0177800 A1 | 7/2011 | Gilson | |
| 2011/0179180 A1 | 7/2011 | Schleifer et al. | |
| 2011/0211679 A1 | 9/2011 | Mezhibovsky et al. | |
| 2011/0212737 A1 | 9/2011 | Isidore | |
| 2011/0270613 A1 | 11/2011 | Da Palma et al. | |
| 2011/0294525 A1 | 12/2011 | Jonsson | |
| 2012/0034904 A1 | 2/2012 | LeBeau et al. | |
| 2012/0035931 A1 | 2/2012 | LeBeau et al. | |
| 2012/0064924 A1 | 3/2012 | Schapsis et al. | |
| 2012/0077526 A1 | 3/2012 | Riffe | |
| 2012/0096095 A1 | 4/2012 | Bhargava | |
| 2012/0115501 A1 | 5/2012 | Zheng | |
| 2012/0237009 A1 | 9/2012 | Szpilfogel | |
| 2012/0259633 A1 | 10/2012 | Aihara et al. | |
| 2013/0029721 A1 | 1/2013 | Ma et al. | |
| 2013/0040660 A1 | 2/2013 | Fisher et al. | |
| 2013/0079061 A1 | 3/2013 | Jadhav et al. | |
| 2013/0158988 A1 | 6/2013 | Katis et al. | |
| 2013/0252539 A1 | 9/2013 | Minter et al. | |

OTHER PUBLICATIONS

"Telecommunications device for the deaf;" Wikipedia, Sep. 25, 2011, pp. 1-8; located at: http://en.wikipedia.org/wiki/Telecommunications_device_for_the_deaf.

"Google Wave Federation Protocol," Wikipedia, Sep. 24, 2011, pp. 1-3; located at: http://en.wikipedia.org/wiki/Google_Wave_Federation_Protocol.

"Interactive voice response," Wikipedia, Sep. 25, 2011, pp. 1-8; located at: http://en.wikipedia.org/wiki/Interactive_voice_response.

* cited by examiner

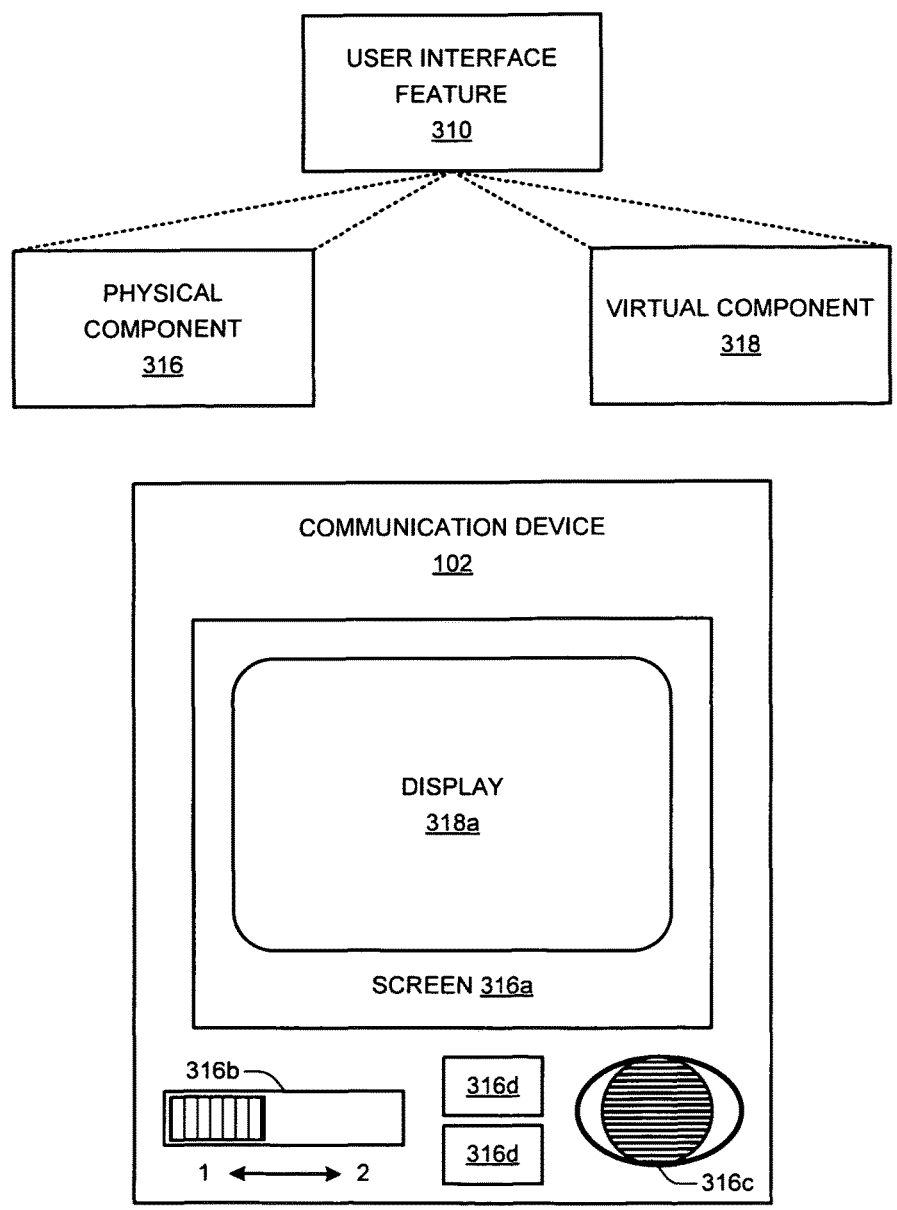
FIG. 3C

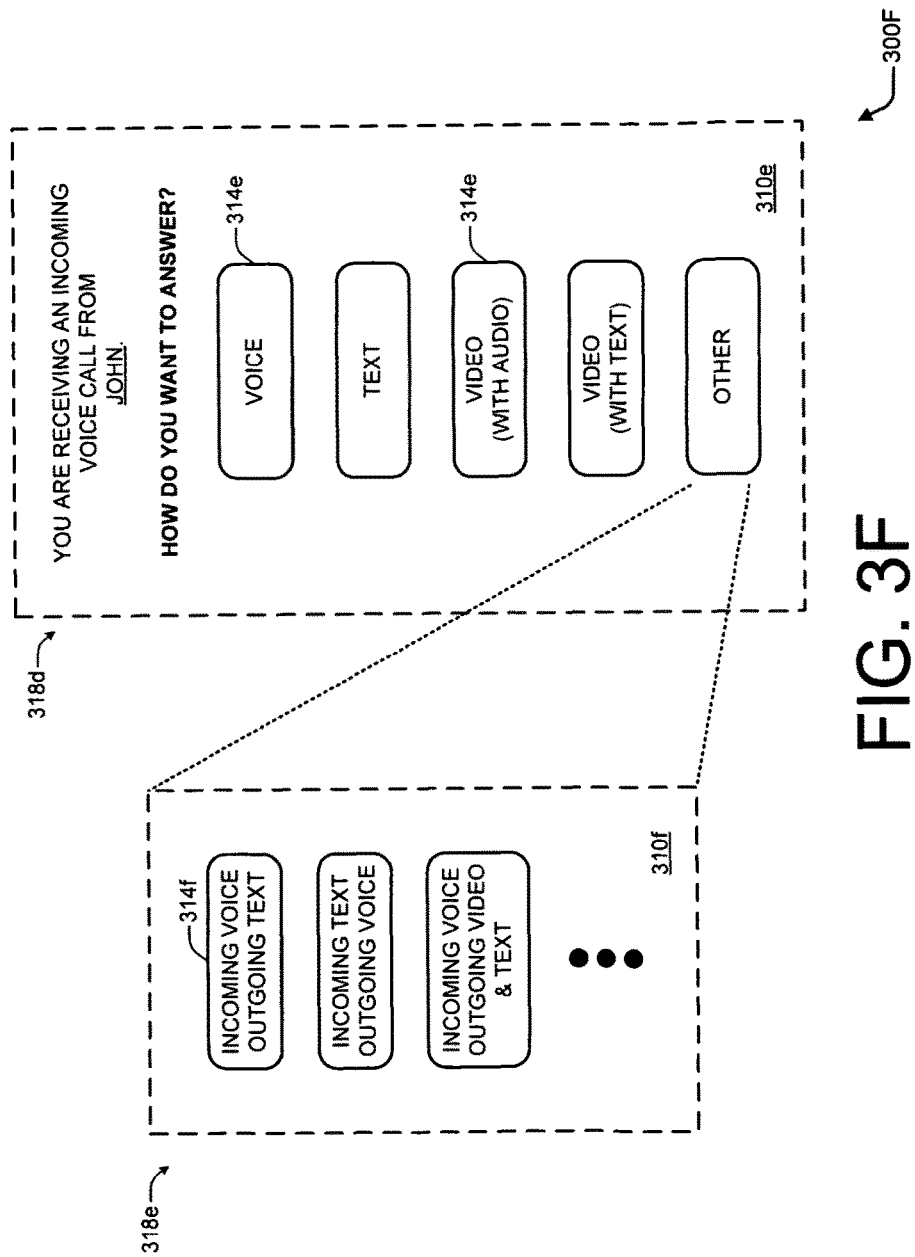

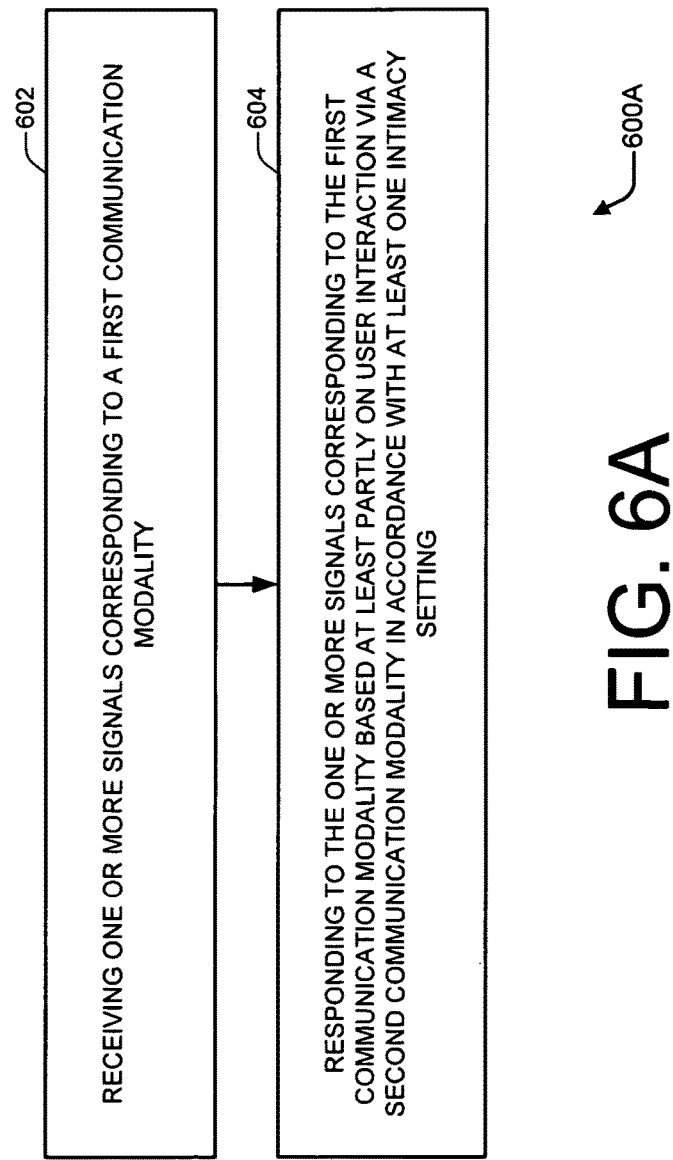

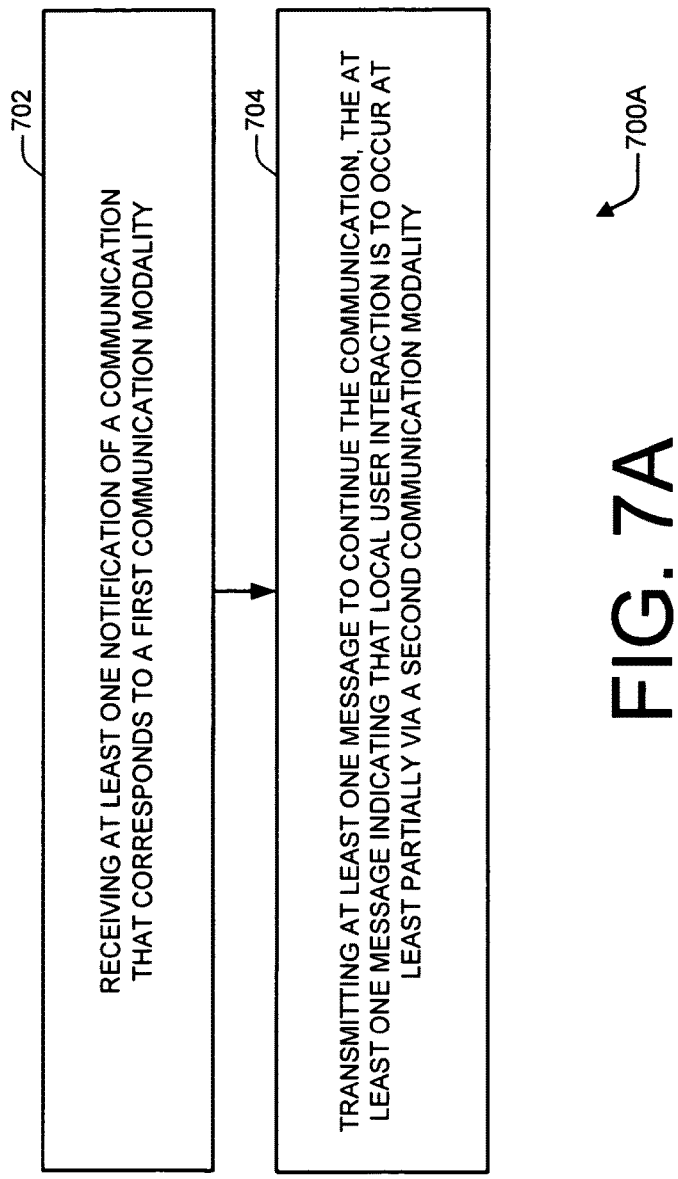

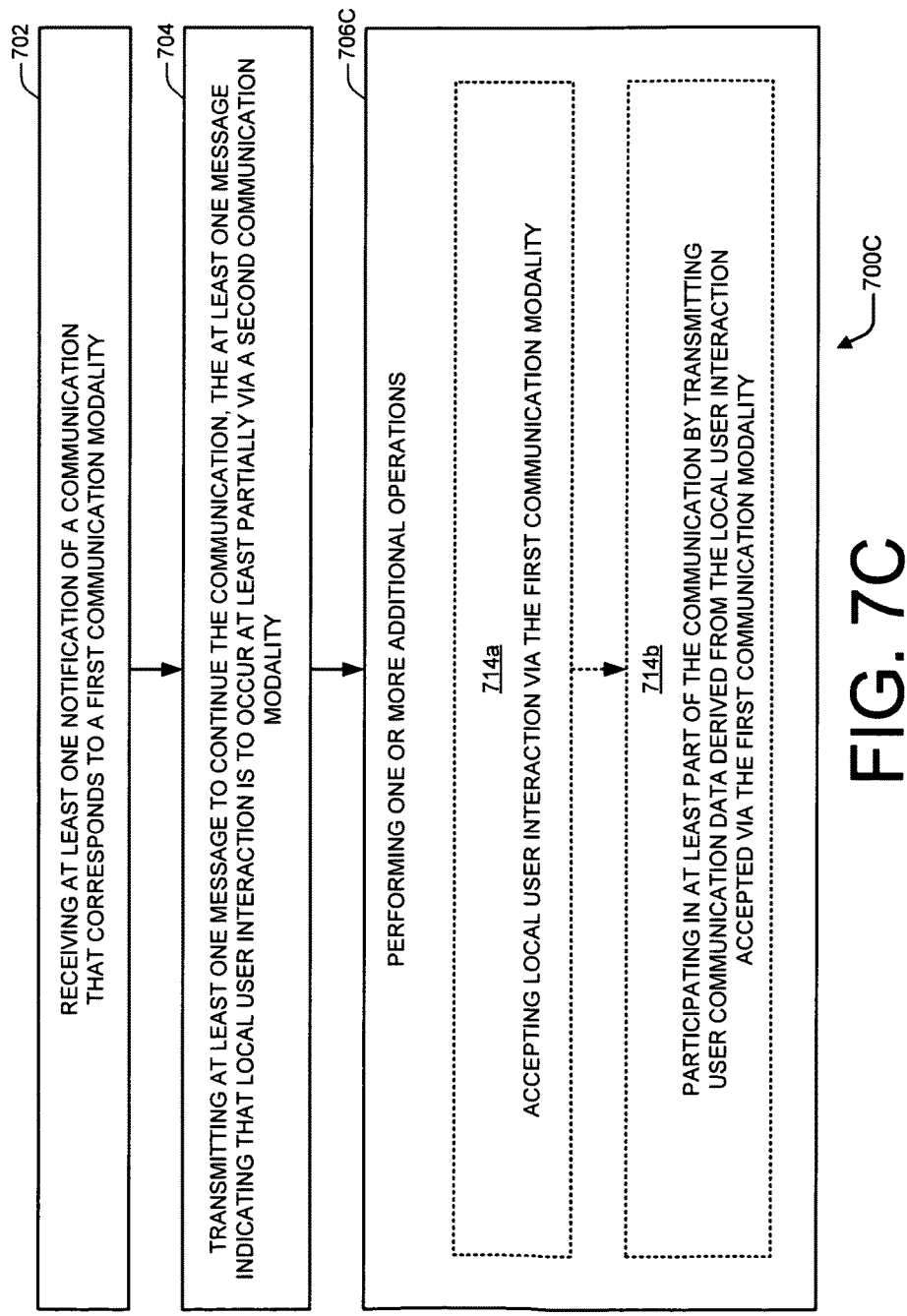

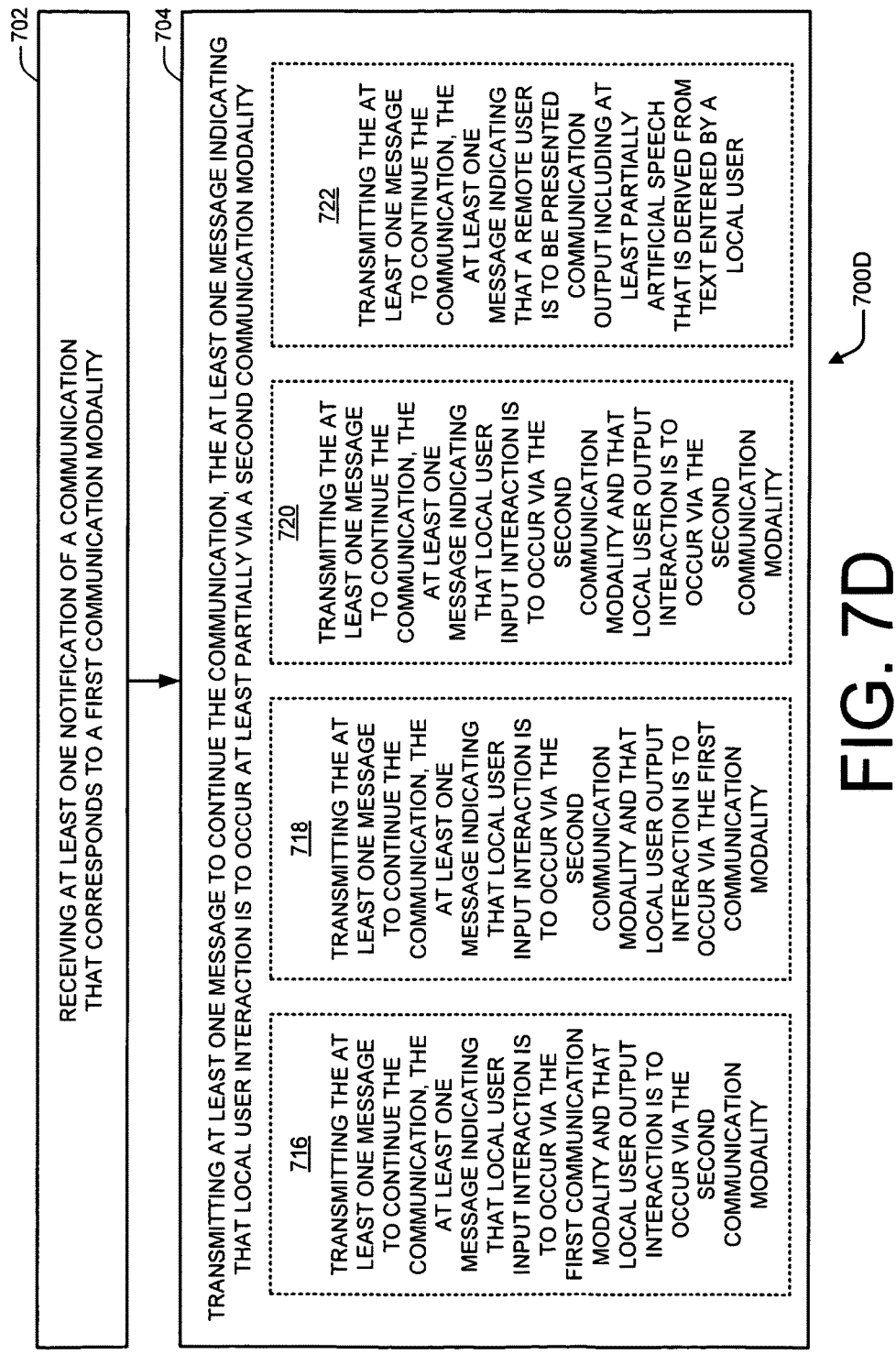

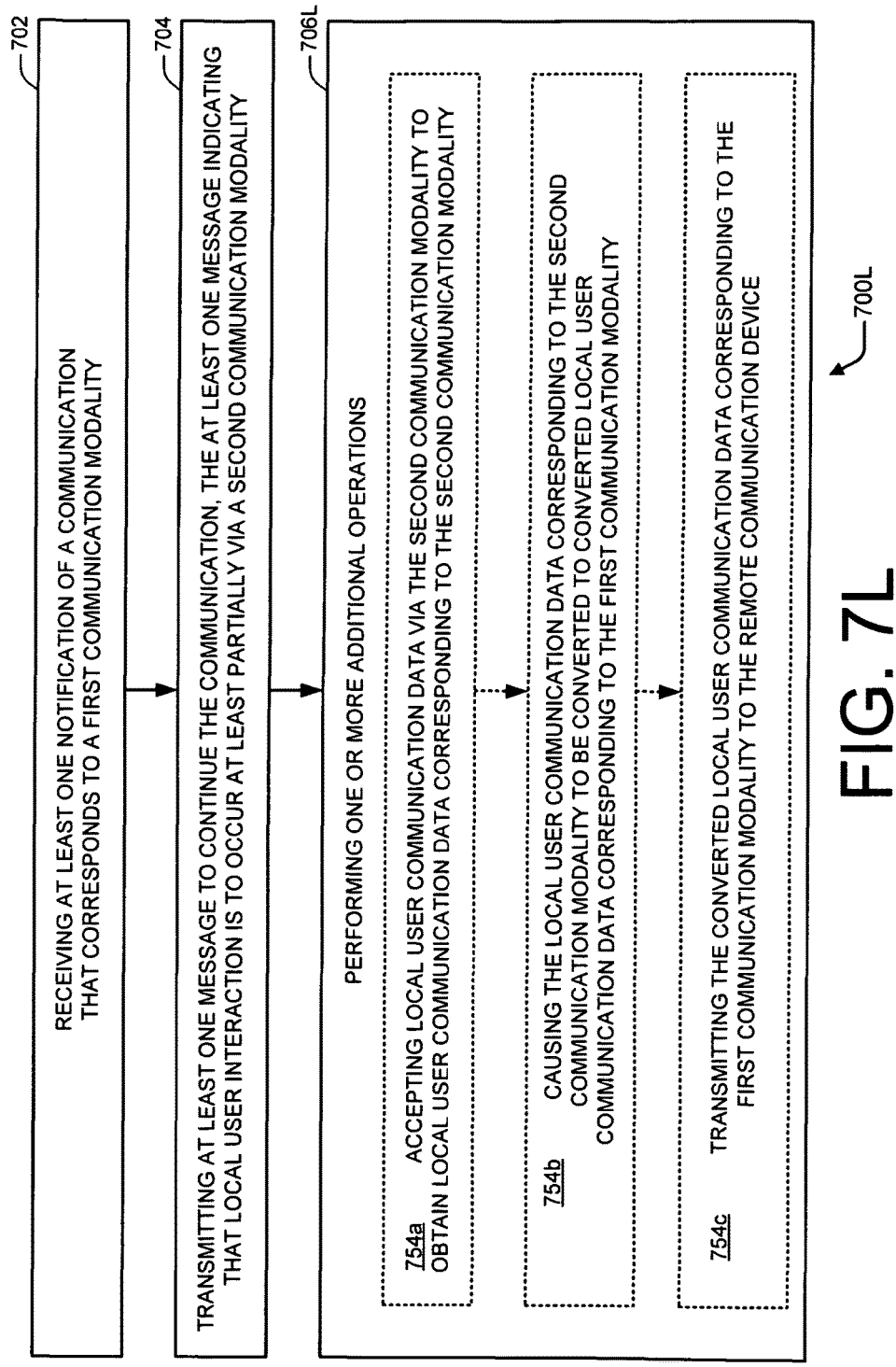

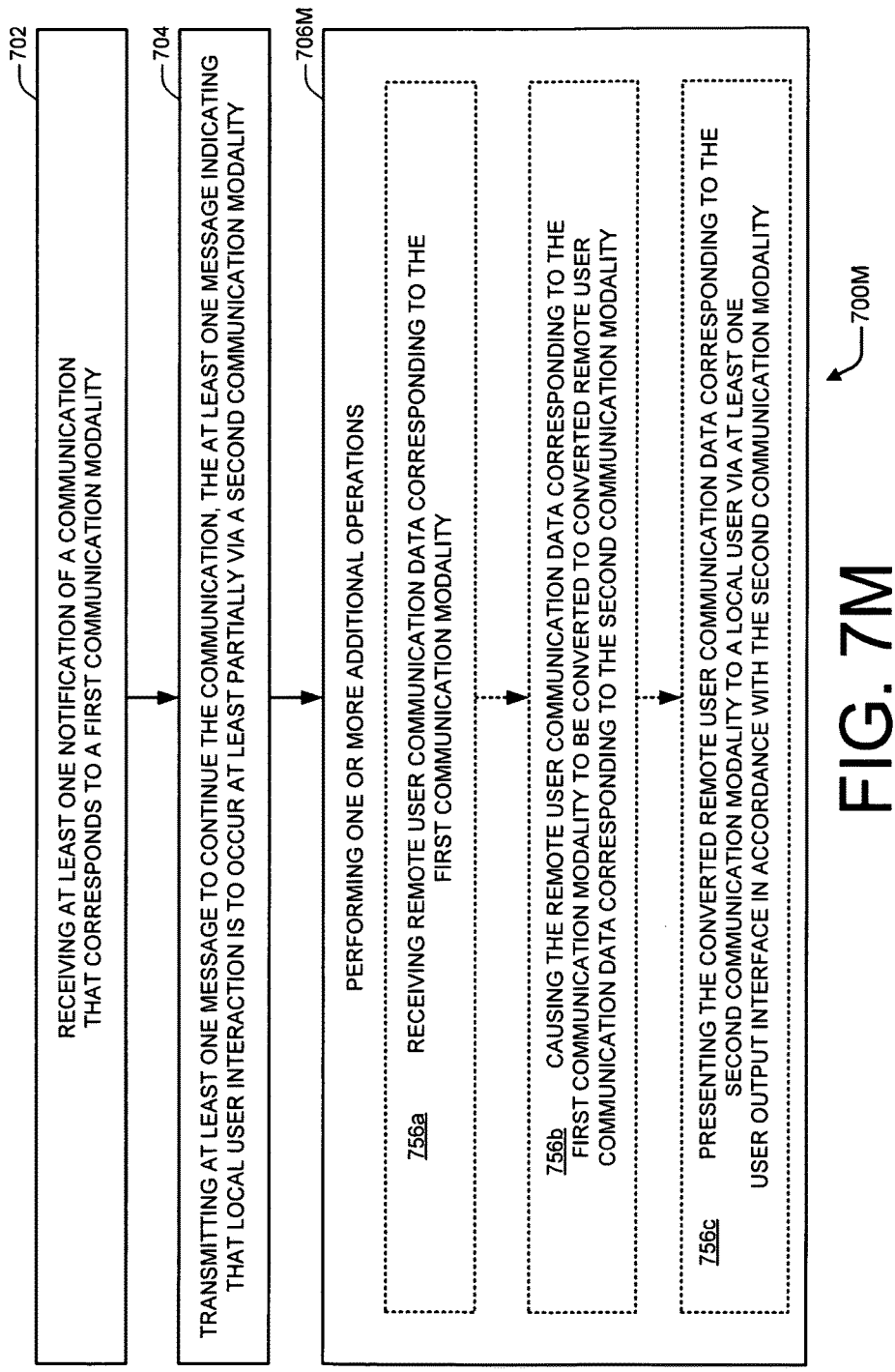

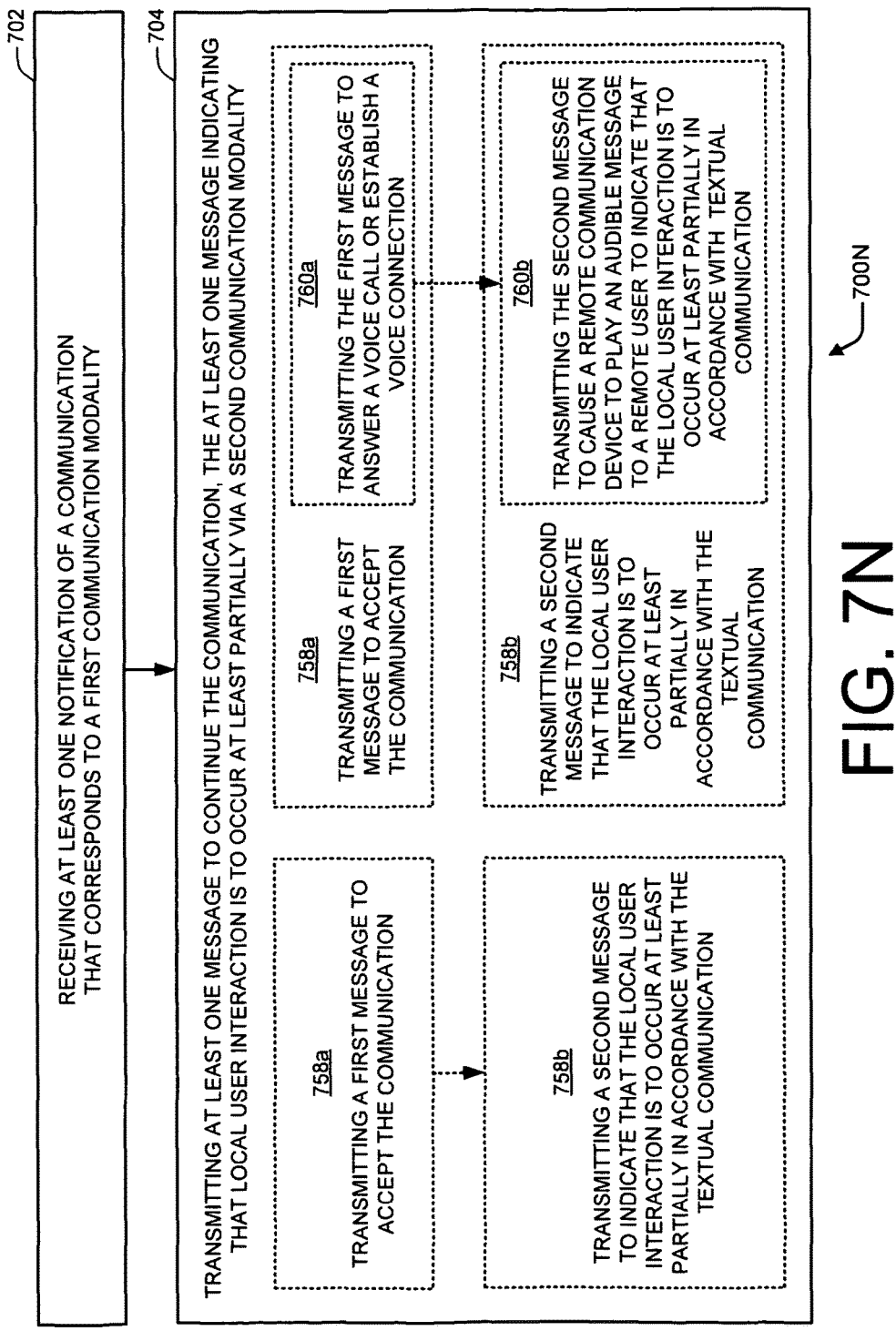

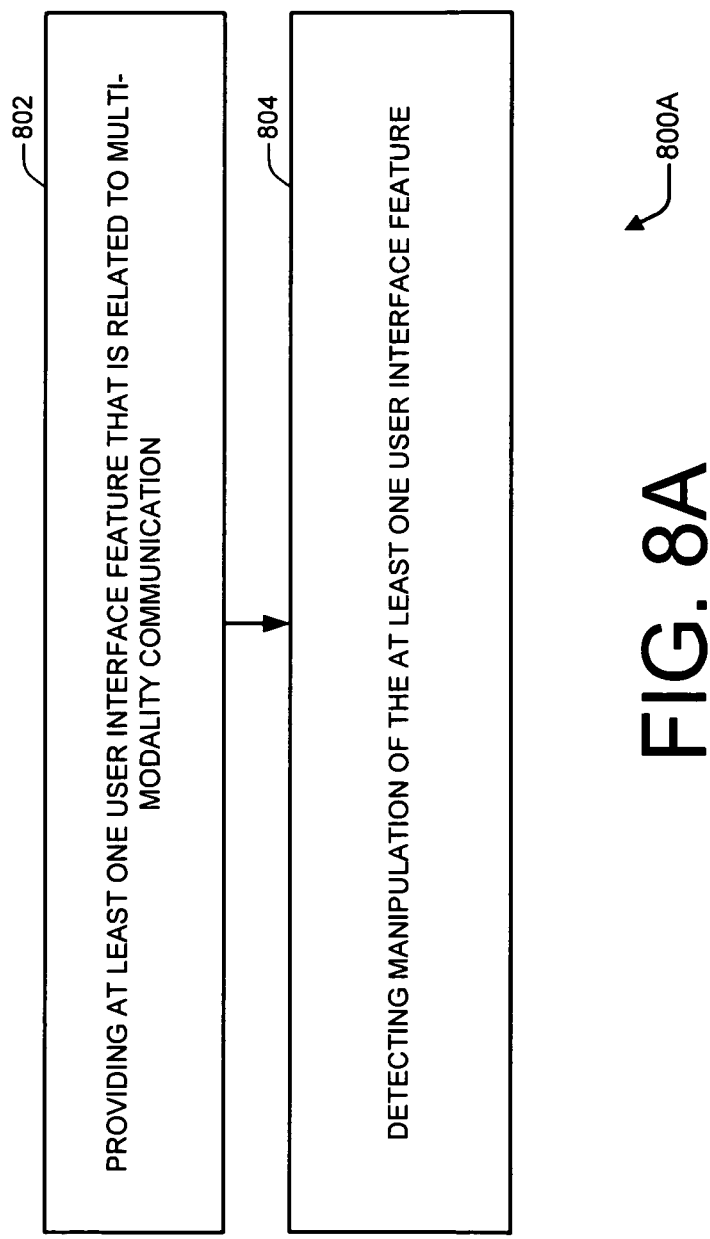

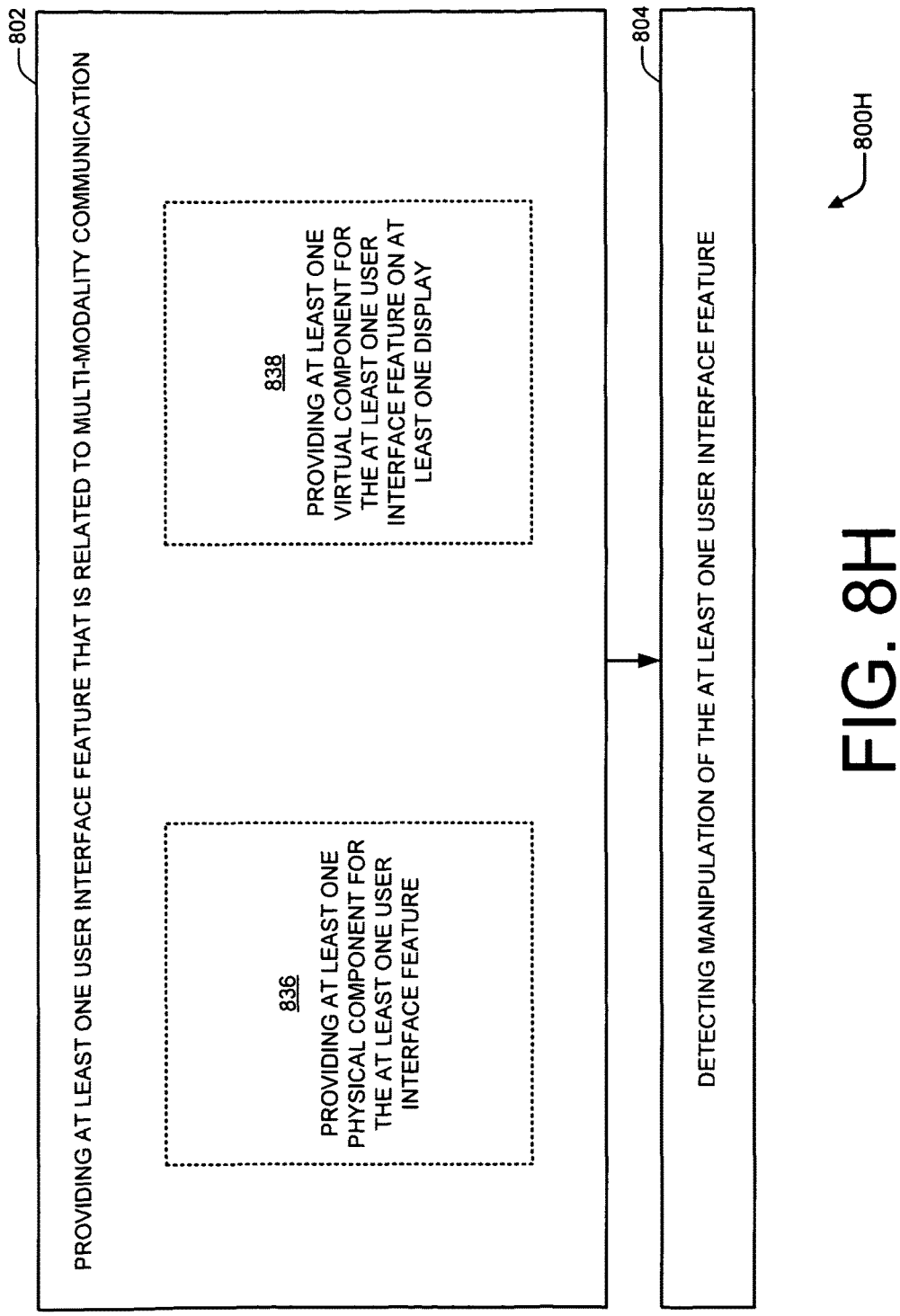

USER INTERFACE FOR MULTI-MODALITY COMMUNICATION

RELATED APPLICATIONS

For purposes of the USPTO extra-statutory requirements, the present application constitutes a continuation-in-part of U.S. patent application Ser. No. 13/200,741, entitled "MULTI-MODALITY COMMUNICATION", naming Royce A. Levien, Richard T. Lord, Robert W. Lord, Mark A. Malamud, John D. Rinaldo Jr. as inventors, filed 28 Sep. 2011, which is currently co-pending, or is an application of which a currently co-pending application is entitled to the benefit of the filing date; and the present application constitutes a continuation-in-part of U.S. patent application Ser. No. 13/200,805, entitled "MULTI-MODALITY COMMUNICATION PARTICIPATION", naming Royce A. Levien, Richard T. Lord, Robert W. Lord, Mark A. Malamud, John D. Rinaldo Jr. as inventors, filed concurrently herewith on 30 Sep. 2011, which is currently co-pending, or is an application of which a currently co-pending application is entitled to the benefit of the filing date.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BRIEF DESCRIPTION OF THE FIGURES

FIG. 3C is a schematic diagram of an example communication device that may include a physical component or a virtual component of a user interface feature in accordance with certain example embodiments.

FIGS. 3D-3F are schematic diagrams of example user interface features in accordance with certain example embodiments.

FIG. 6A is a flow diagram illustrating an example method for a communication device that may be participating in a communication involving two communication modalities in accordance with at least one example intimacy setting, in accordance with certain example embodiments.

FIG. 7A is a flow diagram illustrating an example method for participating in a multi-modality communication, in accordance with certain example embodiments.

FIGS. 7B-7N depict example alternatives for a flow diagram of FIG. 7A in accordance with certain example embodiments.

FIG. 8A is a flow diagram illustrating an example method for realizing a multi-modality communication user interface, in accordance with certain example embodiments.

FIGS. 8B-8I depict example alternatives for a flow diagram of FIG. 8A in accordance with certain example embodiments.

DETAILED DESCRIPTION

Figure 1:
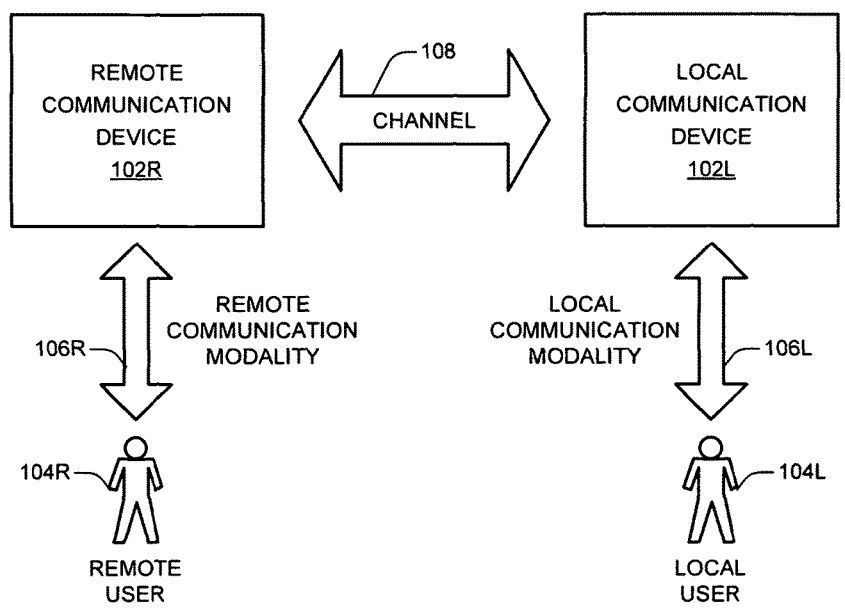
FIG. 1 is schematic diagram of two communication devices that may be participating in an example communication in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is schematic diagram 100 of two communication devices that may be participating in an example communication in accordance with certain example embodiments. As shown in FIG. 1, by way of example but not limitation, schematic diagram 100 may include communication devices 102, users 104, communication modalities 106, or at least one channel 108. More specifically, schematic diagram 100 may include a remote communication device 102R, a remote user 104R, a remote communication modality 106R, a local communication device 102L, a local user 104L, a local communication modality 106L, or a channel 108.

For certain example embodiments, a user 104 may be associated with a communication device 102. A user 104 may be interacting with a communication device 102 via at least one communication modality 106. Communication devices 102 may comprise, by way of example but not limitation, a mobile phone, a mobile terminal, a laptop or notebook computer, a personal digital assistant (PDA), a netbook, an entertainment appliance (e.g., a television, a gaming console, a set-top box, a music player, some combination thereof, etc.), a smart phone, a portable gaming device, a user equipment, a tablet or slate computer, a home phone, a desktop computer, a personal navigation device (PND), a vehicle with user-accessible communication capabilities, a private branch exchange (PBX)-based phone, videoconferencing equipment, any combination thereof, and so forth. A user 104 may comprise, by way of example only, a person. Example communication modalities 106 may include, by way of example but not limitation, a textual communication modality (e.g., wherein text may be communicated such as via a text message), a vocal communication modality (e.g., wherein sounds may be communicated such as via a voice call or teleconference), a visual communication modality (e.g., wherein moving images may be communicated such as via a video call or video conference), any combination thereof, and so forth.

For certain example embodiments, remote user 104R may be associated with remote communication device 102R. Remote user 104R may be interacting with remote communication device 102R via at least one remote communication modality 106R. Local user 104L may be associated with local communication device 102L. Local user 104L may be interacting with local communication device 102L via at least one local communication modality 106L. Remote communication device 102R or remote user 104R may be participating in at least one communication with local communication device 102L or local user 104L via one or more channels 108. A channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a public-switched telephone network (PSTN), at least part of a cable network, at least part of a cellular network connection, at least part of an Internet connection, at least part of a Wi-Fi connection, at least part of a WiMax connection, multiple instances of any of the above, any combination of the above, and so forth. A channel 108 may include one or more nodes through which signals are propagated.

For certain example implementations, a communication may be initiated by remote communication device 102R, remote user 104R, local communication device 102L, local user 104L, any combination thereof, and so forth. For certain example implementations, remote communication modality 106R and local communication modality 106L may comprise a same one or more communication modalities 106 or may comprise at least one different communication modality 106. Furthermore, for certain example implementations, remote communication modality 106R or local communication modality 106L may change from one communication modality to another communication modality during a single communication, across different communications, and so forth.

Moreover, it should be understood that the terms "remote" and "local" may, depending on context, be a matter of perspective. For instance, a communication device 102 or user 104 or communication modality 106 may be considered a local one at one moment, for one communication, for one perspective, etc. but may be considered a remote one at a different moment, for a different communication, for a different perspective, etc. However, one of ordinary skill in the art will recognize that the terms "remote" and "local" may serve, depending on context, to indicate that different interactions, acts, operations, functionality, a combination thereof, etc. may be occurring at, may be more closely associated with, a combination thereof etc. one side, aspect, location, combination thereof, etc. of a communication as compared to another side, aspect, location, combination thereof, etc. of the communication. For example, one signal may be transmitted from a remote communication device 102R and received at a local communication device 102L, or another signal may be transmitted from a local communication device 102L and received at a remote communication device 102R.

Figure 2:
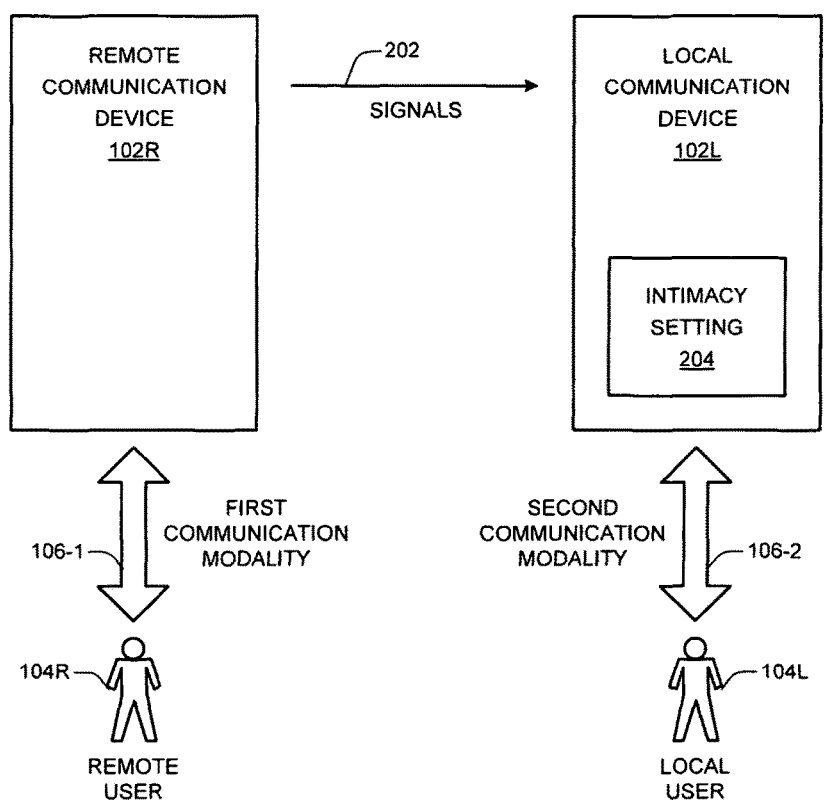
FIG. 2 is schematic diagram of two communication devices that may be participating in a communication involving two communication modalities in accordance with at least one example intimacy setting, in accordance with certain example embodiments.

FIG. 2 is schematic diagram 200 of two communication devices that may be participating in a communication involving two communication modalities in accordance with at least one example intimacy setting, in accordance with certain example embodiments. As shown in FIG. 2, by way of example but not limitation, schematic diagram 200 may include communication devices 102, users 104, communication modalities 106, or at least one signal 202. More specifically, schematic diagram 200 may include a remote communication device 102R, a remote user 104R, a first communication modality 106-1, a local communication device 102L, a local user 104L, a second communication modality 106-2, or one or more signals 202. Furthermore, at least local communication device 102L may include (e.g., store, establish, have access to, a combination thereof, etc.) at least one intimacy setting 204.

For certain example embodiments, remote user 104R may be associated with remote communication device 102R. Remote user 104R may be interacting with remote communication device 102R via at least one first communication modality 106-1. Local user 104L may be associated with local communication device 102L. Local user 104L may be interacting with local communication device 102L via at least one second communication modality 106-2. First communication modality 106-1 may differ from second communication modality 106-2. Remote communication device 102R or remote user 104R may be participating in at least one communication with local communication device 102L or local user 104L via one or more signals 202. Signals 202 may propagate via one or more channels 108 (e.g., of FIG. 1). Signals 202, by way of example but not limitation, may comprise, electrical signals, magnetic signals, electromagnetic signals, photonic signals, wireless signals, wired signals, any combination thereof, and so forth.

For certain example embodiments, a local communication device 102L may receive one or more signals 202 corresponding to a first communication modality 106-1. A local communication device 102L may respond to one or more signals 202 corresponding to first communication modality 106-1 based at least partly on local user 104L interaction via a second communication modality 106-2 in accordance with at least one intimacy setting 204. By way of example but not limitation, at least one intimacy setting 204 may indicate what kind of one or more communication modalities a user is willing to expose for at least one communication.

For certain example embodiments, at least one intimacy setting 204 may indicate how a user 104 is to interact with a communication device 102 with respect to a given communication without condition (e.g., a user may limit any current communications to text). Additionally or alternatively, at least one intimacy setting 204 may indicate how a user 104 is to interact with a communication device with respect to a given communication on a conditional basis. By way of example only, a user 104 may indicate a communication modality in at least partial dependence on whether an associated communication device 102 initiated a communication or terminated a communication. For instance, at least one intimacy setting 204 may indicate that communications are to be initiated using an interaction in accordance with a voice communication modality, but the at least one intimacy setting 204 may indicate that communications are to be terminated using a textual communication modality. Additionally or alternatively, a local user 104L may indicate a local communication modality 106L (e.g., of FIG. 1) in at least partial dependence on a remote communication modality 106R. For instance, at least one intimacy setting 204 may indicate that if a remote communication modality 106R corresponds to text, a local communication modality 106L is also to correspond to text; furthermore, the at least one intimacy setting 204 may indicate that if a remote communication modality 106R corresponds to voice, a local communication modality 106L is to correspond to text; moreover, the at least one intimacy setting 204 may indicate that if a remote communication modality 106R corresponds to video, a local communication modality 106L is to correspond to voice. Additionally or alternatively, a local user 104L may indicate a local communication modality 106L (e.g., of FIG. 1) that is based at least partially on an identity of a remote user 104R; a time of day, day of week, a combination thereof, etc.; an environmental condition (e.g., an ambient lighting level, a level or type of movement—e.g. vehicle motion may be detected, a combination thereof, etc.); any combination thereof; and so forth. However, claimed subject matter is not limited to any particular examples.

Figure 3A:
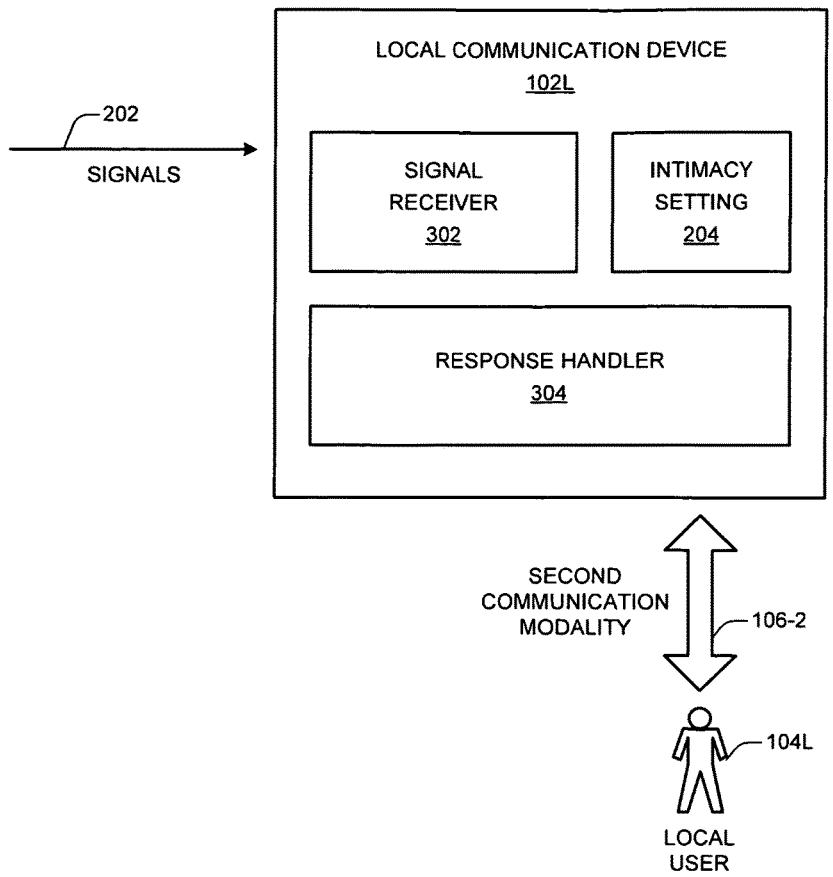
FIG. 3A is schematic diagram of an example communication device that may be participating in a communication using a signal receiver or a response handler in accordance with certain example embodiments.

FIG. 3A is schematic diagram 300A of an example communication device that may be participating in a communication using a signal receiver or a response handler in accordance with certain example embodiments. As shown in FIG. 3A, by way of example but not limitation, schematic diagram 300A may include a local communication device 102L, a local user 104L, a second communication modality 106-2, or one or more signals 202. More specifically, a local communication device 102L of schematic diagram 300 may include at least one intimacy setting 204, a signal receiver 302, or a response handler 304.

For certain example embodiments, a signal receiver 302 may receive one or more signals 202 corresponding to a first communication modality 106-1. By way of example but not limitation, one or more signals 202 may correspond to first communication modality 106-1 if one or more signals 202 originated at remote communication device 102R (e.g., of FIG. 2) in at least partial dependence on interaction by remote user 104R with remote communication device 102R via first communication modality 106-1, if one or more signals 202 are derived at least partly from interaction by remote user 104R with remote communication device 102R via first communication modality 106-1, if one or more signals 202 are encoded to support user input via first communication modality 106-1, if one or more signals 202 are encoded to support user output in accordance with first communication modality 106-1, any combination thereof, and so forth. A response handler 304 may respond to one or more signals 202 corresponding to first communication modality 106-1 based at least partly on local user 104L interaction via a second communication modality 106-2 in accordance with at least one intimacy setting 204. Example implementations with respect to a response handler 304 are described herein below with particular reference to at least FIGS. 4A-4C. Additional and/or alternative implementations are described herein below with respect to at least FIGS. 6A-6K.

For certain example embodiments, signal receiver 302 and response handler 304 may comprise a single component together, a single component apiece, multiple components, or any combination thereof, and so forth. Example components for a communication device 102 are described herein below with particular reference to at least FIG. 5. By way of example but not limitation, signal receiver 302 may comprise an antenna, a wired connector, a signal downconverter, a baseband processor, a signal processing module (e.g., to account for signal manipulation for a communication protocol, to decrypt, to extract data, a combination thereof, etc.), a processor, hardware, software, firmware, logic, circuitry, any combination thereof, and so forth. By way of example but not limitation, response handler 304 may comprise an intimacy-related module, hardware, software, firmware, logic, circuitry, any combination thereof, and so forth.

Figure 3B:
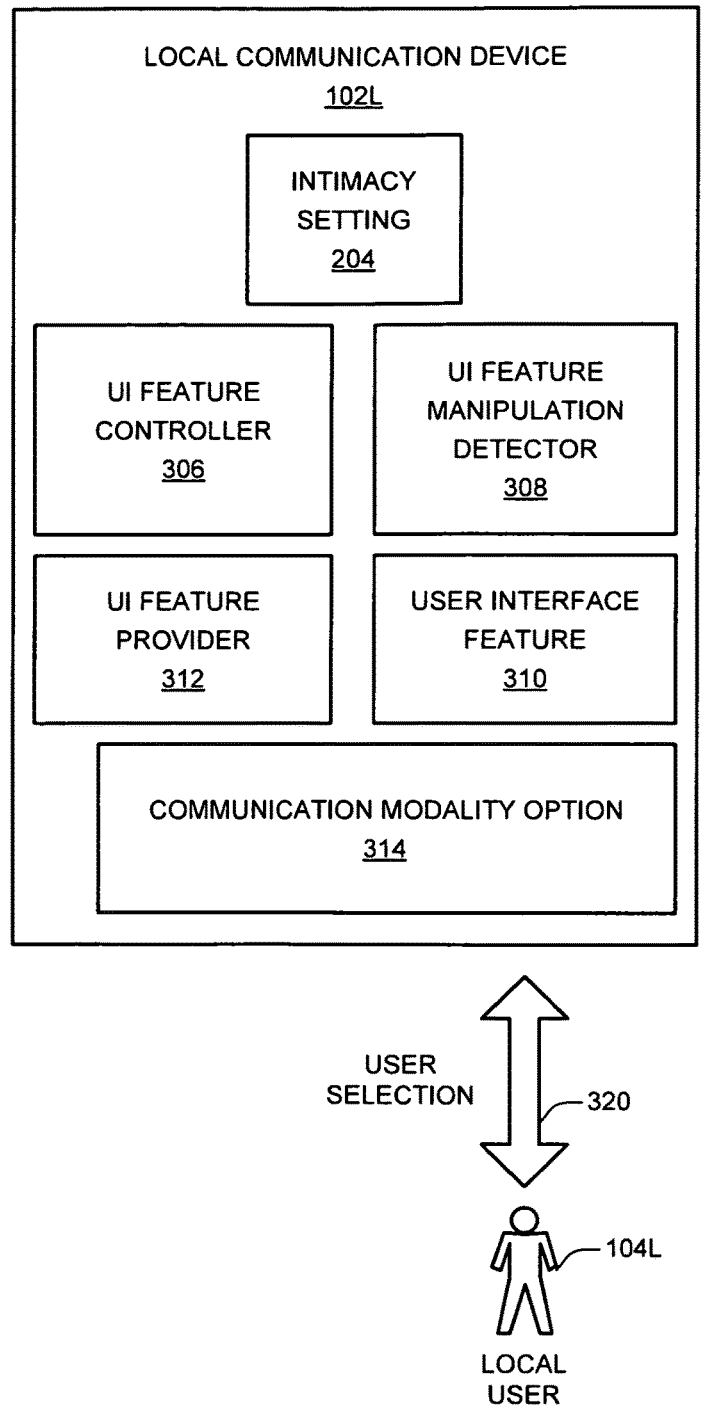
FIG. 3B is a schematic diagram of an example communication device that may realize a user interface feature in accordance with certain example embodiments.

FIG. 3B is a schematic diagram 300B of an example communication device that may realize a user interface feature in accordance with certain example embodiments. As shown in FIG. 3B, by way of example but not limitation, schematic diagram 300B may include a local communication device 102L, a local user 104L, or at least one intimacy setting 204. More specifically, schematic diagram 300B may include at least one user interface (UI) feature controller 306, at least one user interface feature manipulation detector 308, at least one user interface feature 310, at least one user interface feature provider 312, one or more communication modality options 314, or at least one user selection 320.

For certain example embodiments, a user interface feature 310 may be realized by a local communication device 102L. Example implementations for a user interface feature 310 are described herein with particular reference to FIGS. 3C-3F and FIGS. 8A-8I, but by way of example but not limitation. A user interface feature 310 may enable a user 104 to operate a communication device 102 with regard to multi-modality communications. A user interface feature 310 may, for example, provide visual, aural, haptic, etc. output and accept visual, touch, or sound input to enable a user 104 to establish settings (e.g., at least one intimacy setting 204), activate a multi-modality communication, any combination thereof, and so forth. For certain example implementations, a user interface feature 310 may include or present one or more communication modality options 314. Communication modality options 314 are described, by way of example but not limitation, with particular reference to FIGS. 3D-3F. In an example operation, user selection 320 of a communication modality option 314 may enable a user 104 to establish settings, activate a multi-modality communication, any combination thereof, and so forth For certain example embodiments, a user interface feature provider 312 may provide a user interface feature 310. A user interface feature manipulation detector 308 may detect if or when a user interface feature 310 is being manipulated by a user 104. A user interface feature controller 306 may control an implementation or realization of a user interface feature. For certain example implementations, a user interface feature controller 306 may control interactions between user interface feature manipulation detector 308 or user interface feature provider 312 or may control interactions among user interface feature provider 312, user interface feature manipulation detector 308, and other components of a communication device 102. For instance, a user interface feature controller 306 may provide access to one or more signals 202 (e.g., of FIGS. 2 and 3A) for user interface feature provider 312, to calling functionality of a communication device 102, to display functionality of a communication device 102, to an operating system resident on a communication device 102 (e.g., if a user interface feature or multi-modality communication is at least partially implemented by an application that is separate from an operating system), to user interface components 516, any combination thereof, and so forth. However, claimed subject matter is not limited to any particular described embodiments, implementations, examples, etc.

FIG. 3C is a schematic diagram 300C of an example communication device that may include a physical component or a virtual component of a user interface feature in accordance with certain example embodiments. As shown in FIG. 3C, by way of example but not limitation, schematic diagram 300C may include a communication device 102 or a user interface feature 310. More specifically, schematic diagram 300C may include at least one physical component 316 of a user interface feature 310 or at least one virtual component 318 of a user interface feature 310.

For certain example embodiments, a user interface feature 310 may comprise one or more physical components 316, one or more virtual components 318, any combination thereof, and so forth. By way of example but not limitation, a physical component 316 of a user interface feature 310 may comprise a component that is at least partially implemented in hardware as part of a communication device 102. Examples of physical components 316 may include, but are not limited to, at least one knob, at least one dial, at least one slider, at least one switch, one or more keys (e.g., that are part of a numeric, alphabetical, alphanumeric, etc. keypad or keyboard), one or more buttons, at least one trackball, at least one track wheel, at least one joystick, a track stick, or at least one touch-sensitive surface (e.g., a touch-sensitive screen, a track pad, etc.). Physical components 316 (e.g., a knob, a switch, a slider, a dial, a key, a button, a trackball, a track wheel, etc.) may be physically moveable by a user. A physical component 316 may be integrated with a communication device 102. A physical component 316 may be a hardware input/output component that is dedicated (e.g., temporarily or permanently) to a user interface feature 310. Examples of physical components 316 that are illustrated in schematic diagram 300C may include, by way of example but not limitation, a touch-sensitive screen 316a, a switch 316b, a trackball or track wheel 316c, a button or key 316d, a combination thereof, and so forth. As shown, by way of example but not limitation, a switch 316b may be switched between a first communication modality 106-1 and a second communication modality 106-2 (e.g., of FIG. 2).

For certain example embodiments, a user interface feature 310 may comprise one or more virtual components 318. By way of example but not limitation, a virtual component 318 of a user interface feature 310 may comprise a component that is at least partially implemented in software or firmeware as part of a communication device 102. Examples of virtual components 318 may include, but are not limited to, a visual presentation, an aural presentation, a haptic presentation, any combination thereof, and so forth. For certain example implementations, a virtual component 318 may be displayed on a screen, played on a speaker, projected on a screen, vibrated by a device, any combination thereof, and so forth. A virtual component 318 may be reconfigurable during operation. A virtual component 318 may be displayed at one moment, modified at another moment, removed from a display at another moment, a combination thereof, and so forth. An example of a virtual component 318 that is illustrated in schematic diagram 300C may include, by way of example but not limitation, a display 318a. Physical components 316 or virtual components 318 may not be mutually exclusive. For example, a screen 316a may serve to present a virtual component 318 on a physical component 316. Additionally or alternatively, a physical component 316 (e.g., a trackball 316c or a button/key 316d) may be used to select an aspect of a virtual component 318 (e.g., that is part of a display 318a). However, claimed subject matter is not limited to any particular described embodiments, implementations, examples, etc.

Figure 3D:
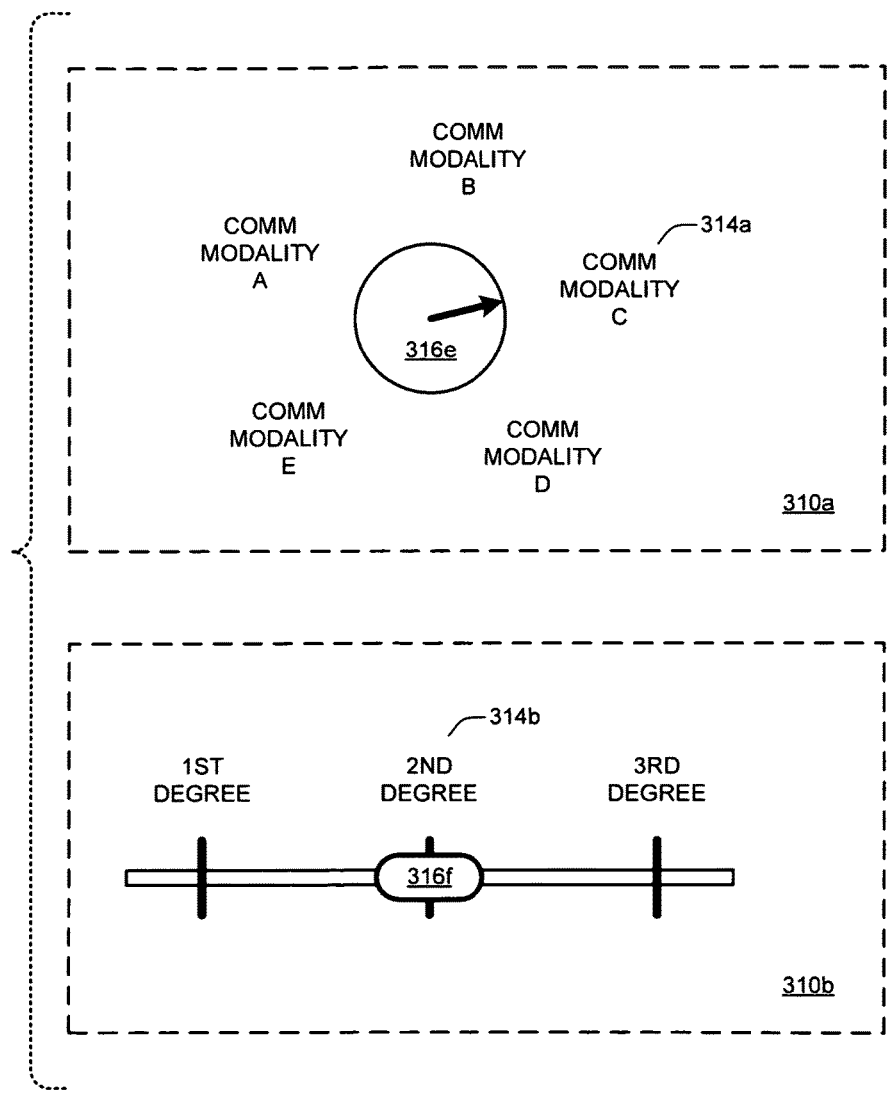
Figure 3E:
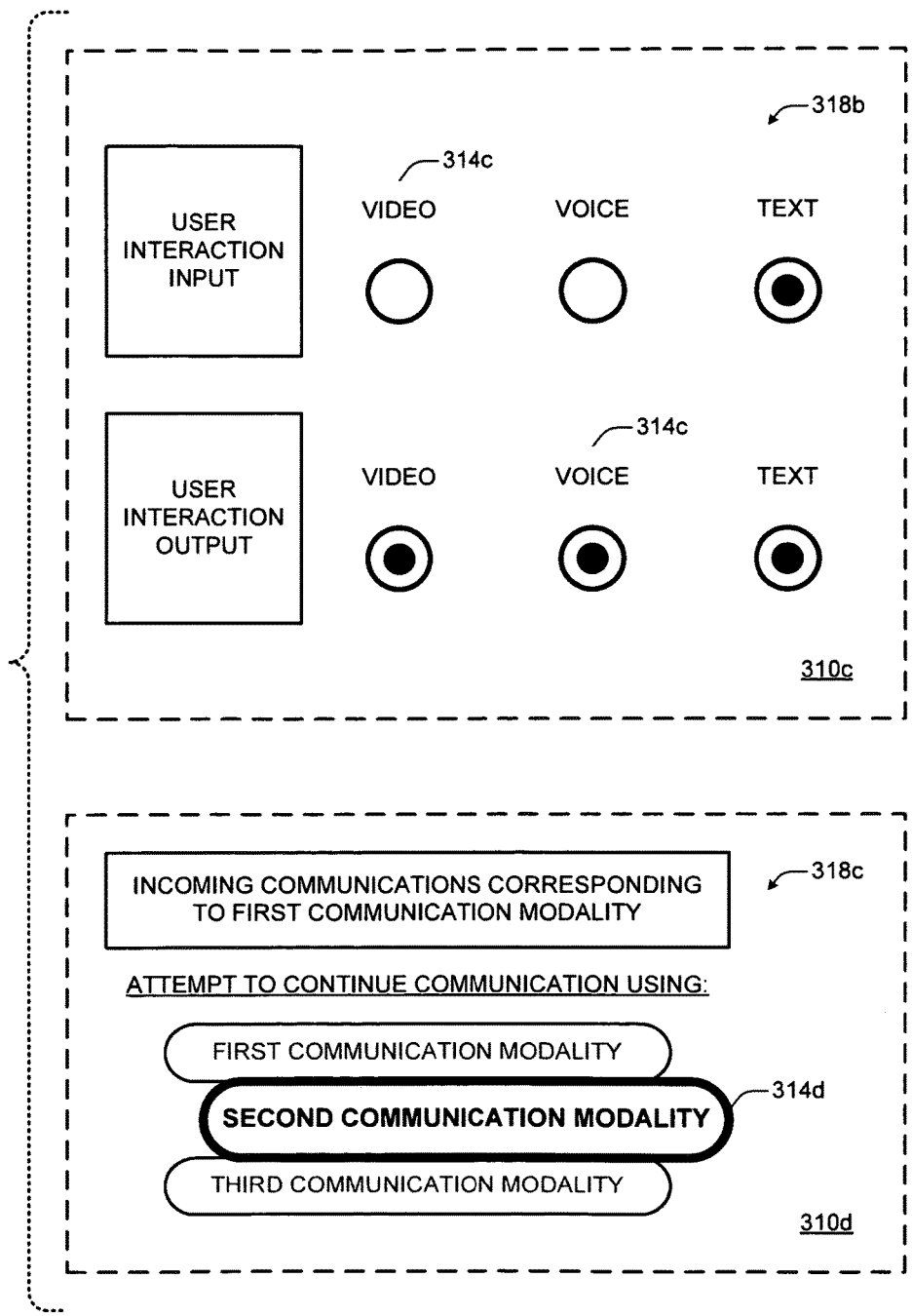

FIGS. 3D-3F are schematic diagrams 300D-300F of example user interface features in accordance with certain example embodiments. As shown in FIGS. 3D-3F, by way of example but not limitation, schematic diagrams 300D-300F may include one or more example user interface features 310a-310f. More specifically, schematic diagram 300D illustrates example user interface features 310a or 310b that may be implemented at least partially as physical components 316. Schematic diagram 300E illustrates example user interface features 310c or 310d that may be implemented at least partially as virtual components 318. Schematic diagram 300F illustrates example user interface features 310e or 310f that may be implemented at least partially as virtual components 318. Schematic diagrams 300D-300F also illustrate examples of communication modality options 314. However, claimed subject matter is not limited to any particular described embodiments, implementations, examples, etc.

For certain example embodiments, as shown in schematic diagram 300D of FIG. 3D, a user interface feature 310a is illustrated. User interface feature 310a may comprise a dial or knob 316e that enables a user to adjust an intimacy setting 204 (e.g., of FIGS. 2, 3A, and 3B). For an example implementation, intimacy knob 316e may be rotated to any of five different communication modalities A, B, C, D, or E. Each respective communication modality A, B, C, D, or E may be represented by a respective communication modality option 314a. (For the sake of visual clarity, each communication modality option 314 may not be separately identified by reference number in each schematic diagram. For instance, one of five communication modality options 314a is explicitly identified for user interface feature 310a.) Each communication modality may correspond, by way of example but not limitation, to a type of user interaction with a communication device, to a type of user interaction with a communication device for user input interaction or user output interaction, any combination thereof, and so forth.

For certain example embodiments, as shown in schematic diagram 300D of FIG. 3D, a user interface feature 310b is illustrated. User interface feature 310b may comprise a slider 316f that enables a user to adjust an intimacy setting. For an example implementation, slider 316f may be slid to any of three different communication modalities that correspond to different degrees of communicative exposure: a first degree, a second degree, or a third degree. Each communicative exposure degree may be represented by a respective communication modality option 314b. Each communication modality may correspond, by way of example but not limitation, to textual communication, speech communication, video communication at a first resolution, video communication at a second higher resolution, video communication with stereoscopic (e.g., 3D) images, facial video communication, full-body video communication, any combination thereof, and so forth. Although shown and described in terms of a physical component 316, a dial 316e or a slider 316f may additionally or alternatively be implemented as a virtual component 318 (e.g., that is displayed on a screen).

For certain example embodiments, as shown in schematic diagram 300E of FIG. 3E, a user interface feature 310c is illustrated. User interface feature 310c may comprise a display 318b that is separated into user input interaction (e.g., at an upper row) and into user output interaction (e.g., at a lower row). For an example implementation, one or more communication modalities that are presented (e.g., in a menu or arrived via a menu) may be selected for user input interaction or user output interaction via one or more buttons (e.g., "radio-style" buttons, but multiple ones of such buttons may be selected as shown in the lower row). Display 318b may be presented to a user so that a user may adjust input or output communication modalities, which may be represented by one or more communication modality options 314c. By way of example but not limitation, a user may select video, voice, or text. As shown for example user interface feature 310c, a user has selected to provide input to a communication device as text but to accept output from a communication device as video, voice, or text. A user may make such selections if, for instance, a user is at home and may see, hear, read, etc. incoming communicative signals but wishes to limit outgoing communicative signals because the user has not yet made themselves professionally presentable.

For certain example embodiments, as shown in schematic diagram 300E of FIG. 3E, a user interface feature 310d is illustrated. User interface feature 310d may comprise a display 318c that is presented in response to receiving an incoming communication that corresponds to, e.g., a first communication modality. A communication device may ask a user if the user wishes to attempt to continue the communication using one or more communication modality options 314d. For an example implementation, one or more communication modality options 314d may be presented to a user via a scrolling menu as shown. A user may scroll through communication modality options 314d until a desired communication modality option is identified and selected. As shown, a second communication modality option may be highlighted for selection by a user via a touch, a movement of a physical component, some combination thereof, and so forth.

For certain example embodiments, as shown in schematic diagram 300F of FIG. 3F, a user interface feature 310e is illustrated. User interface feature 310e may comprise a display 318d having a pop-up menu that is presented to a user if, by way of example but not limitation, an incoming voice call from a particular person (e.g., "John") is received. A communication device may inquire as to how a user wishes to answer John's incoming voice call. Multiple communication modality options 314e are shown as virtual buttons that may be selected. By way of example but not limitation, available communication modality options may comprise "Voice", "Text", "Video (with Audio)", "Video (with Text)", "Other", and so forth. If a local user selects "Video (with Text)", for instance, a local communication device may answer the voice call and offer to continue the communication with a remote user under a condition that the local user may interact with the local communication device in accordance with video and text (e.g., which might be desired if a local user is currently located in a noisy environment).

For certain example embodiments, as shown in schematic diagram 300F of FIG. 3F, a user interface feature 310f is illustrated. User interface feature 310f may comprise a display 318e having another pop-up menu, which may be presented if a user selects an "Other" button of user interface feature 310e. Multiple communication modality options 314f are shown as virtual buttons that may be selected. By way of example but not limitation, available communication modality options may comprise "Incoming Voice-Outgoing Text", "Incoming Text-Outgoing Voice", and "Incoming Voice-Outgoing Video & Text", and so forth. If a user selects an "Incoming Voice-Outgoing Text" button, for instance, a user may interact with a local device in accordance with voice communications for device output interaction and may interact with the local device in accordance with textual communications for device input interaction.

Multiple different embodiments may additionally or alternatively be implemented. For example, degrees of communicative exposure (e.g., of communication modality options 314b) may be presented as radio-style buttons (e.g., like communication modality options 314c). As another example, display(s) at least similar or analogous to display 318c, 318d, or 318e may be presented to establish at least one intimacy setting 204 prior to arrival of an incoming communication notification. As yet another example, communication modality options 314e (e.g., of user interface feature 310e) or communication modality options 314c (e.g., of user interface feature 310c) may be presented as a slider interface (e.g., as shown in schematic diagram 300D as part of user interface feature 310b). As another example, a user interface feature 310 may be accessible via a widget of a communication device 102. However, claimed subject matter is not limited to any particular described embodiments, implementations, examples, etc.

Figure 4A:
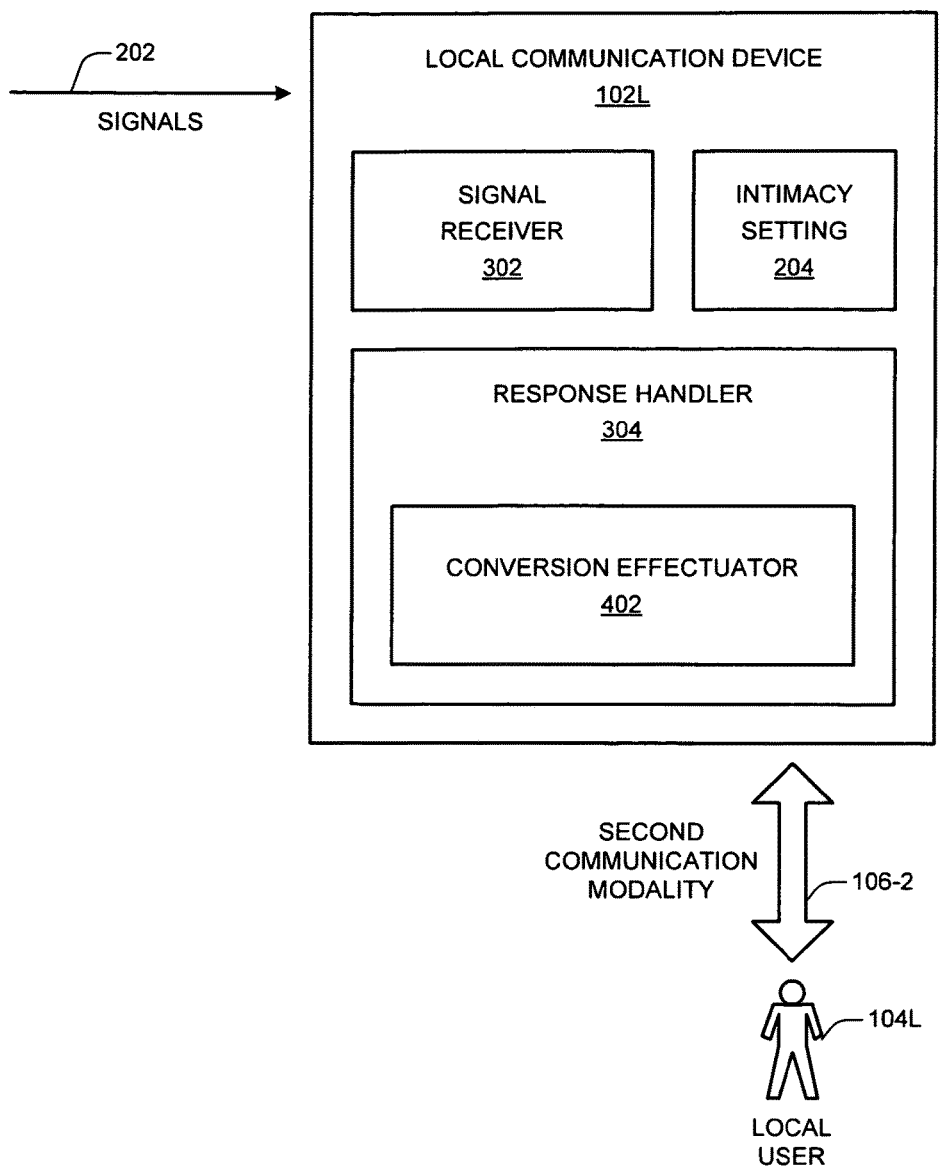
FIG. 4A is schematic diagram of a communication device that may be participating in a communication using an example response handler having a conversion effectuator in accordance with certain example embodiments.

FIG. 4A is schematic diagram 400A of a communication device that may be participating in a communication using an example response handler having a conversion effectuator in accordance with certain example embodiments. As shown in FIG. 4A, by way of example but not limitation, schematic diagram 400A may include a local communication device 102L, a local user 104L, a second communication modality 106-2, or one or more signals 202. More specifically, a local communication device 102L of schematic diagram 400A may include at least one intimacy setting 204, a signal receiver 302, or a response handler 304, which may include a conversion effectuator 402.

For certain example embodiments, a conversion effectuator 402 may cause a conversion of a correspondence with one communication modality to a correspondence with another communication modality. By way of example but not limitation, a conversion effectuator 402 may cause a conversion (e.g., of signals, such as one or more signals 202) from a correspondence with a first communication modality 106-1 to a correspondence with a second communication modality 106-2, may cause a conversion (e.g., of signals derived from user input of local user 104L) from a correspondence with a second communication modality 106-2 to a correspondence with a first communication modality 106-1, some combination thereof, and so forth. Example implementations with respect to a conversion effectuator 402 are described herein below with particular reference to at least FIGS. 4B and 4C. Additional or alternative implementations are described herein below with respect to at least FIGS. 6A-6K.

Figure 4B:
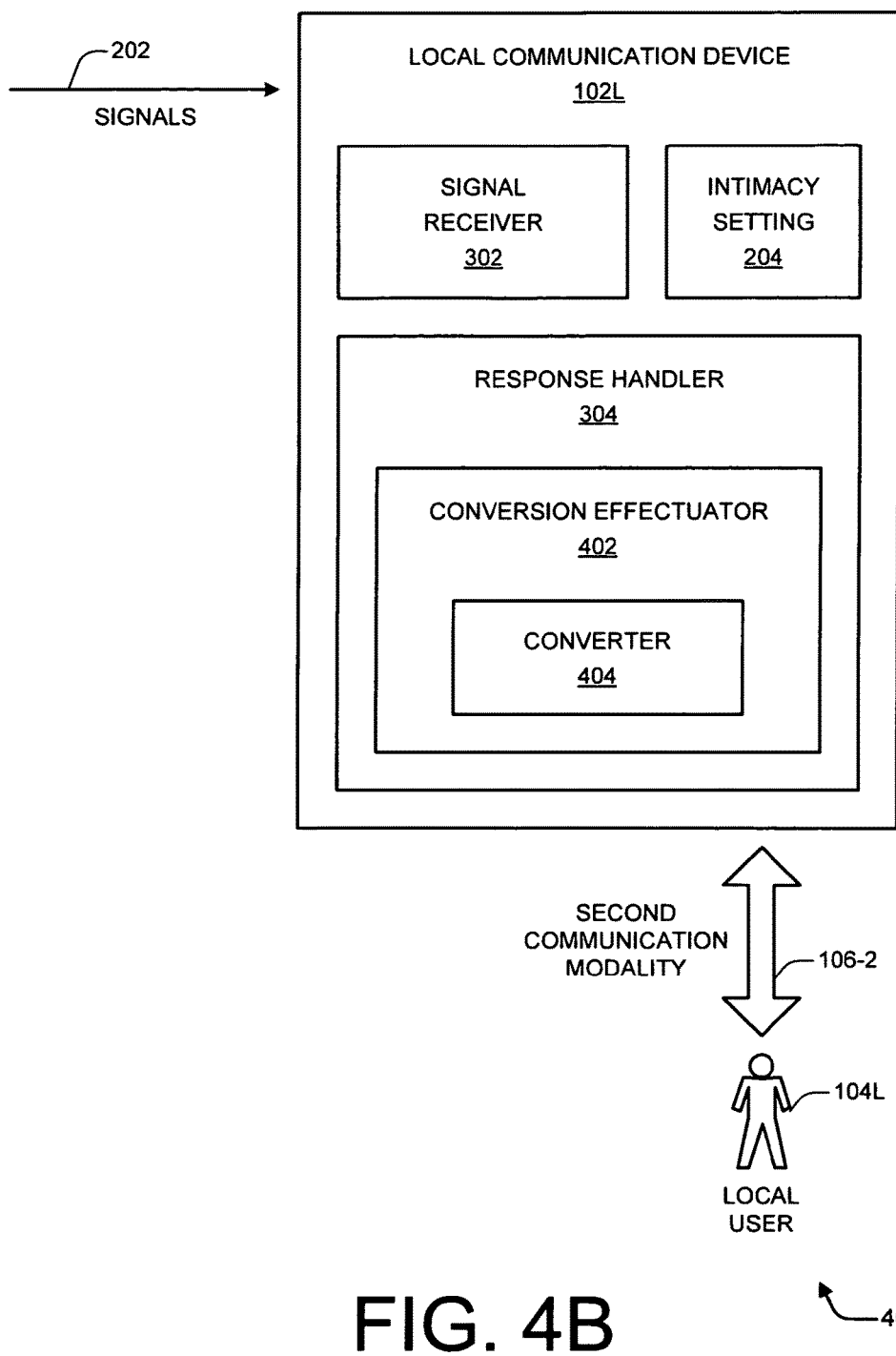
FIG. 4B is schematic diagram of a communication device that may be participating in a communication using an example conversion effectuator having a converter in accordance with certain example embodiments.

FIG. 4B is schematic diagram 400B of a communication device that may be participating in a communication using an example conversion effectuator having a converter in accordance with certain example embodiments. As shown in FIG. 4B, by way of example but not limitation, schematic diagram 400B may include a local communication device 102L that includes at least one intimacy setting 204, a signal receiver 302, or a response handler 304. More specifically, a local communication device 102L of schematic diagram 400B may include a response handler 304 having a conversion effectuator 402, which may include a converter 404.

For certain example embodiments, a converter 404 may perform a conversion of a correspondence with one communication modality to a correspondence with another communication modality. By way of example but not limitation, a converter 404 may perform a conversion (e.g., of signals) from a correspondence with a first communication modality 106-1 to a correspondence with a second communication modality 106-2, may perform a conversion (e.g., of signals) from a correspondence with a second communication modality 106-2 to a correspondence with a first communication modality 106-1, some combination thereof, and so forth. Additional or alternative implementations are described herein.

Figure 4C:
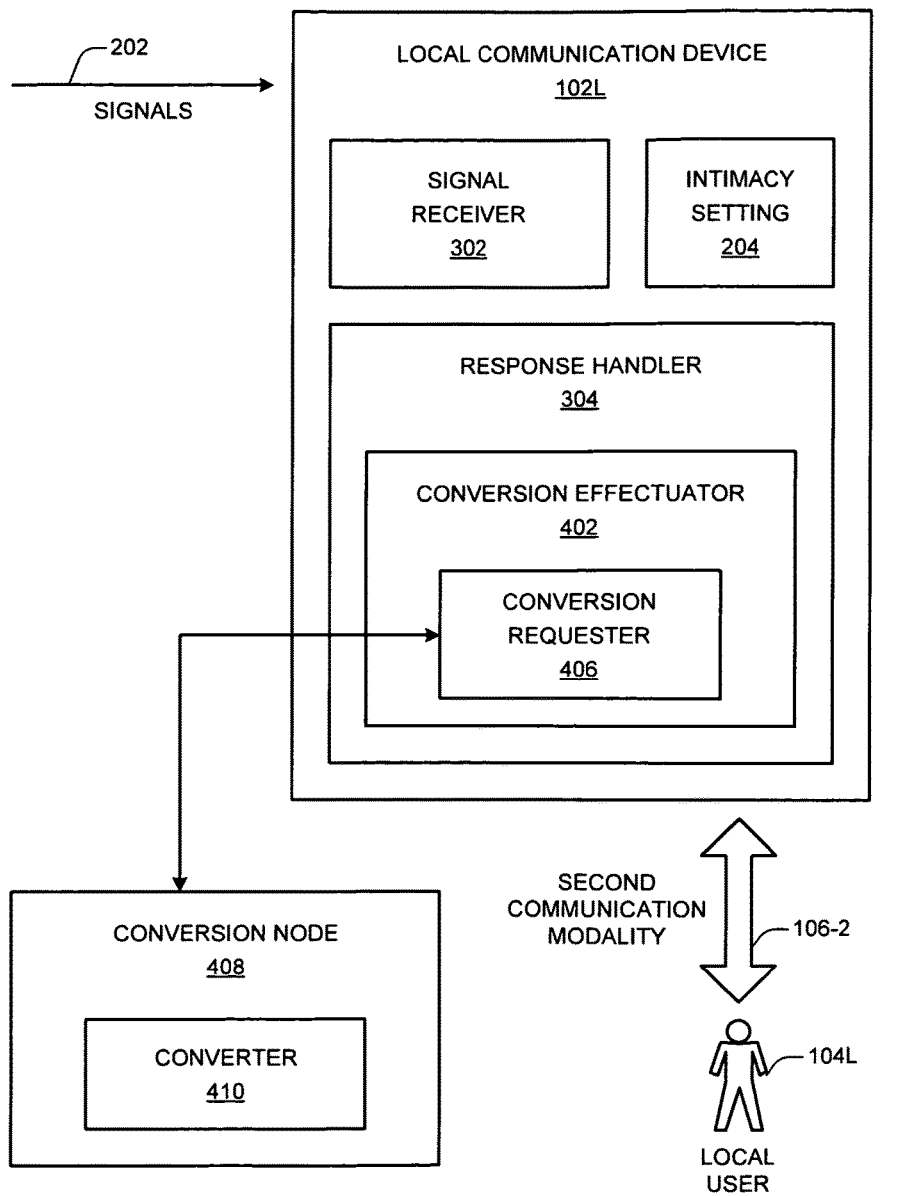
FIG. 4C is schematic diagram of a communication device that may be participating in a communication using an example conversion effectuator having a conversion requester in accordance with certain example embodiments.

FIG. 4C is schematic diagram 400C of a communication device that may be participating in a communication using an example conversion effectuator having a conversion requester in accordance with certain example embodiments. As shown in FIG. 4C, by way of example but not limitation, schematic diagram 400C may include a local communication device 102L that includes at least one intimacy setting 204, a signal receiver 302, or a response handler 304. More specifically, a local communication device 102L of schematic diagram 400C may include a response handler 304 having a conversion effectuator 402, which may include a conversion requester 406. Furthermore, by way of example but not limitation, schematic diagram 400C may include a conversion node 408, which may include a converter 410.

For certain example embodiments, a conversion effectuator 402 may cause a conversion of a correspondence with one communication modality to a correspondence with another communication modality based, at least partly, on one or more interactions with a conversion node 408 using a conversion requester 406. For certain example implementations, a conversion node may be external to local communication device 102L. A conversion node 408 may comprise, by way of example but not limitation, a telecommunications node (e.g., a switch, a router, a gateway, a combination thereof, etc.), an Internet node (e.g., a switch, a router, a server, a server blade, a virtual server machine, a combination thereof, etc.), a local area network (LAN) node, a computer, some combination thereof, and so forth.

For certain example embodiments, conversion requester 406 may transmit one or more signals (e.g., one or more signals 202 or a derivative thereof) corresponding to a first communication modality 106-1 to conversion node 408. Using converter 410, conversion node 408 may perform a conversion (e.g., of signals) from a correspondence with a first communication modality 106-1 to a correspondence with a second communication modality 106-2. Conversion node 408 may transmit one or more signals corresponding to a second communication modality 106-2 to conversion effectuator 402 (e.g., to conversion requester 406) of local communication device 102L. Additionally or alternatively, conversion requester 406 may transmit one or more signals corresponding to a second communication modality 106-2 to conversion node 408. Using converter 410, conversion node 408 may perform a conversion (e.g., of signals) from a correspondence with a second communication modality 106-2 to a correspondence with a first communication modality 106-1. Conversion node 408 may transmit one or more signals corresponding to a first communication modality 106-1 to conversion effectuator 402 (e.g., to conversion requester 406) of local communication device 102L. However, claimed subject matter is not limited to examples as described herein.

FIGS. 4D, 4E, 4F, and 4G depict different example sequence diagrams 400D, 400E, 400F, and 400G, respectively, for example multi-modality communications. As shown, by way of example but not limitation, each sequence diagram may include a remote communication device 102R or a local communication device 102L, as well as multiple actions. Although actions of sequence diagrams 400D, 400E, 400F, and 400G are shown or described in a particular sequence, it should be understood that methods or processes may be performed in alternative manners without departing from claimed subject matter, including, but not limited to, with a different sequence or number of actions, with a different relationship between or among actions, with a different communication device (or node) performing action(s). Also, at least some actions of sequence diagrams 400D, 400E, 400F, and 400G may be performed so as to be fully or partially overlapping with other action(s) in a temporal sense, in a communication sense (e.g., over one or more channels), in a processing sense (e.g., using multiple cores, multitasking, a combination thereof, etc.), some combination thereof, and so forth. By way of example only, a given communication may comprise a fully or partially duplex communication, thereby enabling independent or overlapping transmissions or receptions.

As depicted, by way of example but not limitation, each example multi-modality communication includes a communication that may be initiated by a remote communication device 102R. However, multi-modality communications may alternatively or additionally include communications that may be initiated by a local communication device 102L. As illustrated, by way of example but not limitation, each example multi-modality communication may involve two communication modalities including voice interaction and text interaction. However, multi-modality communications may alternatively or additionally involve two or more communication modalities that include voice interaction, text interaction, video interaction, any combination thereof, and so forth. As shown, by way of example but not limitation, a local communication device 102L, in conjunction with an indication from a local user 104L, may determine that a communication is to be a multi-modality communication at or around when a communication is initiated. However, a remote communication device 102R may additionally or alternatively determine that a communication is to be a multi-modality communication. Furthermore, a communication may be migrated to a multi-modality communication at virtually any time during a communication. Moreover, a communication device may additionally or alternatively initiate a communication as a multi-modality communication.

For certain example embodiments, sequence diagrams 400D, 400E, 400F, and 400G may include one or more transmissions or receptions. Transmissions or receptions may be made, by way of example but not limitation, from or to a remote communication device 102R or from or to a local communication device 102L. A given transmission or reception may be made via any one or more channels 108 (e.g., of FIG. 1). Examples of channels may include, but are not limited to, a voice connection channel, a voice data channel, a voice over internet protocol (VOIP) channel, a packet data channel, a signaling channel, a channel over the Internet, a cellular-text-messaging channel, any combination thereof, and so forth. Additionally or alternatively, although two communication devices are shown as participating in a given communication, more than two communication devices or more than two users may participate in a given communication.

Figure 4D:
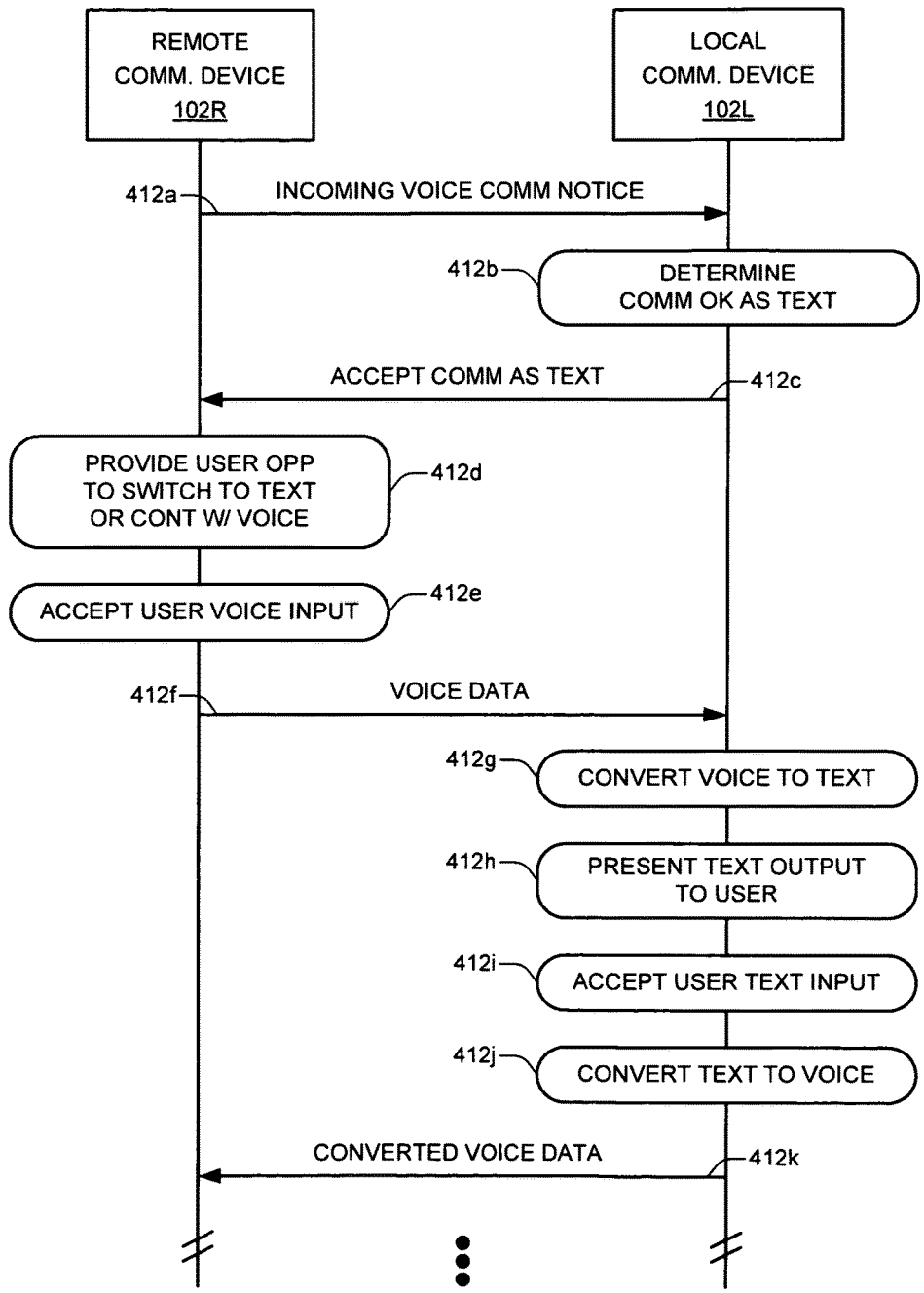
FIG. 4D is a sequence diagram of an example multi-modality communication in which conversion occurs at a local communication device.

FIG. 4D is a sequence diagram 400D of an example multi-modality communication in which conversion occurs at a local communication device. As shown in FIG. 4D, by way of example but not limitation, one or more of actions 412a-412k may be performed for a communication. For an example sequence diagram 400D, a local communication device 102L may cause two conversions to be performed.

For certain example embodiments, at action 412a, a remote communication device 102R may transmit or a local communication device 102L may receive a notification of an incoming communication that corresponds to voice. By way of example but not limitation, a notification may comprise a text message, a ringing signal, a communication inquiry, a communication notice, any combination thereof, and so forth. At action 412b, local communication device 102L may determine that the communication may continue in a manner that is at least partially corresponding to text. For certain example implementations, local communication device 102L may make a determination based, at least partly, on an existing intimacy setting (e.g., on a current default intimacy setting), on a contemporaneous intimacy setting indication provided by local user 104L (e.g., by a local user without prompting, by a local user in response to options presented by a local communication device in conjunction with presentation of a call notification to the local user, some combination thereof, etc.), any combination thereof, and so forth.

For certain example embodiments, at action 412c, a local communication device 102L may transmit or a remote communication device 102R may receive a message indicating that a communication is accepted if it may correspond at least partially to text. At action 412d, a remote communication device 102R may provide a remote user 104R with an opportunity to switch to text (e.g., to establish a single-modality textual communication), with an opportunity to continue a communication with remote user interactivity including voice (e.g., to establish a dual-modality voice and textual communication), with an opportunity to propose a different one or more interactivity-types of communication(s), any combination thereof, and so forth. For certain examples as described herein, with respect to action 412d, it is given that a remote user 104R elects to continue a communication as a multi-modality communication with voice interaction for remote user 104R and (at least partial) textual interaction for local user 104L.

For certain example embodiments, at action 412e, a remote communication device 102R may accept user voice input. For an example implementation, a remote communication device 102R may enable voice interaction with a remote user 104R by accepting voice input via at least one user input interface 516b (e.g., of FIG. 5), such as at least one microphone. At action 412f, a remote communication device 102R may transmit or a local communication device 102L may receive voice data.

For certain example embodiments, at action 412g, a local communication device 102L may cause a conversion of voice data (e.g., as received from a remote communication device 102R) to text data. For an example implementation, a local communication device 102L may cause a conversion from voice data to text data using a converter 404 (e.g., of FIG. 4B), using a conversion requester 406 (e.g., of FIG. 4C) (e.g., that communicates with a conversion node 408 having a converter 410), any combination thereof, and so forth. At action 412h, a local communication device 102L may present text output (e.g., as converted as a result of action 412g) to a local user 104L. For an example implementation, a local communication device 102L may display text to a local user 104L via at least one user output interface 516a (e.g., of FIG. 5), such as at least one display screen. At action 412i, a local communication device 102L may accept user text input. For an example implementation, a local communication device 102L may accept text input from a local user 104L via at least one user input interface 516a, such as a physical or virtual keyboard. A user input interface 516a for accepting text input may alternatively or additionally comprise a text message application, a text message module of an operating system, a general text entry application, a general text entry module of an operation system, a specialized text entry application, a specialized text entry module of operating system, any combination thereof, and so forth. A specialized text entry application or operating system module may, by way of example but not limitation, be linked to a voice capability (e.g., a calling feature) or video capability or be designed at least partially to implement multi-modality communications in accordance with certain embodiments that are described herein.

For certain example embodiments, at action 412j, a local communication device 102L may cause text data of accepted text to be converted to voice data. For an example implementation, a local communication device 102L may cause a conversion from text to voice using a converter 404 (e.g., of FIG. 4B), using a conversion requester 406 (e.g., of FIG. 4C), any combination thereof, and so forth. At action 412k, a local communication device 102L may transmit or a remote communication device 102R may receive converted voice data. A remote communication device 102R may present the converted voice data (e.g., play the voice data over one or more speakers) in accordance with a voice communication modality of interaction by remote user 104R at remote communication device 102R.

Figure 4E:
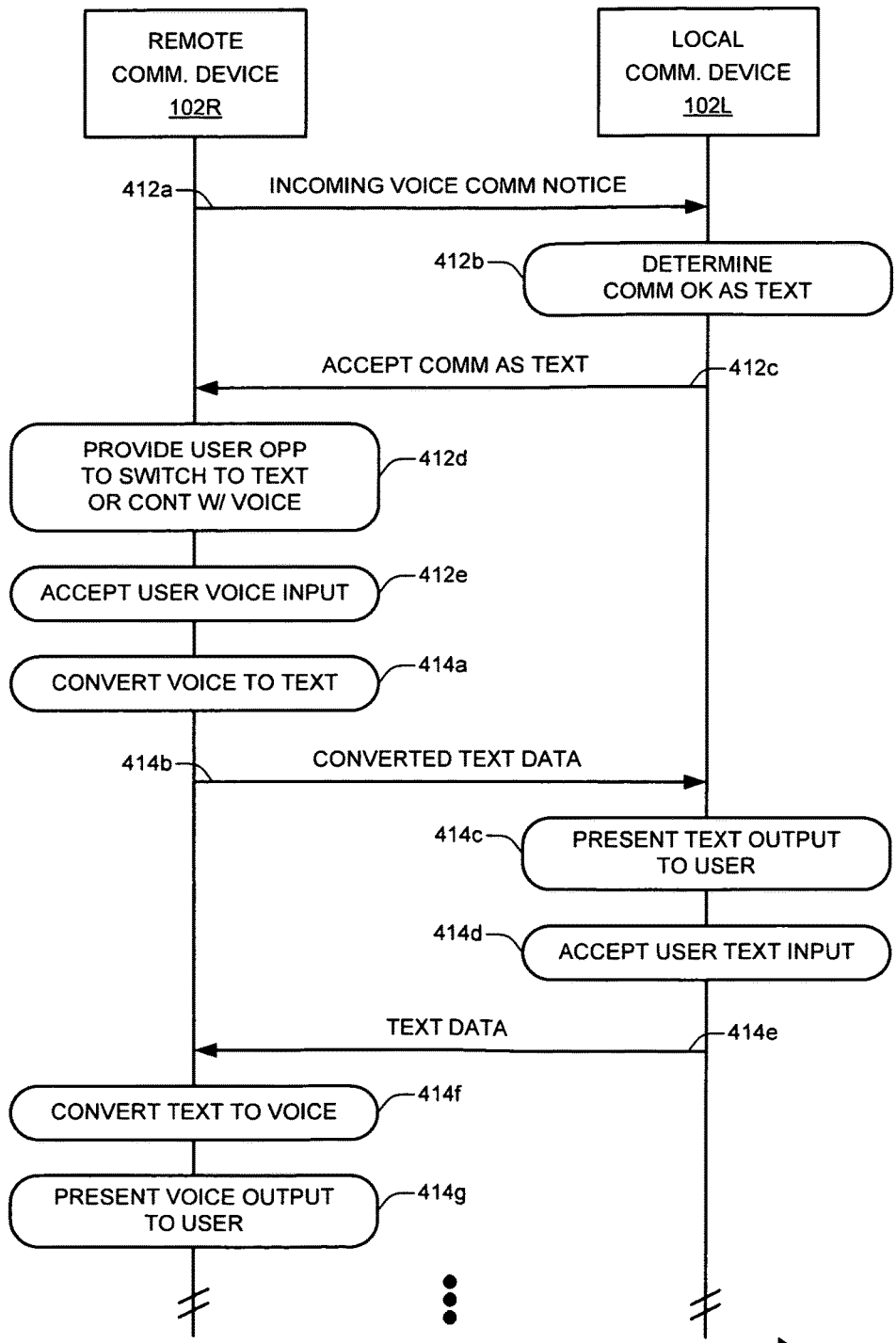
FIG. 4E is a sequence diagram of an example multi-modality communication in which conversion occurs at a remote communication device.

FIG. 4E is a sequence diagram 400E of an example multi-modality communication in which conversion occurs at a remote communication device. As shown in FIG. 4E, by way of example but not limitation, one or more of actions 412a-412e or 414a-414g may be performed for a communication. For an example sequence diagram 400E, a remote communication device 102R may cause two conversions to be performed. Actions 412a-412e of sequence diagram 400E may be at least similar or analogous to actions 412a-412e, respectively, of sequence diagram 400D.

For certain example embodiments, at action 412e, a remote communication device 102R may accept user voice input. For an example implementation, a remote communication device 102R may enable voice interaction with a remote user 104R by accepting voice input via at least one user input interface 516a (e.g., of FIG. 5), such as at least one microphone. At action 414a, a remote communication device 102R may cause a conversion of voice data (e.g., as accepted from a remote user 104R) to text data. For an example implementation, a remote communication device 102R may cause a conversion using a converter 404 (e.g., of FIG. 4B), using a conversion requester 406 (e.g., of FIG. 4C), any combination thereof, and so forth.

For certain example embodiments, at action 414b, a remote communication device 102R may transmit or a local communication device 102L may receive converted text data. At action 414c, a local communication device 102L may present text output to a local user 104L. For an example implementation, a local communication device 102L may display converted text to a local user 104L via at least one user output interface 516b (e.g., of FIG. 5), such as at least one display screen, wherein the converted text was caused to be converted from voice data by a remote communication device 102R. A user output interface 516b for presenting text output may alternatively or additionally comprise a text message application, a text message module of an operating system, a general text output application, a general text output module of an operation system, a specialized text output application, a specialized text output module of operating system, any combination thereof, and so forth. A specialized text output application or operating system module may, by way of example but not limitation, be linked to a voice capability (e.g., a calling feature) or video capability or be designed at least partially to implement multi-modality communications in accordance with certain embodiments that are described herein. A user input interface 516a for accepting text input may be separate from or fully or partially combined with a user output interface 516b for presenting text output. At action 414d, a local communication device 102L may accept user text input. At action 414e, a local communication device 102L may transmit or a remote communication device 102R may receive text data.

For certain example embodiments, at action 414f, a remote communication device 102R may cause received text data to be converted to voice data. For an example implementation, a remote communication device 102R may cause a conversion from text to voice using a converter 404 (e.g., of FIG. 4B), using a conversion requester 406 (e.g., of FIG. 4C), any combination thereof, and so forth. At action 414g, a remote communication device 102R may present voice data (e.g., as converted from received text data as a result of action 414f) to a remote user 104R. For an example implementation, a remote communication device 102R may present voice data as converted from text data to a remote user 104R via at least one user output interface 516b (e.g., of FIG. 5), such as at least one speaker.

For certain example implementations, e.g.—as described with reference to sequence diagram 400E, text data is transmitted between remote communication device 102R and local communication device 102L. Text data may consume less bandwidth than voice data (or less than video data). Generally, transmission of data corresponding to one type of communication modality may consume less bandwidth than transmission of data corresponding to another type of communication modality. Accordingly, a determination or selection of a location or a communication device at which to perform a conversion of data corresponding to one communication modality to data corresponding to another communication modality may be based, at least in part, on a bandwidth consumed by data of each communication modality. By way of example but not limitation, a location or communication device for conversion may be determined or selected such that relatively lower bandwidth data is transmitted.

Figure 4F:
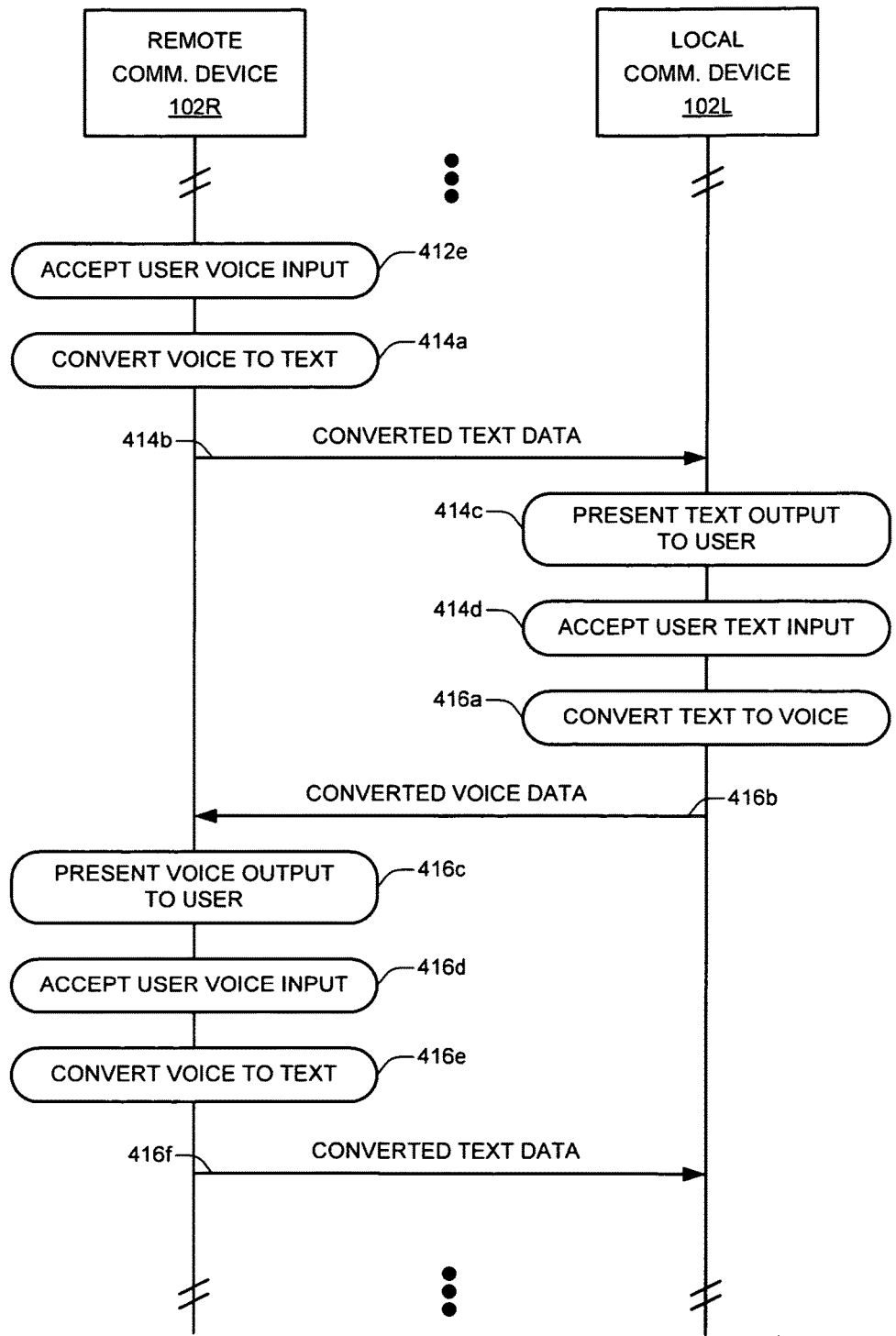
FIG. 4F is a sequence diagram of an example multi-modality communication in which conversion occurs at a local communication device and at a remote communication device.

FIG. 4F is a sequence diagram 400F of an example multi-modality communication in which conversion occurs at a local communication device and at a remote communication device. As shown in FIG. 4F, by way of example but not limitation, one or more of actions 412a-412e, 414a-414d, or 416a-416f may be performed for a communication. For an example sequence diagram 400F, a remote communication device 102R may cause a conversion to be performed, and a local communication device 102L may cause a conversion to be performed. Action 412e (plus actions 412a-412d, which are not shown in FIG. 4F for the sake of clarity) of sequence diagram 400E and actions 414a-414d may be at least similar or analogous to actions 412e (plus 412a-412d) of sequence diagram 400D and actions 414a-414d of sequence diagram 400E, respectively.

For certain example embodiments, at action 414a, a remote communication device 102R may cause a conversion of voice data (e.g., as accepted from a remote user 104R at action 412e) to text data. At action 414b, a remote communication device 102R may transmit or a local communication device 102L may receive converted text data. At action 414c, a local communication device 102L may present text data as text output to a local user 104L, which text data may comprise converted text data that was caused to be converted from voice data by another communication device, such as a remote communication device 102R. At action 414d, a local communication device 102L may accept user text input. At action 416a, a local communication device 102L may cause text data of accepted text to be converted to voice data. At action 416b, a local communication device 102L may transmit or a remote communication device 102R may receive converted voice data.

For certain example embodiments, at action 416c, a remote communication device 102R may present voice data as voice output to a remote user 104R, which voice data may comprise converted voice data that was caused to be converted by another communication device, such as local communication device 102L. At action 416d, a remote communication device 102R may accept user voice input. At action 416e, a remote communication device 102R may cause a conversion of voice data (e.g., as accepted from a remote user 104R) to text data. At action 416f, a remote communication device 102R may transmit or a local communication device 102L may receive converted text data.

Figure 4G:
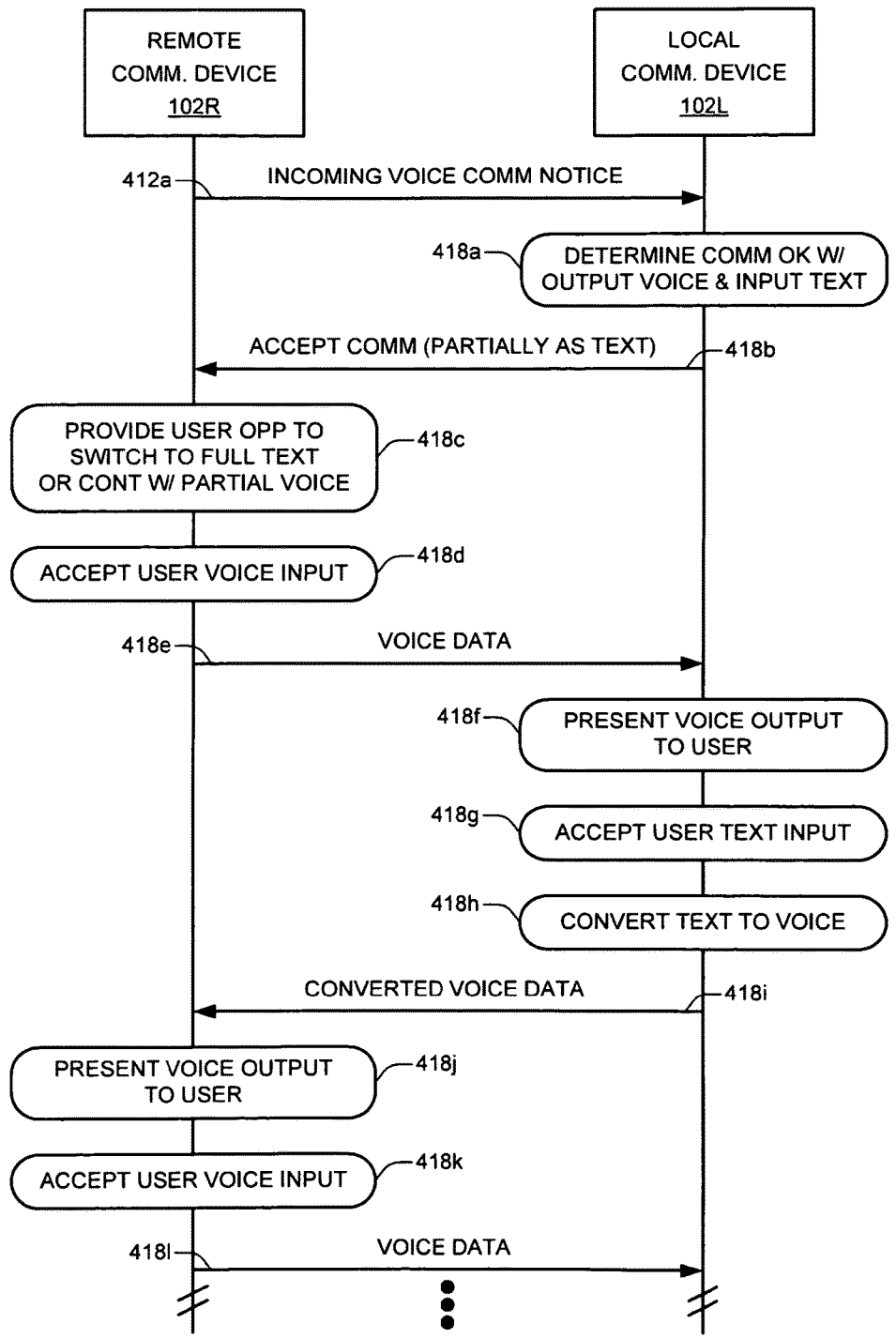
FIG. 4G is a sequence diagram of an example multi-modality communication in which conversion occurs at a local communication device and in which a multi-modality input/output interaction occurs at the local communication device.

FIG. 4G is a sequence diagram 400G of an example multi-modality communication in which conversion occurs at a local communication device and in which a multi-modality input/output interaction occurs at the local communication device. As shown in FIG. 4G, by way of example but not limitation, one or more of actions 412a or 418a-418k may be performed for a communication. For an example sequence diagram 400G, a local communication device 102L may cause a conversion to be performed.

Action 412*a* of sequence diagram 400G may be at least similar or analogous to action 412*a* of sequence diagram 400D.

For certain example embodiments, at action 412*a*, a remote communication device 102R may transmit or a local communication device 102L may receive a notification of an incoming communication that corresponds to voice. At action 418*a*, local communication device 102L may determine that the communication may continue as at least partially corresponding to text. For certain example implementations, local communication device 102L may make a determination based, at least partly, on an existing intimacy setting (e.g., a current default intimacy setting), on a contemporaneous intimacy setting indication provided by local user 104L (e.g., by a local user without prompting, by a local user in response to options presented by a local communication device in conjunction with presentation of a call notification to the local user, some combination thereof, etc.), any combination thereof, and so forth.

For certain example embodiments, at least one user may engage in a multi-modality communication in which a user interacts with a communication device using two (or more) different communication modalities. For certain example implementations, a user may select to interact with a communication device via voice for input and via text for output. For instance, a user may speak to provide user voice input, but a user may read to acquire user text output for a single communication. As shown for an example of sequence diagram 400G, a user has instead selected for user output interaction to comprise voice and for user input interaction to comprise text. This may occur, for instance, if a user having a wireless or wired headset is located in an environment in which quiet is expected, such as a library or "quiet car" of a train. For a given communication, a user may be presented voice data output (e.g., may hear voice sounds) from another participant of the given communication, but may provide text input that is ultimately sent to the other participant (e.g., before or after conversion, if any, from text data to voice data).

For certain example embodiments, at action 418*b*, a local communication device 102L may transmit or a remote communication device 102R may receive a message indicating that a communication is accepted if it may correspond at least partially to text. For an example implementation, a message may indicate that a local user 104L intends to continue a communication by interacting with local communication device 102L via voice for user output and via text for user input. At action 418*c*, a remote communication device 102R may provide a remote user 104R with an opportunity to switch to full or partial text (e.g., to request to establish a single-modality textual communication, to establish that remote user 104R is willing to receive text output thereby obviating a conversion), with an opportunity to continue a communication with remote user interactivity including voice (e.g., to accept a multi-modality communication in which remote user 104R provides user input interaction via voice and accepts user output interaction via converted voice data), with an opportunity to propose a different one or more interactivity-types of communication(s), any combination thereof, and so forth. For certain examples described herein with respect to action 418*c*, it is given that a remote user 104R elects to continue a communication as a multi-modality communication with (i) voice input and voice output interaction for remote user 104R and (ii) textual input and voice output interaction for local user 104L.

For certain example embodiments, at action 418*d*, a remote communication device 102R may accept user voice input. At action 418*e*, a remote communication device 102R may transmit or a local communication device 102L may receive voice data. At action 418*f*, a local communication device 102L may present voice data to a local user 104L. For an example implementation, a local communication device 102L may present voice data (e.g., without conversion) to a local user 104L via at least one user output interface 516*b* (e.g., of FIG. 5), such as at least one speaker, including but not limited to a speaker of a headset. At action 418*g*, a local communication device 102L may accept user text input. For an example implementation, a local communication device 102L may accept text input from a local user 104L via at least one user input interface 516*a*, such as a physical or virtual keyboard. At action 418*h*, a local communication device 102L may cause text data of accepted text to be converted to voice data.

For certain example embodiments, at action 418*i*, a local communication device 102L may transmit or a remote communication device 102R may receive converted voice data. At action 418*j*, a remote communication device 102R may present voice data to a remote user 104R, which voice data may comprise converted voice data that was caused to be converted by another communication device, such as local communication device 102L. Additionally or alternatively, local communication device 102L may transmit (unconverted) text data to remote communication device 102R, and remote communication device 102R may cause text data to be converted to voice data prior to its presentation to remote user 104R. At action 418*k*, a remote communication device 102R may accept user voice input. At action 418*i*, a remote communication device 102R may transmit or a local communication device 102L may receive voice data.

For certain example embodiments, a communication may be initiated (e.g., by a remote communication device 102R or a local communication device 102L or another communication device) that is to be a multi-modality communication from a perspective of an initiating user or device alone. By way of example but not limitation, a remote user 104R of a remote communication device 102R may initiate a communication in which interaction by remote user 104R is to comprise text output interaction and voice input interaction (e.g., if a remote user 104R is located in a noisy environment and possesses noise canceling microphone(s) but no noise canceling speaker). By way of example but not limitation, a remote user 104R of a remote communication device 102R may instead initiate a communication in which interaction by remote user 104R is to comprise voice output interaction and text input interaction (e.g., remote user 104R is to receive voice output from a remote communication device 102R via at least one speaker but is to provide text input for a remote communication device 102R via at least one keyboard). For certain example implementations, a remote user 104R may initiate a voice communication and then subsequently send a message to migrate the voice communication to a multi-modality communication in which text is used for at least one of user input interaction or user output interaction for at least interaction by remote user 104R with remote communication device 102R. However, claimed subject matter is not limited to any particular example embodiments, implementations, etc. that are described herein or illustrated in the accompanying drawings (e.g., including but not limited to FIGS. 4D-4G).

Figure 5:
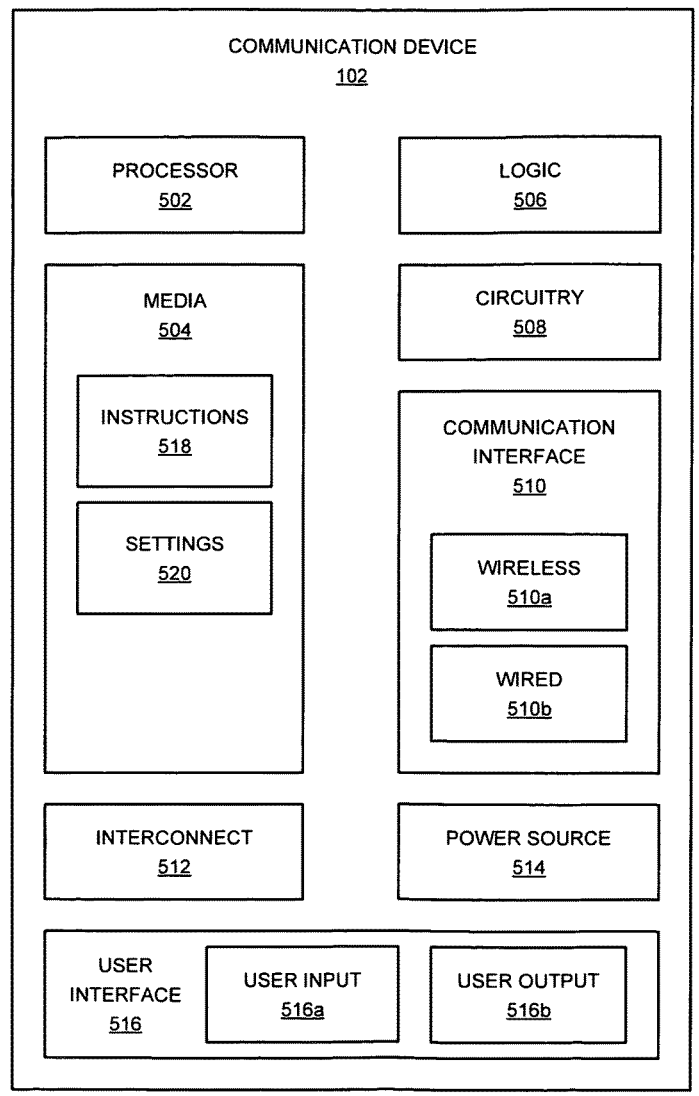
FIG. 5 is a schematic diagram of an example communication device including one or more example components in accordance with certain example embodiments.

FIG. 5 is a schematic diagram 500 of an example communication device including one or more example components in accordance with certain example embodiments. As shown in FIG. 5, a communication device 102 may include one or more components such as: at least one processor 502, one or more media 504, logic 506, circuitry 508, at least one communication interface 510, at least one interconnect 512, at least one power source 514, or at least one user interface 516, any combination thereof, and so forth. Furthermore, as shown in schematic diagram 500, one or more media may comprise one or more instructions 518, one or more settings 520, some combination thereof, and so forth; communication interface 510 may comprise at least one wireless communication interface 510a, at least one wired communication interface 510b, some combination thereof, and so forth; or user interface 516 may comprise at least one user input interface 516a, at least one user output interface 516b, some combination thereof, and so forth. However, a communication device 102 may alternatively include more, fewer, or different components from those that are illustrated without deviating from claimed subject matter.

For certain example embodiments, a communication device 102 may include or comprise at least one electronic device. Communication device 102 may comprise, for example, a computing platform or any electronic device having at least one processor or memory. Processor 502 may comprise, by way of example but not limitation, any one or more of a general-purpose processor, a specific-purpose processor, a digital signal processor (DSP), a processing unit, a combination thereof, and so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, a combination thereof, and so forth. Media 504 may bear, store, contain, provide access to, a combination thereof, etc. instructions 518, which may be executable by processor 502. Instructions 518 may comprise, by way of example but not limitation, a program, a module, an application or app (e.g., that is native, that runs in a browser, that runs within a virtual machine, a combination thereof, etc.), an operating system, etc. or portion thereof; operational data structures; processor-executable instructions; code; or any combination thereof; and so forth. Media 504 may comprise, by way of example but not limitation, processor-accessible or non-transitory media that is capable of bearing instructions, settings, a combination thereof, and so forth.

For certain example embodiments, execution of instructions 518 by one or more processors 502 may transform communication device 102 into a special-purpose computing device, apparatus, platform, or any combination thereof, etc. Instructions 518 may correspond to, for example, instructions that are capable of realizing at least a portion of one or more flow diagrams methods, processes, operations, functionality, technology, or mechanisms, etc. that are described herein or illustrated in the accompanying drawings. Settings 520 may comprise, by way of example but not limitation, one or more indicators that may be established by a user or other entity, one or more indicators that may determine at least partly how a communication device 102 is to operate or respond to situations, one or more indicators or other values that may be used to realize flow diagrams, methods, processes, operations, functionality, technology, or mechanisms, etc. that are described herein or illustrated in the accompanying drawings.

For certain example embodiments, logic 506 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings. Circuitry 508 may comprise hardware, software, firmware, discrete/fixed logic circuitry, any combination thereof, etc. that is capable of performing or facilitating performance of methods, processes, operations, functionality, technology, or mechanisms, etc. that are described herein or illustrated in the accompanying drawings, wherein circuitry 508 comprises at least one physical or hardware component or aspect.

For certain example embodiments, one or more communication interfaces 510 may provide one or more interfaces between communication device 102 and another device or a person/operator. With respect to a person/operator, a communication interface 510 may include, by way of example but not limitation, a screen, a speaker, a keyboard or keys, or other person-device input/output features. A communication interface 510 may also or alternatively include, by way of example but not limitation, a transceiver (e.g., transmitter or receiver), a radio, an antenna, a wired interface connector or other similar apparatus (e.g., a universal serial bus (USB) connector, a proprietary connector, a Thunderbolt® or Light Peak® connector, a combination thereof, etc.), a physical or logical network adapter or port, or any combination thereof, etc. to communicate wireless signals or wired signals via one or more wireless communication links or wired communication links, respectively. Communications with at least one communication interface 510 may enable transmitting, receiving, or initiating of transmissions, just to name a few examples.

For certain example embodiments, at least one interconnect 512 may enable signal communication between or among components of communication device 102. Interconnect 512 may comprise, by way of example but not limitation, one or more buses, channels, switching fabrics, or combinations thereof, and so forth. Although not explicitly illustrated in FIG. 5, one or more components of communication device 102 may be coupled to interconnect 512 via a discrete or integrated interface. By way of example only, one or more interfaces may couple a communication interface 510 or a processor 502 to at least one interconnect 512. At least one power source 514 may provide power to components of communication device 102. Power source 514 may comprise, by way of example but not limitation, a battery, a power connector, a solar power source or charger, a mechanical power source or charger, a fuel source, any combination thereof, and so forth.

For certain example embodiments, a user interface 516 may enable one or more users to interact with communication device 102. Interactions between a user and device may relate, by way of example but not limitation, to touch/tactile/feeling/haptic sensory (e.g., a user may shake or move a device which may be detected by a gyroscope, an accelerometer, a compass, a combination thereof, etc; a user may press a button, slide a switch, rotate a knob, etc.; a user may touch a touch-sensitive screen; a device may vibrate; some combination thereof; etc.), to sound/hearing/speech sensory (e.g., a user may speak into a microphone, a device may generate sounds via a speaker, some combination thereof, etc.), to sights/vision sensory (e.g., a device may activate one or more lights, modify a display screen, a combination thereof, etc.), any combination thereof, and so forth.

For certain example embodiments, a user interface 516 may comprise a user interface input 516a, a user output interface 516b, a combination thereof, and so forth. A user input interface 516a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, any combination thereof, and so forth. A user output interface 516b may comprise, by way of example but not limitation, a speaker, a screen (e.g., with or without touch-sensitivity), a vibrating haptic feature, any combination thereof, and so forth. Certain user interfaces 516 may enable both user input and user output. For example, a touch-sensitive screen may be capable of providing user output and accepting user input. Additionally or alternatively, a user interface component (e.g., that may be integrated with or separate from a communication device 102), such as a headset that has a microphone and a speaker, may enable both user input and user output.

It should be understood that for certain example implementations components illustrated separately in FIG. 5 are not necessarily separate or mutually exclusive. For example, a given component may provide multiple functionalities. By way of example only, a single component such as a USB connector may function as a wired communication interface 510b and a power source 514. Additionally or alternatively, a single component such as a display screen may function as a communication interface 510 with a user, as a user input interface 516a, or as a user output interface 516b. Additionally or alternatively, one or more instructions 518 may function to realize at least one setting 520.

It should also be understood that for certain example implementations components illustrated in schematic diagram 500 or described herein may not be integral or integrated with a communication device 102. For example, a component may be removably connected to a communication device 102, a component may be wirelessly coupled to a communication device 102, any combination thereof, and so forth. By way of example only, instructions 518 may be stored on a removable card having at least one medium 504. Additionally or alternatively, a user interface 516 (e.g., a wired or wireless headset, a screen, a video camera, a keyboard, a combination thereof, etc.) may be coupled to communication device 102 wirelessly or by wire. For instance, a user may provide user input or accept user output corresponding to a voice communication modality to or from, respectively, a communication device 102 via a wireless (e.g., a Bluetooth®) headset.

FIG. 6A is a flow diagram 600A illustrating an example method for a communication device that may be participating in a communication involving two communication modalities in accordance with at least one example intimacy setting, in accordance with certain example embodiments. As illustrated, flow diagram 600A may include any of operations 602-604. Although operations 602-604 are shown or described in a particular order, it should be understood that methods may be performed in alternative manners without departing from claimed subject matter, including, but not limited to, with a different order or number of operations or with a different relationship between or among operations. Also, at least some operations of flow diagram 600A may be performed so as to be fully or partially overlapping with other operation(s).

For certain example embodiments, a method for handling a communication may be at least partially implemented using hardware and may comprise an operation 602 or an operation 604. An operation 602 may be directed at least partially to receiving one or more signals corresponding to a first communication modality. By way of example but not limitation, a local communication device 102L may receive one or more signals 202 corresponding to a first communication modality 106-1. An operation 604 may be directed at least partially to responding to the one or more signals corresponding to the first communication modality based at least partly on user interaction via a second communication modality in accordance with at least one intimacy setting. By way of example but not limitation, a local communication device 102L may respond to one or more signals 202 corresponding to first communication modality 106-1 based at least partly on local user 104L interaction via a second communication modality 106-2 in accordance with at least one intimacy setting 204. However, claimed subject matter is not limited to any particular described embodiments, implementations, examples, etc.

Figure 6B:
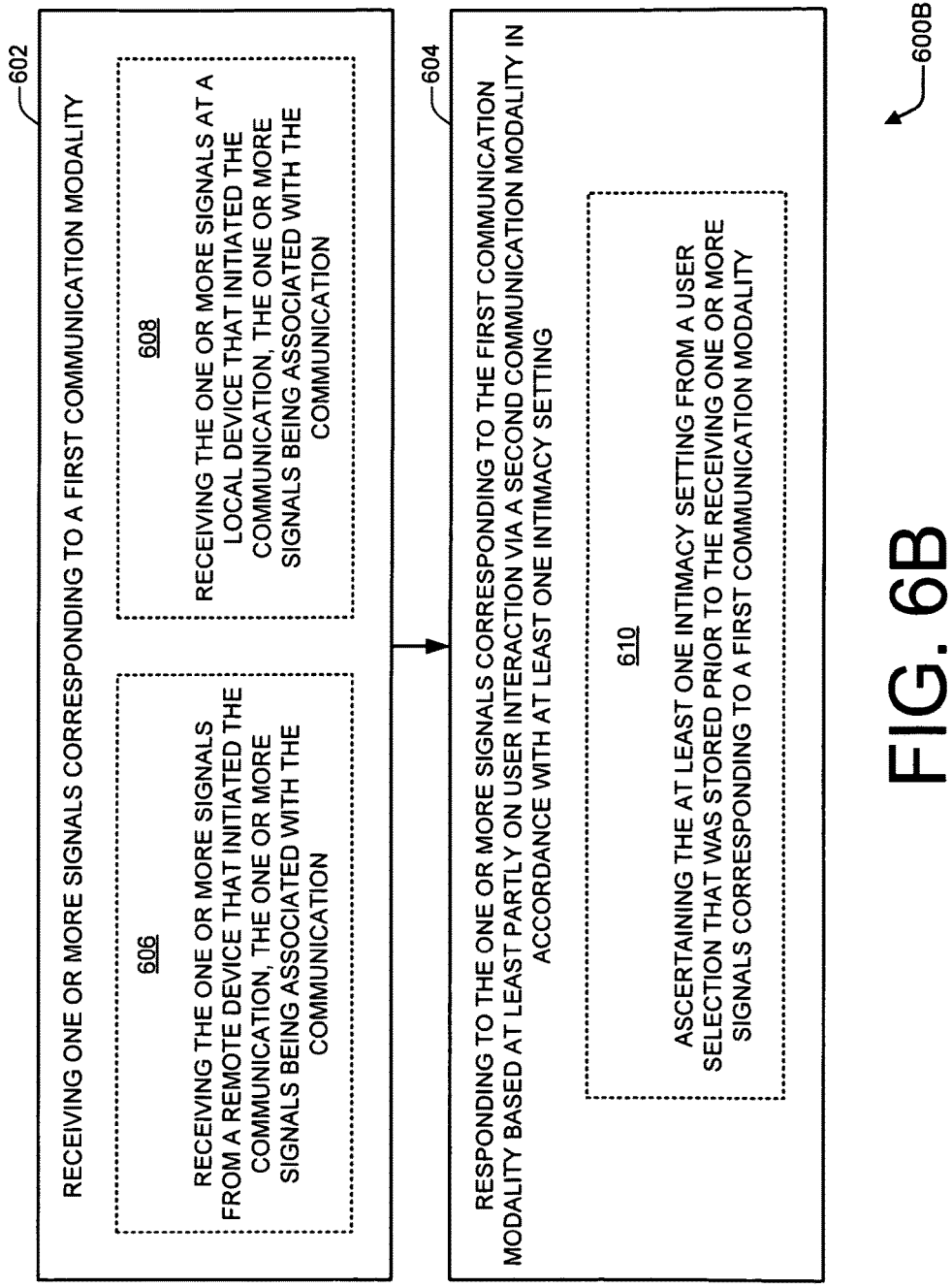
FIGS. 6B-6K depict example alternatives for a flow diagram of FIG. 6A in accordance with certain example embodiments.

FIGS. 6B-6K depict example alternatives for a flow diagram of FIG. 6A in accordance with certain example embodiments. As illustrated, flow diagrams of FIGS. 6B-6K may include any of the illustrated or described operations. Although operations are shown or described in a particular order, it should be understood that methods may be performed in alternative manners without departing from claimed subject matter, including, but not limited to, with a different order or number of operations or with a different relationship between or among operations. Also, at least some operations of flow diagrams of FIGS. 6B-6K may be performed so as to be fully or partially overlapping with other operation(s).

FIG. 6B illustrates example operations 606, 608, and 610. For certain example embodiments, an operation 606 may be directed at least partially to wherein the receiving one or more signals corresponding to a first communication modality comprises receiving the one or more signals from a remote device that initiated the communication, the one or more signals being associated with the communication. By way of example but not limitation, a local communication device 102L may receive one or more signals 202 from a remote communication device 102R that initiated the communication, with the one or more signals 202 being associated with the communication. For an example implementation, a remote user 104R using a remote communication device 102R may initiate a voice or text communication with a local user 104L using a local communication device 102L. However, claimed subject matter is not limited to any particular described embodiments, implementations, examples, etc.

For certain example embodiments, an operation 608 may be directed at least partially to wherein the receiving one or more signals corresponding to a first communication modality comprises receiving the one or more signals at a local device that initiated the communication, the one or more signals being associated with the communication. By way of example but not limitation, a local communication device 102L may receive one or more signals 202 in which the local communication device 102L initiated the communication, with the one or more signals 202 being associated with the communication. For an example implementation, a local user 104L using a local communication device 102L may initiate a voice or text communication with a remote user 104R using a remote communication device 102R. However, claimed subject matter is not limited to any particular described embodiments, implementations, examples, etc.

For certain example embodiments, an operation 610 may be directed at least partially to wherein the responding to the one or more signals corresponding to the first communication modality based at least partly on user interaction via a second communication modality in accordance with at least one intimacy setting comprises ascertaining the at least one intimacy setting from a user selection that was stored prior to the receiving one or more signals corresponding to a first communication modality. By way of example but not limitation, a local communication device 102L may ascertain at least one intimacy setting 204 from a user selection that was stored prior to the receiving one or more signals corresponding to a first communication modality. For an example implementation, prior to a communication being initiated or prior to receipt of one or more signals 202, a user may interact with a local communication device 102L via a user input interface 516a to select at least one intimacy setting 204, and local communication device 102L may store a selected communication modality 106 as an at least one intimacy setting 204. However, claimed subject matter is not limited to any particular described embodiments, implementations, examples, etc.

Figure 6C:
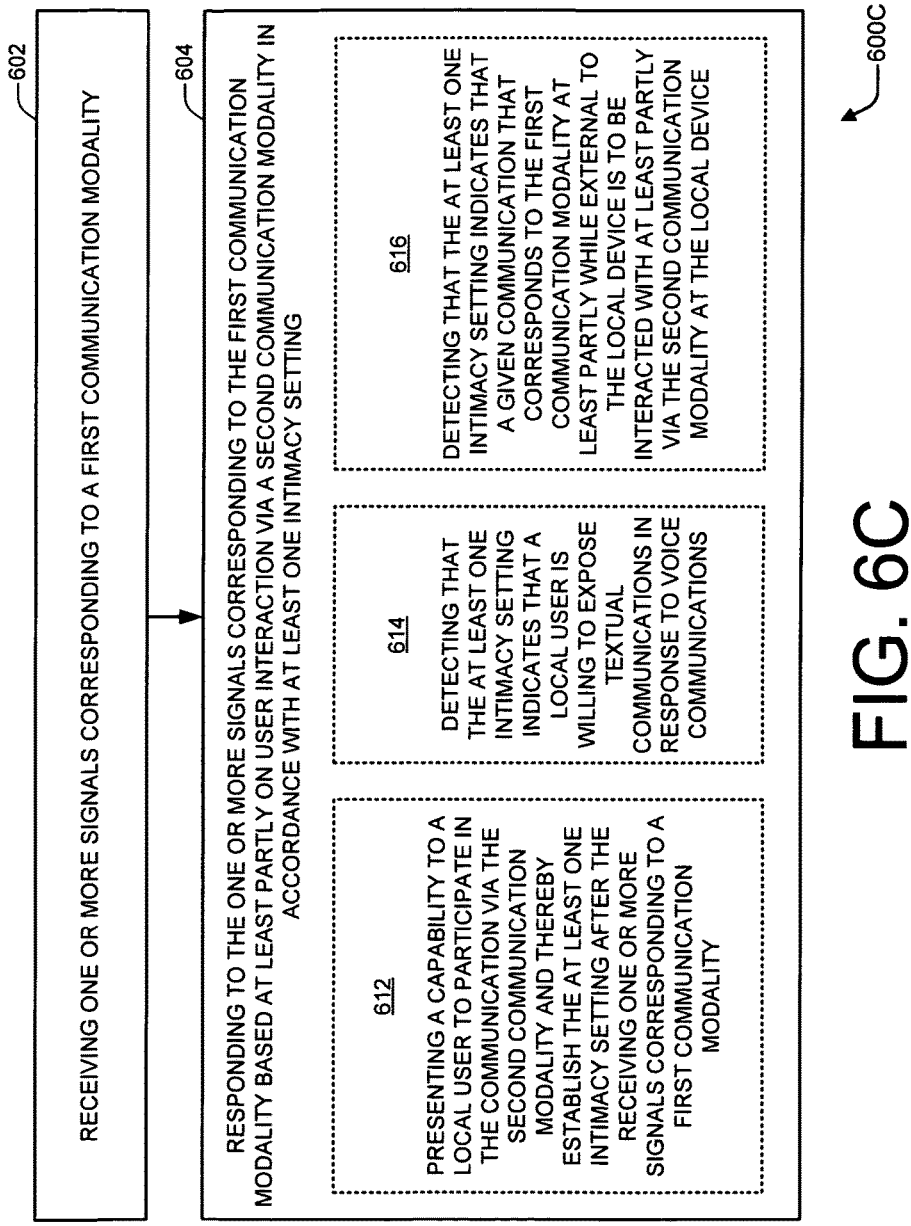

FIG. 6C illustrates example operations 612, 614, and 616. For certain example embodiments, an operation 612 may be directed at least partially to wherein the responding to the one or more signals corresponding to the first communication modality based at least partly on user interaction via a second communication modality in accordance with at least one intimacy setting comprises presenting a capability to a local user to participate in the communication via the second communication modality and thereby establish the at least one intimacy setting after the receiving one or more signals corresponding to a first communication modality. By way of example but not limitation, a local communication device 102L may present a capability to a local user 104L to participate in a communication via a second communication modality 106-2 and thereby establish at least one intimacy setting 204 after the receiving one or more signals corresponding to a first communication modality. For an example implementation, as a communication is initiated or during a communication, a local communication device 102L may present to a local user 104L via a user output interface 516b an opportunity to participate in the communication via a second communication modality 106-2. However, claimed subject matter is not limited to any particular described embodiments, implementations, examples, etc.

For certain example embodiments, an operation 614 may be directed at least partially to wherein the responding to the one or more signals corresponding to the first communication modality based at least partly on user interaction via a second communication modality in accordance with at least one intimacy setting comprises detecting that the at least one intimacy setting indicates that a local user is willing to expose textual communications in response to voice communications. By way of example but not limitation, a local communication device 102L may detect that at least one intimacy setting 124 indicates that a local user 104L is willing to expose textual communications in response to voice communications. For example, a local communication device 102L may detect based at least partially on at least one intimacy setting 204 that an incoming voice call is to be responded to using textual input accepted from a local user 104L. However, claimed subject matter is not limited to any particular described embodiments, implementations, examples, etc.

For certain example embodiments, an operation 616 may be directed at least partially to a situation in which at least one intimacy setting is associated with a local device; and wherein the responding to the one or more signals corresponding to the first communication modality based at least partly on user interaction via a second communication modality in accordance with at least one intimacy setting comprises detecting that the at least one intimacy setting indicates that a given communication that corresponds to the first communication modality at least partly while external to the local device is to be interacted with at least partly via the second communication modality at the local device. By way of example but not limitation, a local communication device 102L may detect that at least one intimacy setting 204 indicates that a given communication that corresponds to a first communication modality 106-1 at least partly while external to local communication device 102L is to be interacted with at least partly via a second communication modality 106-2 at local communication device 102L. For an example implementation, for a given communication, a local user 104L may interact with a local communication device 102L via a second communication modality 106-2 although a remote user 104R is interacting with a remote communication device 102R that is participating in the given communication via a first communication modality 106-1. However, claimed subject matter is not limited to any particular described embodiments, implementations, examples, etc.

Figure 6D:
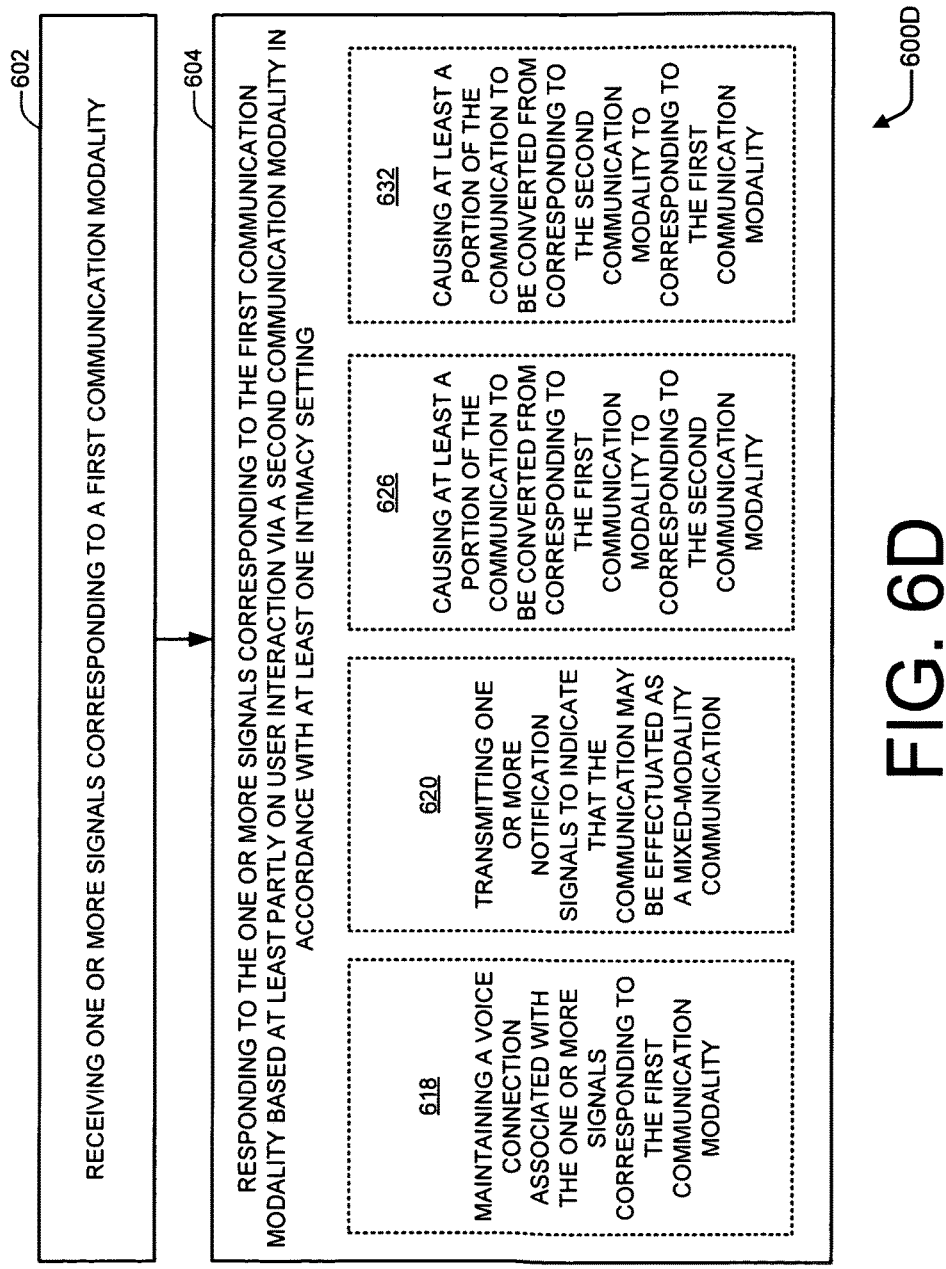

FIG. 6D illustrates example operations 618, 620, 626, and 632. For certain example embodiments, a communication may be conducted wherein the first communication modality comprises voice communication, and the second communication modality comprises textual communication. By way of example but not limitation, a first communication modality 106-1 associated with a remote user 104R may comprise voice communication, and a second communication modality 106-2 associated with a local user 104L may comprise textual communication. However, claimed subject matter is not limited to any particular described embodiments, implementations, examples, etc.

For certain example embodiments, an operation 618 may be directed at least partially to wherein the responding to the one or more signals corresponding to the first communication modality based at least partly on user interaction via a second communication modality in accordance with at least one intimacy setting comprises maintaining a voice connection associated with the one or more signals corresponding to the first communication modality. By way of example but not limitation, a local communication device 102L may maintain a voice connection that is associated with one or more signals 202 corresponding to a first communication modality 106-1. For an example implementation, a voice connection (e.g., a voice call) may be maintained between a local communication device 102L and a remote communication device 102R that are conducting a communication in which a remote user 104R is interacting with remote communication device 102R via a first communication modality 106-1 and a local user 104L is interacting with local communication device 102L via a second communication modality 106-2. However, claimed subject matter is not limited to any particular described embodiments, implementations, examples, etc.

For certain example embodiments, a communication may be conducted wherein the first communication modality and the second communication modality comprise different communication modalities selected from a group of communication modalities comprising: voice communication, textual communication, or video communication. By way of example but not limitation, a communication may be conducted by a local communication device 102L and a remote communication device 102R wherein a first communication modality 106-1 being used by a remote user 104R and a second communication modality 106-2 being used by a local user 104L comprise different communication modalities 106 selected from a group of communication modalities comprising: voice communication, textual communication, or video communication. However, claimed subject matter is not limited to any particular described embodiments, implementations, examples, etc.

For certain example embodiments, an operation 620 may be directed at least partially to wherein the responding to the one or more signals corresponding to the first communication modality based at least partly on user interaction via a second communication modality in accordance with at least one intimacy setting comprises transmitting one or more notification signals to indicate that the communication may be effectuated as a mixed-modality communication. By way of example but not limitation, a local communication device 102L may transmit one or more notification signals to indicate that a communication may be effectuated as a mixed-modality communication. For an example implementation, a local communication device 102L may transmit one or more signals to remote communication device 102R, an intermediate node along channel 108, a combination thereof, etc. providing notification that a communication may be effectuated using at least two communication modalities 106 (e.g., so that remote communication device 102R may notify remote user 104R, may provide remote user 104R with one or more options (e.g., accepting a mixed-modality communication, refusing a mixed-modality communication, canceling the communication, switching to a different communication modality, a combination thereof, etc.), may activate appropriate functionality, some combination thereof, and so forth). However, claimed subject matter is not limited to any particular described embodiments, implementations, examples, etc.

Figure 6E:
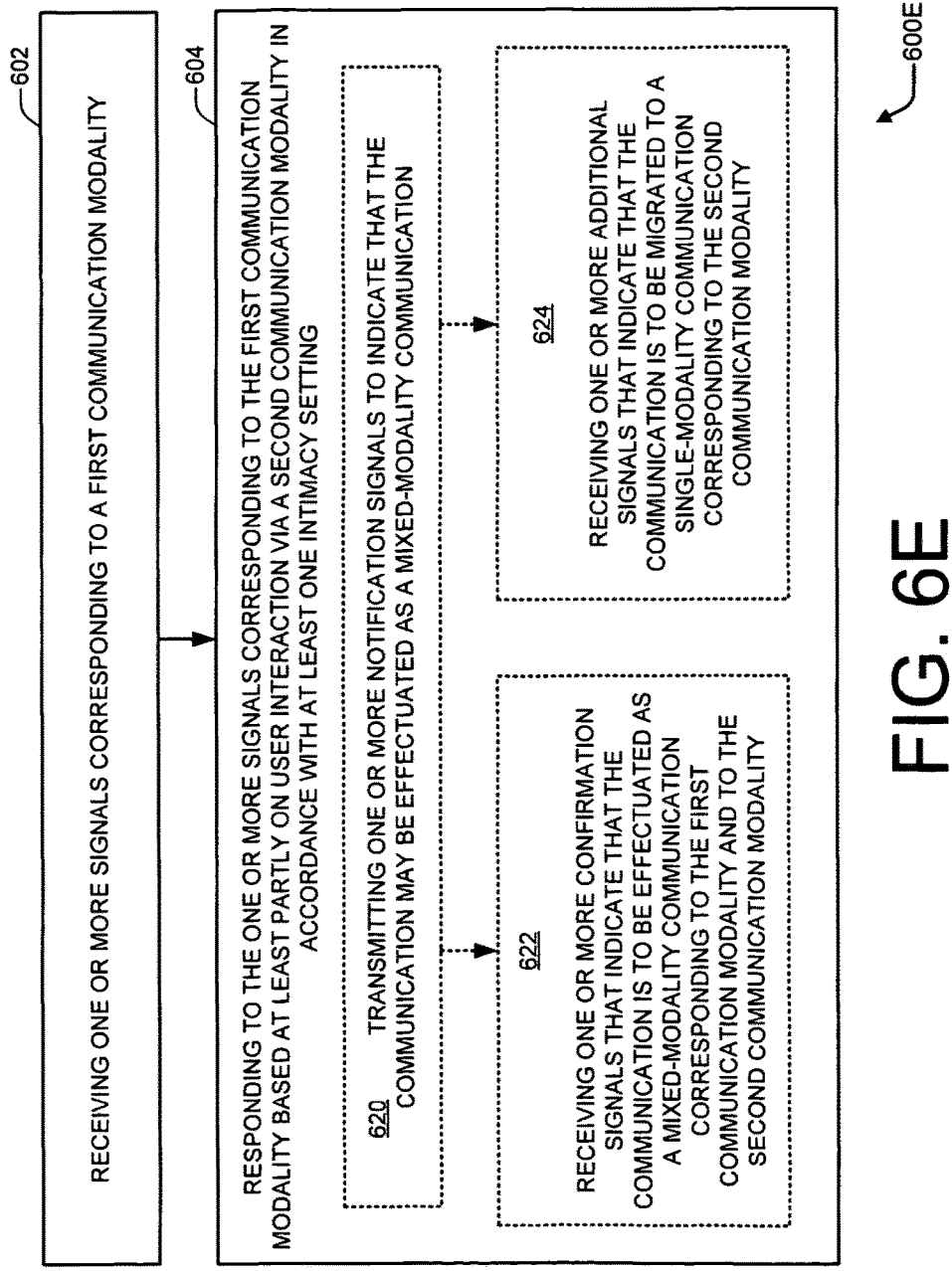

FIG. 6E illustrates example operations 622 and 624, in conjunction with operation 620. For certain example embodiments, an operation 622 may be directed at least partially to wherein the responding to the one or more signals corresponding to the first communication modality based at least partly on user interaction via a second communication modality in accordance with at least one intimacy setting further comprises (e.g., in addition to operation 620) receiving one or more confirmation signals that indicate that the communication is to be effectuated as a mixed-modality communication corresponding to the first communication modality and to the second communication modality. By way of example but not limitation, a local communication device 102L may receive one or more confirmation signals that indicate that a communication between local communication device 102L and remote communication device 102R is to be effectuated as a mixed-modality communication corresponding to a first communication modality 106-1 and to a second communication modality 106-2. For an example implementation, a local communication device 102L may receive one or more signals via a channel 108 that confirm that a remote user 104R has accepted a mixed-modality communication or that confirm that an intermediate node has established functionality to support a mixed-modality communication. However, claimed subject matter is not limited to any particular described embodiments, implementations, examples, etc.

For certain example embodiments, an operation 624 may be directed at least partially to wherein the responding to the one or more signals corresponding to the first communication modality based at least partly on user interaction via a second communication modality in accordance with at least one intimacy setting further comprises (e.g., in addition to operation 620) receiving one or more additional signals that indicate that the communication is to be migrated to a single-modality communication corresponding to the second communication modality. By way of example but not limitation, a local communication device 102L may receive one or more additional signals that indicate that a communication is to be migrated to a single-modality communication corresponding to a second communication modality 106-2. For an example implementation, a local communication device 102L may receive one or more signals via a channel 108 that indicate that a remote user 104R has elected to migrate a communication to a single-modality communication corresponding to a second communication modality 106-2 as selected by a local user 104L or indicated by at least one intimacy setting 204 or that indicate that an intermediate node has migrated or is prepared to migrate a communication. However, claimed subject matter is not limited to any particular described embodiments, implementations, examples, etc.

For certain example embodiments, an operation 626 (e.g., of FIG. 6D) may be directed at least partially to wherein the responding to the one or more signals corresponding to the first communication modality based at least partly on user interaction via a second communication modality in accordance with at least one intimacy setting comprises causing at least a portion of the communication to be converted from corresponding to the first communication modality to corresponding to the second communication modality. By way of example but not limitation, a local communication device 102L may cause at least a portion of a communication to be converted from corresponding to a first communication modality 106-1 to corresponding to a second communication modality 106-2 (e.g., using a conversion effectuator 402 (e.g., of FIG. 4A)). For an example implementation, a conversion may be caused to be effectuated with respect to one or more signals arriving from remote communication device 102R. However, claimed subject matter is not limited to any particular described embodiments, implementations, examples, etc.

Figure 6F:
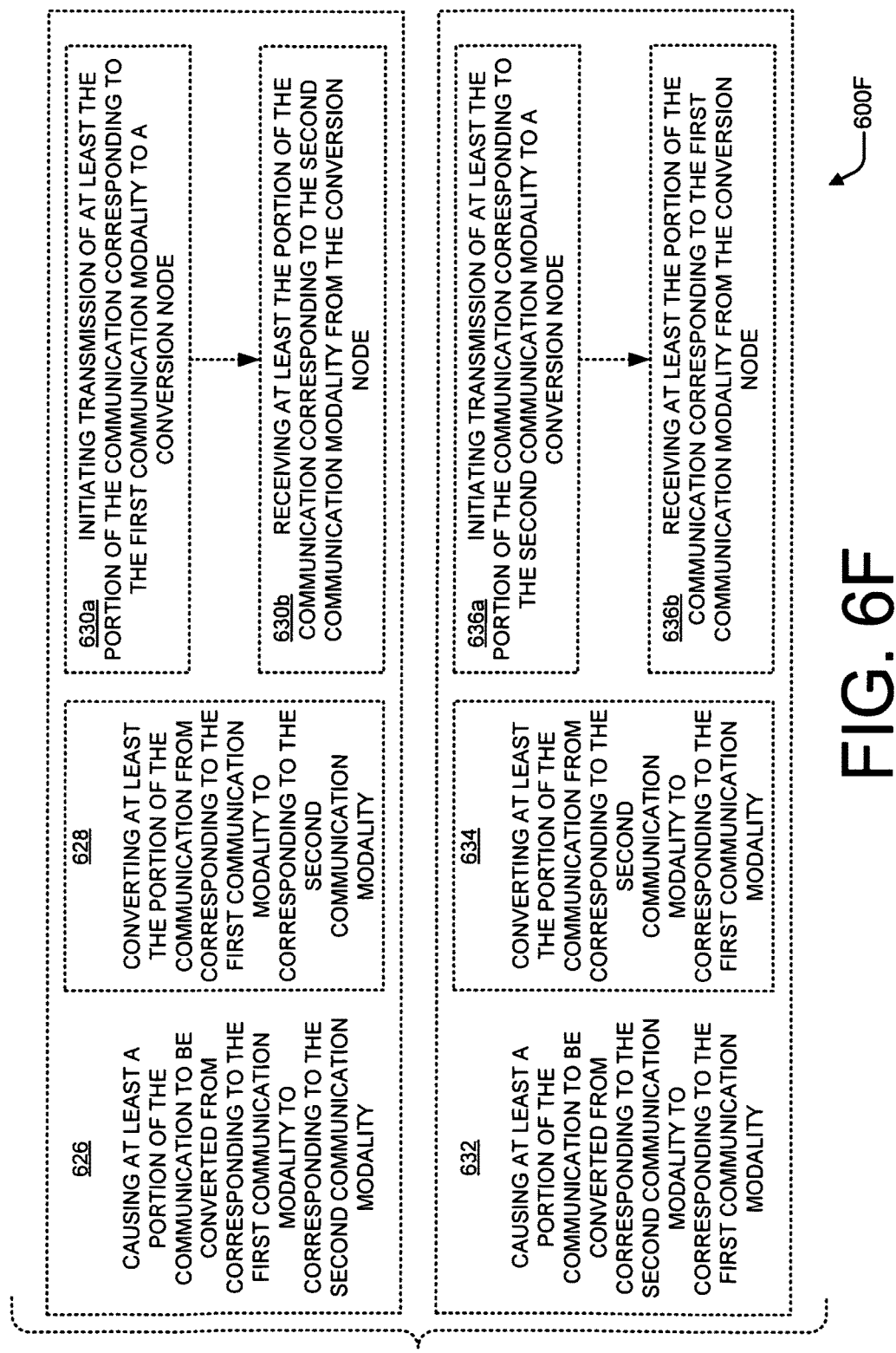

FIG. 6F illustrates example operations 628, 630a, and 630b; and 634, 636a, and 636b, in conjunction with operations 626 and 632, respectively. For certain example embodiments, an operation 628 may be directed at least partially to wherein the causing at least a portion of the communication to be converted from corresponding to the first communication modality to corresponding to the second communication modality (e.g., of operation 626) comprises converting at least the portion of the communication from corresponding to the first communication modality to corresponding to the second communication modality. By way of example but not limitation, a local communication device 102L may convert at least a portion of a communication from corresponding to a first communication modality 106-1 to corresponding to a second communication modality 106-2 (e.g., using a converter 404 (e.g., of FIG. 4B)). However, claimed subject matter is not limited to any particular described embodiments, implementations, examples, etc.

For certain example embodiments, an operation 630a or 630b may be directed at least partially to wherein the causing at least a portion of the communication to be converted from corresponding to the first communication modality to corresponding to the second communication modality (e.g., of operation 626) comprises initiating transmission of at least the portion of the communication corresponding to the first communication modality to a conversion node or receiving at least the portion of the communication corresponding to the second communication modality from the conversion node, respectively. By way of example but not limitation, a local communication device 102L may initiate transmission of at least a portion of a communication corresponding to a first communication modality 106-1 to a conversion node 408 and may receive at least the portion of the communication corresponding to a second communication modality 106-2 from conversion node 408 (e.g., using a conversion requestor 406 (e.g., of FIG. 4C)). However, claimed subject matter is not limited to any particular described embodiments, implementations, examples, etc.

For certain example embodiments, an operation 632 (e.g., of FIG. 6D) may be directed at least partially to wherein the responding to the one or more signals corresponding to the first communication modality based at least partly on user interaction via a second communication modality in accordance with at least one intimacy setting comprises causing at least a portion of the communication to be converted from corresponding to the second communication modality to corresponding to the first communication modality. By way of example but not limitation, a local communication device 102L may cause at least a portion of a communication to be converted from corresponding to a second communication modality 106-2 to corresponding to a first communication modality 106-1 (e.g., using a conversion effectuator 402 (e.g., of FIG. 4A)). For an example implementation, a conversion may be caused to be effectuated with respect to one or more signals generated by a user input interface 516a prior to their being transmitted to a remote communication device 102R. However, claimed subject matter is not limited to any particular described embodiments, implementations, examples, etc.

For certain example embodiments, an operation 634 (e.g., of FIG. 6F) may be directed at least partially to wherein the causing at least a portion of the communication to be converted from corresponding to the second communication modality to corresponding to the first communication modality (e.g., of operation 632) comprises converting at least the portion of the communication from corresponding to the second communication modality to corresponding to the first communication modality. By way of example but not limitation, a local communication device 102L may convert at least a portion of a communication from corresponding to a second communication modality 106-2 to corresponding to a first communication modality 106-1 (e.g., using a converter 404 (e.g., of FIG. 4B)). However, claimed subject matter is not limited to any particular described embodiments, implementations, examples, etc.

For certain example embodiments, an operation 636a or 636b may be directed at least partially to wherein the causing at least a portion of the communication to be converted from corresponding to the second communication modality to corresponding to the first communication modality (e.g., of operation 632) comprises initiating transmission of at least the portion of the communication corresponding to the second communication modality to a conversion node or receiving at least the portion of the communication corresponding to the first communication modality from the conversion node, respectively. By way of example but not limitation, a local communication device 102L may initiate transmission of at least a portion of a communication corresponding to a second communication modality 106-2 to a conversion node 408 and may receive at least the portion of the communication corresponding to a first communication modality 106-1 from conversion node 408 (e.g., using a conversion requestor 406 (e.g., of FIG. 4C)). However, claimed subject matter is not limited to any particular described embodiments, implementations, examples, etc.

Figure 6G:
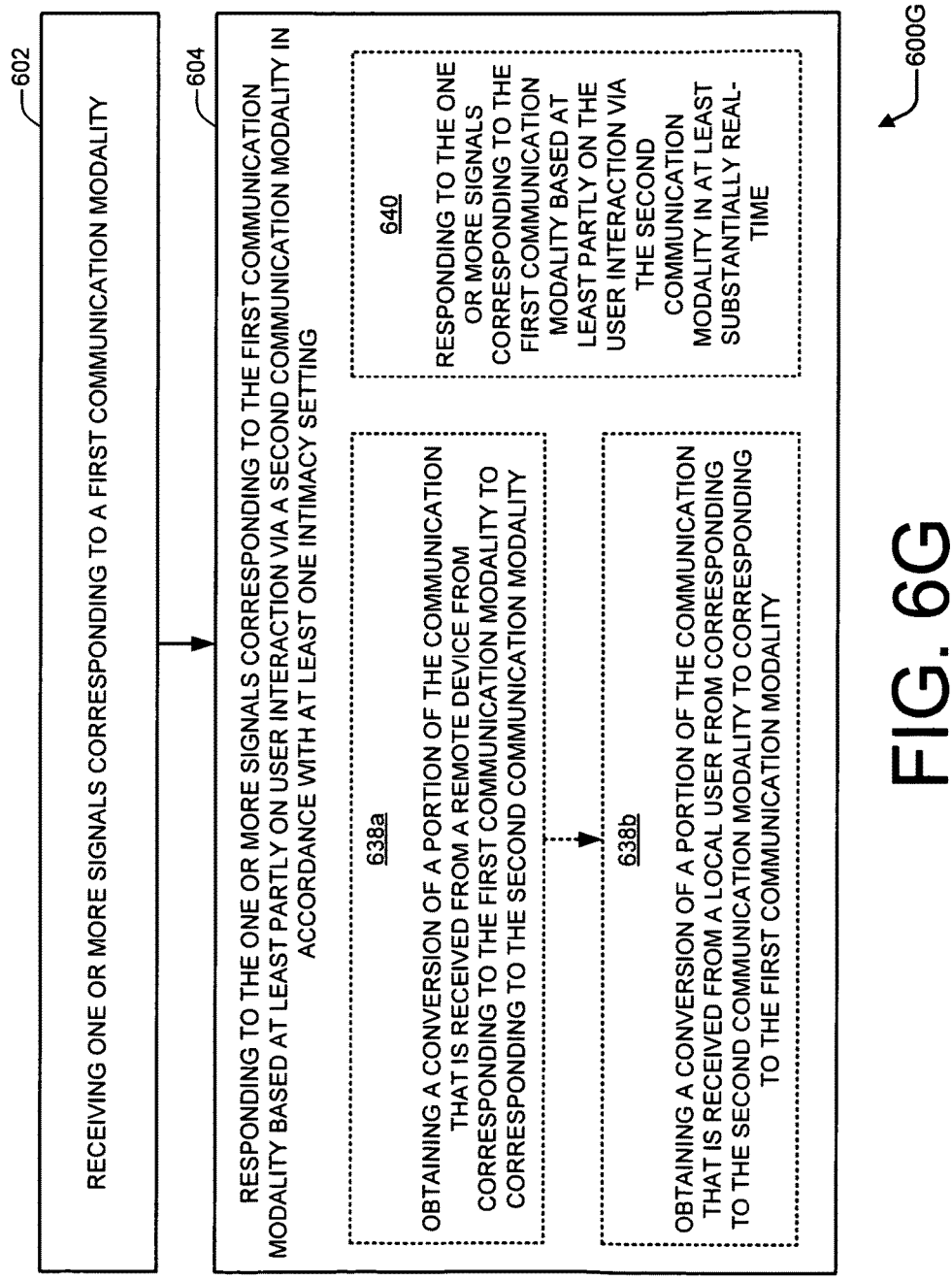

FIG. 6G illustrates example operations 638a, 638b, and 640. For certain example embodiments, an operation 638a or 638b may be directed at least partially to wherein the responding to the one or more signals corresponding to the first communication modality based at least partly on user interaction via a second communication modality in accordance with at least one intimacy setting comprises obtaining a conversion of a portion of the communication that is received from a remote device from corresponding to the first communication modality to corresponding to the second communication modality or obtaining a conversion of a portion of the communication that is received from a local user from corresponding to the second communication modality to corresponding to the first communication modality, respectively. By way of example but not limitation, a local communication device 102L may obtain a conversion of a portion of a communication that is received from a remote communication device 102R from corresponding to a first communication modality 106-1 to corresponding to a second communication modality 106-2 and may obtain a conversion of a portion of the communication that is received from a local user 104L from corresponding to second communication modality 106-2 to corresponding to first communication modality 106-1. For an example implementation, a local communication device 102L may obtain conversions of communication portion(s) automatically (e.g., from a conversion node 408), responsive to an initial request for conversion services (e.g., from a conversion node 408 due at least in part to conversion requester 406), responsive to repeated or on-demand requests for conversion services (e.g., from a conversion node 408 due at least in part to conversion requester 406) as communication portions are received or are generated, locally (e.g., from a converter 404), any combination thereof, and so forth. However, claimed subject matter is not limited to any particular described embodiments, implementations, examples, etc.

For certain example embodiments, an operation 640 may be directed at least partially to wherein the responding to the one or more signals corresponding to the first communication modality based at least partly on user interaction via a second communication modality in accordance with at least one intimacy setting comprises responding to the one or more signals corresponding to the first communication modality based at least partly on the user interaction via the second communication modality in at least substantially real-time. By way of example but not limitation, a local communication device 102L may respond to one or more signals 202 corresponding to a first communication modality 106-1 based at least partly on local user 104L interaction via a second communication modality 106-2 in at least substantially real-time. For an example implementation, a response may be considered to be made in substantially real-time if a related conversational flow may be continued without introducing significant person-perceptible delay(s), at least not in addition to those introduced by e.g. one participant entering text if another participant is interacting with voice. However, claimed subject matter is not limited to any particular described embodiments, implementations, examples, etc.

Figure 6H:
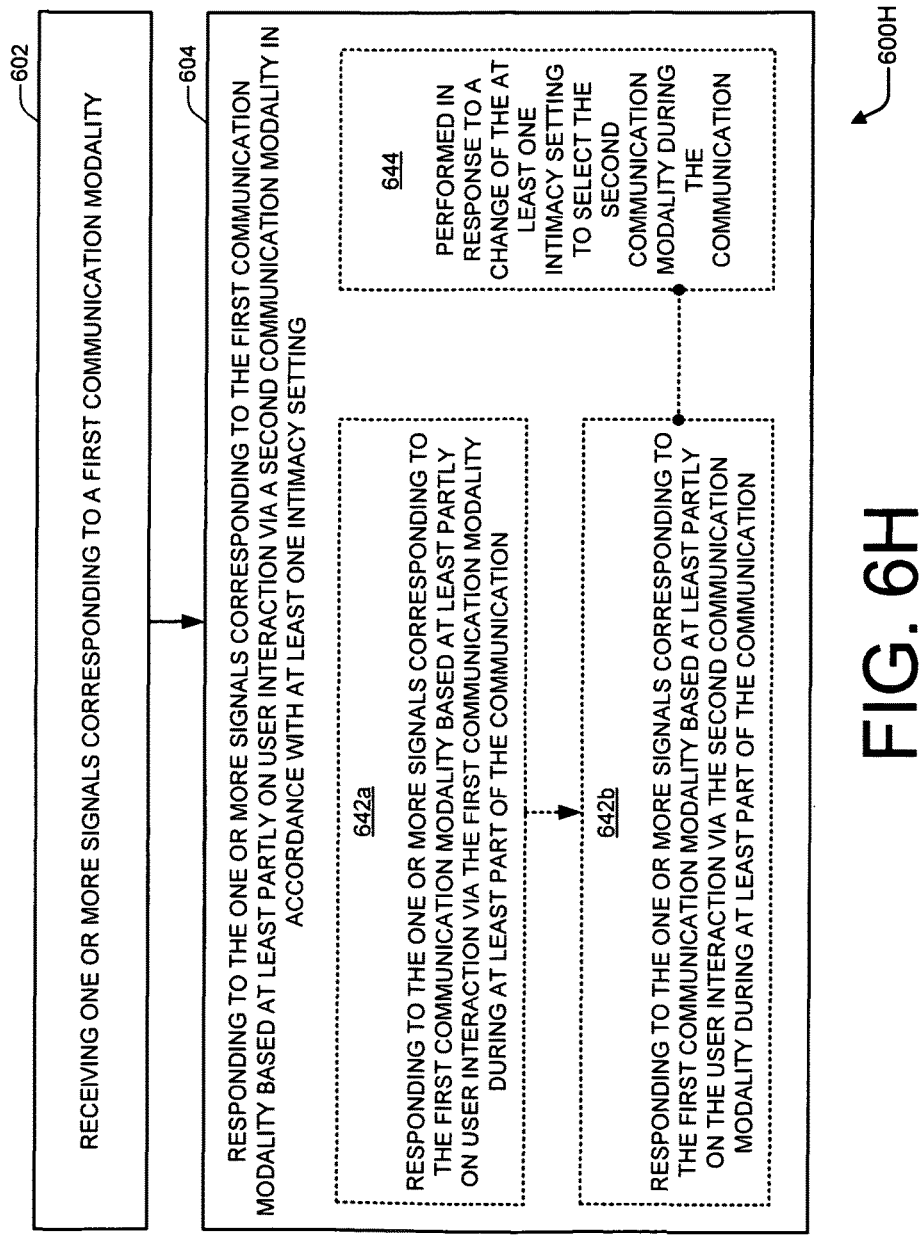

FIG. 6H illustrates example operations 642a, 642b, and 644. For certain example embodiments, an operation 642a or 642b may be directed at least partially to wherein the responding to the one or more signals corresponding to the first communication modality based at least partly on user interaction via a second communication modality in accordance with at least one intimacy setting comprises responding to the one or more signals corresponding to the first communication modality based at least partly on user interaction via the first communication modality during at least part of the communication or responding to the one or more signals corresponding to the first communication modality based at least partly on the user interaction via the second communication modality during at least part of the communication, respectively. By way of example but not limitation, a local communication device 102L may respond to one or more signals 202 corresponding to a first communication modality 106-1 based at least partly on local user 104L interaction via a first communication modality 106-1 during at least part of a communication and may respond to one or more signals 202 corresponding to first communication modality 106-1 based at least partly on local user 104L interaction via a second communication modality 106-2 during at least part of the communication. For an example implementation, a local user 104L may interact with a local communication device 102L via a first communication modality 106-1 (e.g., voice) at one point in a communication and may interact with local communication device 102L via a second communication modality 106-2 (e.g., text) at another point in the communication. However, claimed subject matter is not limited to any particular described embodiments, implementations, examples, etc.

For certain example embodiments, an operation 644 may be directed at least partially to a situation wherein the responding to the one or more signals corresponding to the first communication modality based at least partly on the user interaction via the second communication modality during at least part of the communication is performed in response to a change of the at least one intimacy setting to select the second communication modality during the communication. By way of example but not limitation, a local communication device 102L may respond to one or more signals 202 corresponding to first communication modality 106-1 based at least partly on local user 104L interaction via a second communication modality 106-2 during at least part of a communication in response to a change of at least one intimacy setting 204 to select second communication modality 106-2 during the communication. For an example implementation, a local user 104L may be empowered to switch form interacting with a local communication device 102L via a first communication modality 106-1 to interacting via a second communication modality 106-2 during a communication by adjusting at least one intimacy setting 204 (e.g., via a user input interface 516a) during the communication. However, claimed subject matter is not limited to any particular described embodiments, implementations, examples, etc.

Figure 6I:
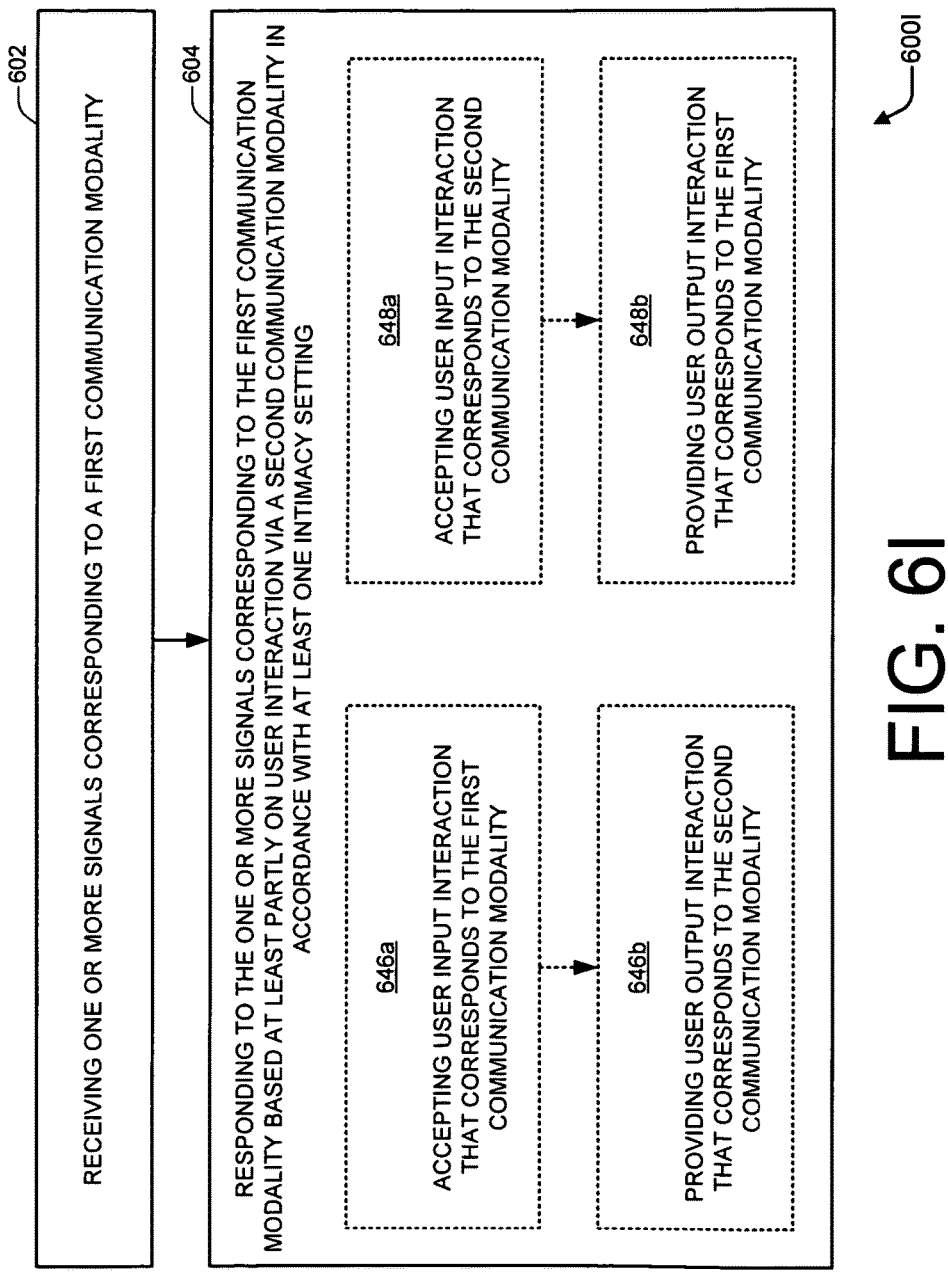

FIG. 6I illustrates example operations 646a, 646b, 648a, and 648b. For certain example embodiments, an operation 646a or 646b may be directed at least partially to wherein the responding to the one or more signals corresponding to the first communication modality based at least partly on user interaction via a second communication modality in accordance with at least one intimacy setting comprises accepting user input interaction that corresponds to the first communication modality or providing user output interaction that corresponds to the second communication modality, respectively. By way of example but not limitation, a local communication device 102L may accept local user 104L input interaction that corresponds to a first communication modality 106-1 (e.g., which may also be being used by a remote user 104R) and may provide local user 104L output interaction that corresponds to a second communication modality 106-2 (e.g., which may not also be being used by a remote user 104R). For an example implementation, a local communication device 102L may accept e.g. voice input from a local user 104L and may provide e.g. text output to a local user 104L for a given communication. However, claimed subject matter is not limited to any particular described embodiments, implementations, examples, etc.

For certain example embodiments, an operation 648a or 648b may be directed at least partially to wherein the responding to the one or more signals corresponding to the first communication modality based at least partly on user interaction via a second communication modality in accordance with at least one intimacy setting comprises accepting user input interaction that corresponds to the second communication modality or providing user output interaction that corresponds to the first communication modality, respectively. By way of example but not limitation, a local communication device 102L may accept local user 104L input interaction that corresponds to a second communication modality 106-2 (e.g., which may not also be being used by a remote user 104R) and may provide local user 104L output interaction that corresponds to a first communication modality 106-1 (e.g., which may also be being used by a remote user 104R). For an example implementation, a local communication device 102L may accept e.g. text input from a local user 104L and may provide e.g. voice output to a local user 104L for a given communication. However, claimed subject matter is not limited to any particular described embodiments, implementations, examples, etc.

For certain example embodiments, a situation may exist in which the at least one intimacy setting represents at least one degree of communicative exposure that a local user may establish for a local device. By way of example but not limitation, at least one intimacy setting 204 may represent at least one degree of communicative exposure that a local user 104L may establish for a local communication device 102L. For an example implementation, at least one intimacy setting 204 may represent if a local user 104L wishes to expose textual communication, voice communication, video communication, a combination thereof, and so forth. However, claimed subject matter is not limited to any particular described embodiments, implementations, examples, etc.

For certain example embodiments, a situation may exist in which the at least one intimacy setting indicates that a local user is to interact with an incoming voice call via a textual user interface of a local device. By way of example but not limitation, at least one intimacy setting 204 may indicate that a local user 104L is to interact with an incoming voice call via a textual user interface 516 of a local communication device 102L. However, claimed subject matter is not limited to any particular described embodiments, implementations, examples, etc.

Figure 6J:
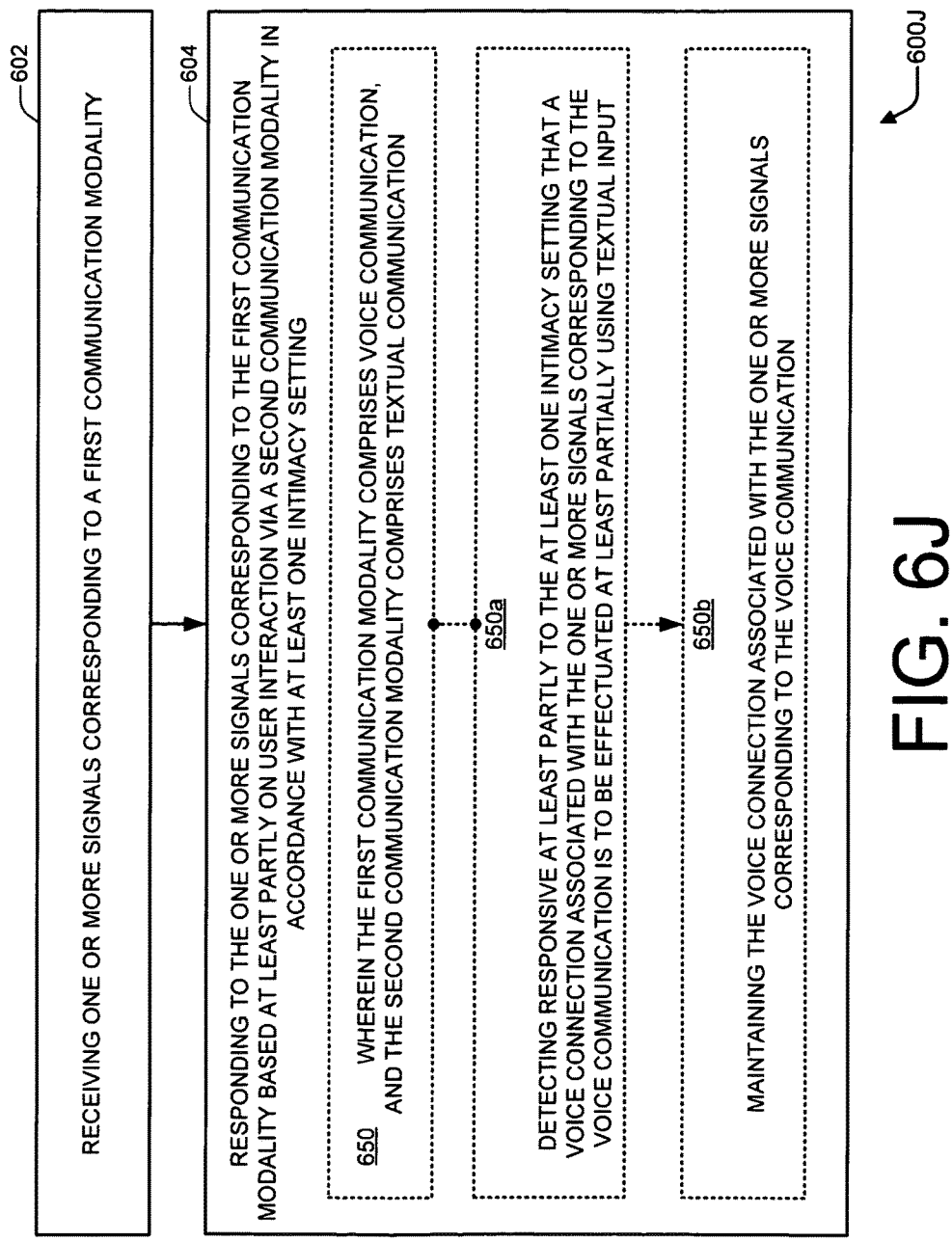

FIG. 6J illustrates example operations 650, 650a, and 650b. For certain example embodiments, a situation in accordance with operation 650 may exist wherein the first communication modality comprises voice communication, and the second communication modality comprises textual communication. By way of example but not limitation, a first communication modality 106-1 may comprise voice communication, and a second communication modality 106-2 may comprise textual communication. Furthermore, an operation 650a or 650b may be directed at least partially to wherein the responding to the one or more signals corresponding to the first communication modality based at least partly on user interaction via a second communication modality in accordance with at least one intimacy setting comprises detecting responsive at least partly to the at least one intimacy setting that a voice connection associated with the one or more signals corresponding to the voice communication is to be effectuated at least partially using textual input or maintaining the voice connection associated with the one or more signals corresponding to the voice communication, respectively. By way of example but not limitation, a local communication device 102L may detect, responsive at least partly to at least one intimacy setting 204, that a voice connection associated with one or more signals 202 corresponding to a voice communication is to be effectuated at least partially using textual input and may maintain the voice connection associated with the one or more signals 202 corresponding to the voice communication. However, claimed subject matter is not limited to any particular described embodiments, implementations, examples, etc.

Figure 6K:
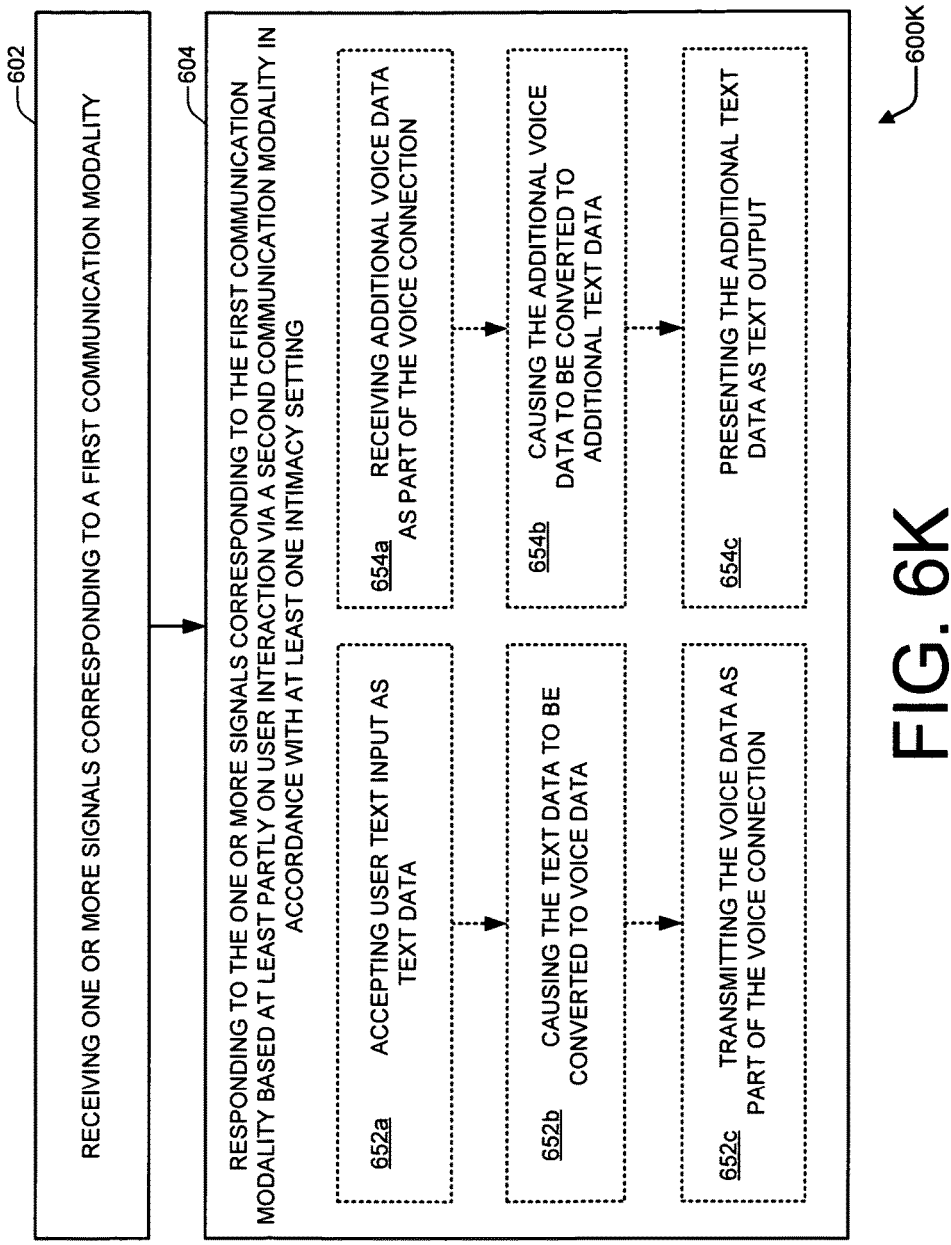

FIG. 6K illustrates example operations 652a, 652b, and 652c; and 654a, 654b, and 654c, which may relate to operations 650a, 650b, and 650c. For certain example embodiments, an operation 652a or 652b or 652c may be directed at least partially to wherein the responding to the one or more signals corresponding to the first communication modality based at least partly on user interaction via a second communication modality in accordance with at least one intimacy setting further comprises (e.g., in addition to operations 650a, 650b, and 650c) accepting user text input as text data or causing the text data to be converted to voice data or transmitting the voice data as part of the voice connection, respectively. By way of example but not limitation, a local communication device 102L may accept local user 104L text input as text data, may cause the text data to be converted to voice data (e.g., using a conversion effectuator 402 (e.g., of FIG. 4A)), and may transmit the voice data as part of a maintained voice connection (e.g., to remote communication device 102R). However, claimed subject matter is not limited to any particular described embodiments, implementations, examples, etc.

For certain example embodiments, an operation 654a or 654b or 654c may be directed at least partially to wherein the responding to the one or more signals corresponding to the first communication modality based at least partly on user interaction via a second communication modality in accordance with at least one intimacy setting further comprises (e.g., in addition to operations 650a, 650b, 650c, 652a, 652b, and 652c) receiving additional voice data as part of the voice connection or causing the additional voice data to be converted to additional text data or presenting the additional text data as text output, respectively. By way of example but not limitation, a local communication device 102L may receive additional voice data as part of a maintained voice connection (e.g., from a remote communication device 102R), may cause the additional voice data to be converted to additional text data (e.g., with a conversion effectuator 402 (e.g., of FIG. 4A)), and may present the additional text data as text output (e.g., to a local user 104L). However, claimed subject matter is not limited to any particular described embodiments, implementations, examples, etc.

FIG. 7A is a flow diagram 700A illustrating an example method for participating in a multi-modality communication, in accordance with certain example embodiments. As illustrated, flow diagram 700A may include any of operations 702-704. Although operations 702-704 are shown or described in a particular order, it should be understood that methods may be performed in alternative manners without departing from claimed subject matter, including, but not limited to, with a different order or number of operations or with a different relationship between or among operations. Also, at least some operations of flow diagram 700A may be performed so as to be fully or partially overlapping with other operation(s). By way of example and not limitation, certain operations of FIGS. 7A-7N are described herein below with particular reference to one or more actions of FIGS. 4D-4G. However, claimed subject matter is not limited to any particular described embodiments, implementations, examples, etc.

For certain example embodiments, a method for at least attempting to participate in a mixed-modality communication, in which the method may be at least partially implemented using hardware, may comprise an operation 702 or an operation 704. An operation 702 may be directed at least partially to receiving at least one notification of a communication that corresponds to a first communication modality. By way of example but not limitation, a local communication device 102L may receive at least one notification of a communication that corresponds to a first communication modality (e.g., in accordance with an action 412a, etc.). An operation 704 may be directed at least partially to transmitting at least one message to continue the communication, the at least one message indicating that local user interaction is to occur at least partially via a second communication modality. By way of example but not limitation, a local communication device 102L may transmit at least one message to continue the communication, with the at least one message indicating that interaction by a local user 104L is to occur at least partially via a second communication modality (e.g., in accordance with an action 412c, 418b, a combination thereof, etc.). For example implementations, transmitting may be accomplished at least in part by transmitting at least one message to a remote communication device 102R, by initiating transmission of at least one message toward a remote communication device 102R, by transmitting at least one message from a local communication device 102L, by transmitting at least one message away from a programmatic entity (e.g., a module, an operating system, an application or app, a combination thereof, etc.), by transmitting at least one message from a communication port or network interface, any combination thereof, and so forth. However, claimed subject matter is not limited to any particular described embodiments, implementations, examples, etc.

Figure 7B:
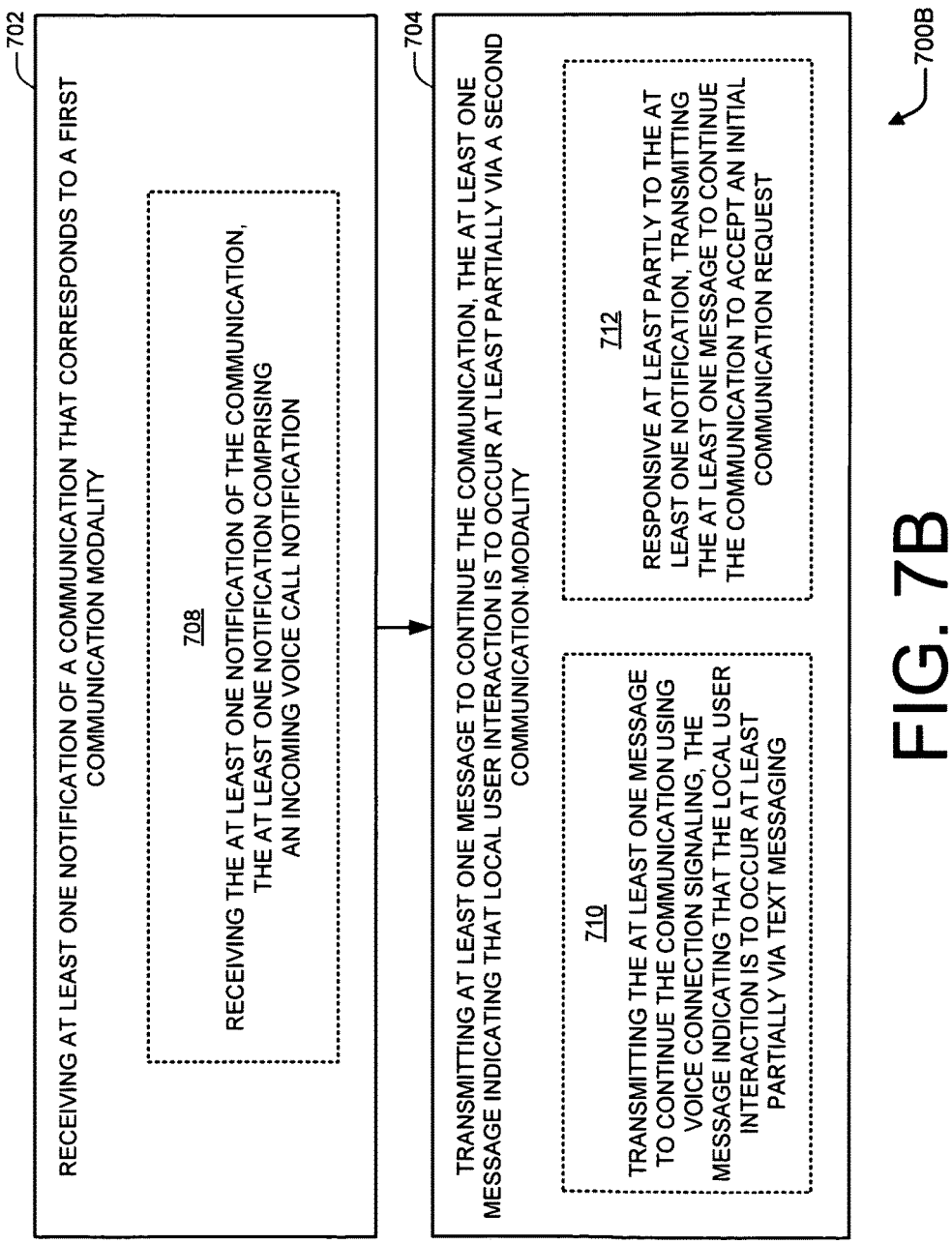

FIGS. 7B-7N depict example alternatives for a flow diagram of FIG. 7A in accordance with certain example embodiments. As illustrated, flow diagrams of FIGS. 7B-7N may include any of the illustrated or described operations. Although operations are shown or described in a particular order, it should be understood that methods may be performed in alternative manners without departing from claimed subject matter, including, but not limited to, with a different order or number of operations or with a different relationship between or among operations. Also, at least some operations of flow diagrams of FIGS. 7B-7N may be performed so as to be fully or partially overlapping with other operation(s).

For certain example embodiments, one or more operations may be performed wherein the first communication modality and the second communication modality comprise different communication modalities selected from a group of communication modalities comprising: textual communication, voice communication, or video communication. By way of example but not limitation, operation 702 or 704 may be performed with the first communication modality comprising textual communication, voice communication, or video communication and with the second communication modality comprising a different one of textual communication, voice communication, or video communication. However, claimed subject matter is not limited to any particular described embodiments, implementations, examples, etc.

FIG. 7B illustrates example operations 708, 710, and 712. For certain example embodiments, an operation 708 may be directed at least partially to wherein the receiving at least one notification of a communication that corresponds to a first communication modality comprises receiving the at least one notification of the communication, the at least one notification comprising an incoming voice call notification. By way of example but not limitation, a local communication device 102L may receive at least one notification of an incoming voice call from a remote communication device 102R (e.g., in accordance with an action 412a, etc.). For an example implementation, a ringing message may be received at a local communication device 102L. However, claimed subject matter is not limited to any particular described embodiments, implementations, examples, etc.

For certain example embodiments, an operation 710 may be directed at least partially to wherein the transmitting at least one message to continue the communication, the at least one message indicating that local user interaction is to occur at least partially via a second communication modality comprises (e.g., in conjunction with operation 708) transmitting the at least one message to continue the communication using voice connection signaling, the at least one message indicating that the local user interaction is to occur at least partially via text messaging. By way of example but not limitation, a local communication device 102L may transmit a message to continue the communication using a signaling channel associated with voice calls (e.g., for a cellular voice connection), using signaling system no. 7 (SS7) signaling, using a voice connection protocol, using a call answer or call acceptance notification, any combination thereof, and so forth, with the message including at least one indication that interaction by a local user 104L is to occur at least partially via text messaging. However, claimed subject matter is not limited to any particular described embodiments, implementations, examples, etc.

For certain example embodiments, an operation 712 may be directed at least partially to wherein the transmitting at least one message to continue the communication, the at least one message indicating that local user interaction is to occur at least partially via a second communication modality comprises responsive at least partly to the at least one notification, transmitting the at least one message to continue the communication to accept an initial communication request. By way of example but not limitation, a local communication device 102L may transmit a message to continue a communication to thereby accept a received initial communication request. For an example implementation, a local communication device 102L may transmit a message to continue a communication without a contemporaneous command by a local user 104L with respect to which communication modality is desired by a local user 104L based, at least in part, on at least one intimacy setting that was stored prior to receipt of a notification of the communication. However, claimed subject matter is not limited to any particular described embodiments, implementations, examples, etc.

FIG. 7C illustrates an example operation 706C of performing one or more additional operations, such as example operation 714a or 714b. For certain example embodiments, an operation 714a or 714b may be directed at least partially to accepting local user interaction via the first communication modality; or participating in at least part of the communication by transmitting user communication data derived from the local user interaction accepted via the first communication modality, respectively, wherein the transmitting at least one message to continue the communication, the at least one message indicating that local user interaction is to occur at least partially via a second communication modality, is performed after the accepting and the participating. By way of example but not limitation, a local communication device 102L may accept local user interaction from a local user 104L via a first communication modality and may participate in a communication by transmitting communication data derived from the local user interaction accepted via the first communication modality prior to transmitting a message to continue the communication with local user interaction occurring via a second communication modality. For an example implementation, a local user 104L may participate in a communication using an original or first communication modality implicitly requested by an initiating remote user 104R prior to requesting to migrate the communication such that the local user 104L may interact with a local communication device 102L via a second communication modality. However, claimed subject matter is not limited to any particular described embodiments, implementations, examples, etc.

FIG. 7D illustrates example operations 716, 718, 720, and 722. For certain example embodiments, an operation 716 may be directed at least partially to wherein the transmitting at least one message to continue the communication, the at least one message indicating that local user interaction is to occur at least partially via a second communication modality comprises transmitting the at least one message to continue the communication, the at least one message indicating that local user input interaction is to occur via the first communication modality and that local user output interaction is to occur via the second communication modality. By way of example but not limitation, a local user 104L may indicate via a transmitted message an intention to continue a communication but to participate in the communication by interacting with a local communication device 102L via a first communication modality with respect to a user input interface 516a (e.g., of FIG. 5) and via a second communication modality with respect to a user output interface 516b (e.g., of FIG. 5). However, claimed subject matter is not limited to any particular described embodiments, implementations, examples, etc.

For certain example embodiments, an operation 718 may be directed at least partially to wherein the transmitting at least one message to continue the communication, the at least one message indicating that local user interaction is to occur at least partially via a second communication modality comprises transmitting the at least one message to continue the communication, the at least one message indicating that local user input interaction is to occur via the second communication modality and that local user output interaction is to occur via the first communication modality. By way of example but not limitation, a local user 104L may indicate via a transmitted message (e.g., in accordance with an action 418b, etc.) an intention to continue a communication but to participate in the communication by interacting with a local communication device 102L via a first communication modality with respect to a user output interface 516b (e.g., in accordance with an action 418f, etc.) and via a second communication modality with respect to a user input interface 516a (e.g., in accordance with an action 418g, etc.). However, claimed subject matter is not limited to any particular described embodiments, implementations, examples, etc.

For certain example embodiments, an operation 720 may be directed at least partially to wherein the transmitting at least one message to continue the communication, the at least one message indicating that local user interaction is to occur at least partially via a second communication modality comprises transmitting the at least one message to continue the communication, the at least one message indicating that local user input interaction is to occur via the second communication modality and that local user output interaction is to occur via the second communication modality. By way of example but not limitation, a local user 104L may indicate via a transmitted message (e.g., in accordance with an action 412c, etc.) an intention to continue a communication but to participate in the communication by interacting with a local communication device 102L via a second communication modality with respect to a user output interface 516b (e.g., in accordance with an action 412h, 414c, a combination thereof, etc.) and with respect to a user input interface 516a (e.g., in accordance with an action 412i, 414d, a combination thereof, etc.). However, claimed subject matter is not limited to any particular described embodiments, implementations, examples, etc.

For certain example embodiments, an operation 722 may be directed at least partially to wherein the first communication modality comprises voice communication, and the second communication modality comprises textual communication; and wherein the transmitting at least one message to continue the communication, the at least one message indicating that local user interaction is to occur at least partially via a second communication modality comprises transmitting the at least one message to continue the communication, the at least one message indicating that a remote user is to be presented communication output including at least partially artificial speech that is derived from text entered by a local user. By way of example but not limitation, a message that is transmitted from a local communication device 102L may indicate that a remote user 104R, if a communication is continued without further negotiation of communication modalities, may be presented communication output via a user output interface 516b (e.g., at least one speaker) that includes at least partially artificial speech. For certain example implementations, at least partially artificial speech may comprise speech that is at least partially computer generated, speech that is at least partially synthesized, speech that is generated using a repository of vocal sounds (e.g., a bank of recorded speech samples), speech that is electronically generated from text data, any combination thereof, and so forth. However, claimed subject matter is not limited to any particular described embodiments, implementations, examples, etc.

Figure 7E:
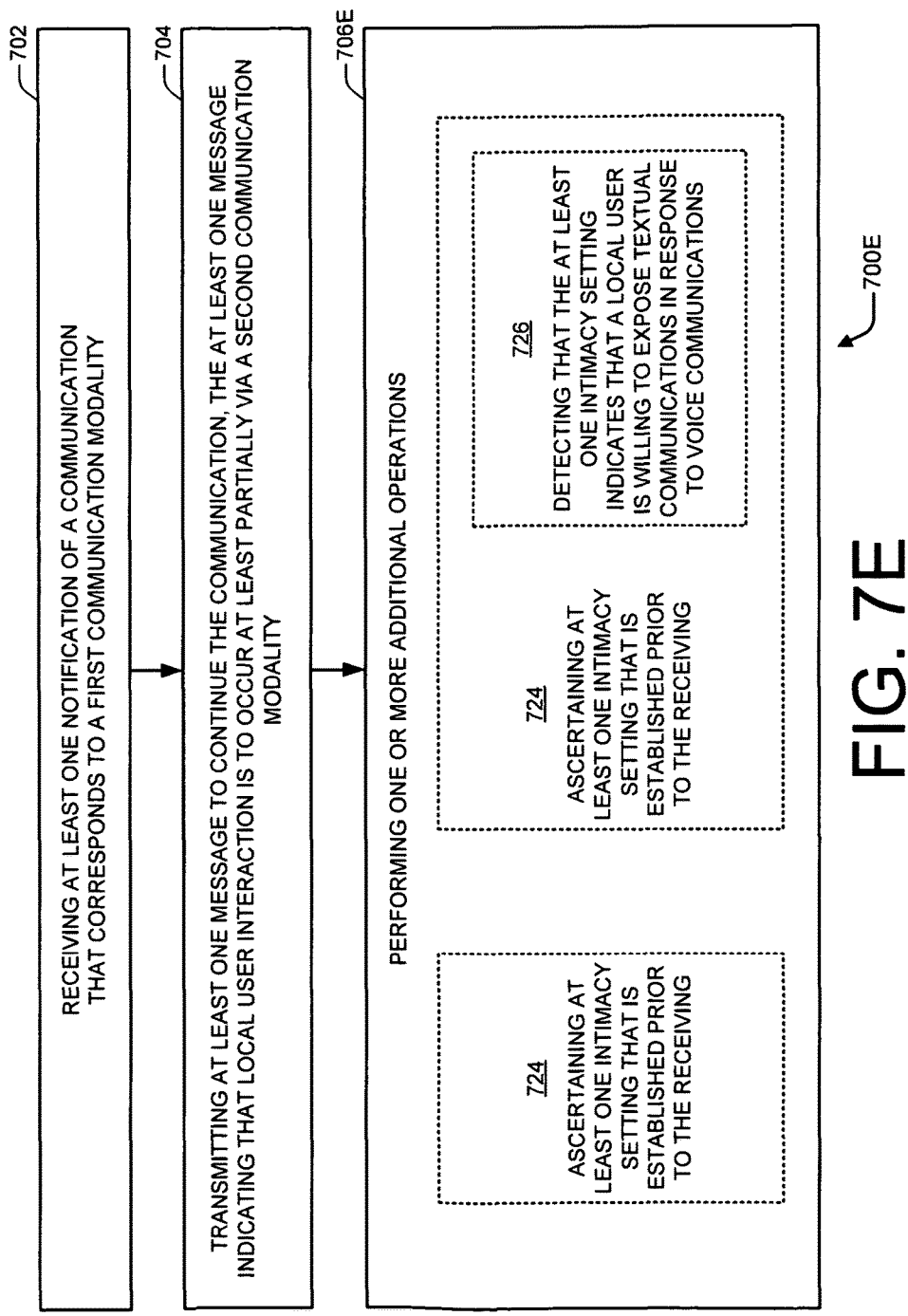

FIG. 7E illustrates an example operation 706E of performing one or more additional operations, such as example operation 724 or example operation 726, which may be in conjunction with operation 724. For certain example embodiments, an operation 724 may be directed at least partially to ascertaining at least one intimacy setting that is established prior to the receiving, wherein the transmitting at least one message to continue the communication, the at least one message indicating that local user interaction is to occur at least partially via a second communication modality, is performed responsive at least partly to the ascertaining. By way of example but not limitation, a local communication device 102L may, prior to transmitting a message indicating how a local user 104L wishes to interact with local communication device 102L during a communication, ascertain at least one intimacy setting 204 (e.g., of FIG. 2) that a local user 104L established prior to receiving a notification of the communication. However, claimed subject matter is not limited to any particular described embodiments, implementations, examples, etc.

For certain example embodiments, an operation 726 may be directed at least partially to wherein the ascertaining at least one intimacy setting that is established prior to the receiving (e.g., of operation 724) comprises detecting that the at least one intimacy setting indicates that a local user is willing to expose textual communications in response to voice communications. By way of example but not limitation, a local communication device 102L may detect that an ascertained at least one intimacy setting 204 indicates that a local user 104L wishes to interact with local communication device 102L using a textual user interface in response to an incoming communication that corresponds to voice communication. However, claimed subject matter is not limited to any particular described embodiments, implementations, examples, etc.

Figure 7F:
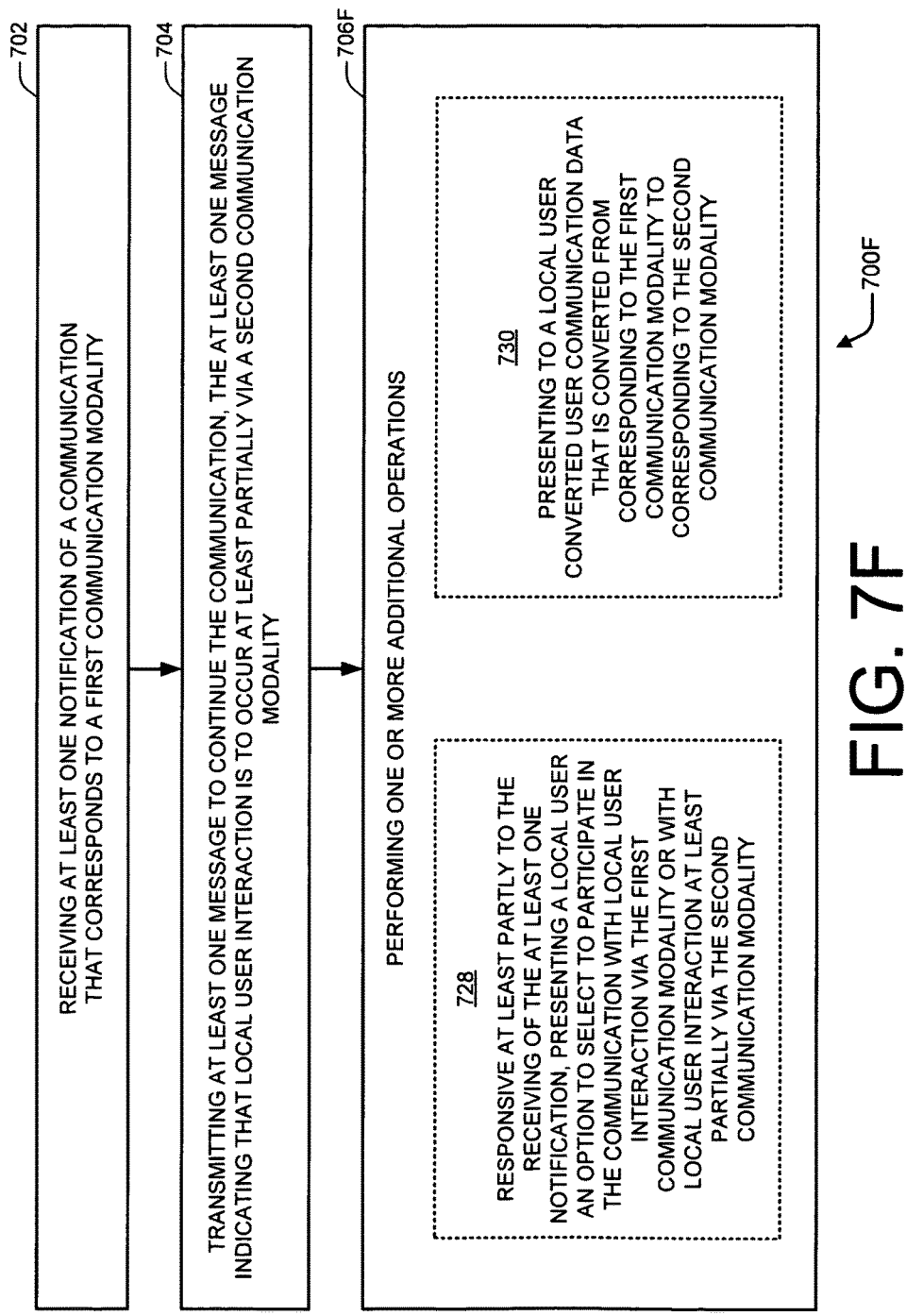

FIG. 7F illustrates an example operation 706F of performing one or more additional operations, such as example operation 728 or 730. For certain example embodiments, an operation 728 may be directed at least partially to responsive at least partly to the receiving of the at least one notification, presenting a local user an option to select to participate in the communication with local user interaction via the first communication modality or with local user interaction at least partially via the second communication modality, wherein the transmitting at least one message to continue the communication, the at least one message indicating that local user interaction is to occur at least partially via a second communication modality, is performed at least partially responsive to selection of an option by the local user. By way of example but not limitation, at least partly responsive to receiving a notification of a communication corresponding to a first communication modality, a local communication device 102L may provide a user interface feature (e.g., a physical switch, knob, etc.; a set of options displayed on a screen; a combination thereof, etc.) that enables a local user 104L to select between or among two or more options, such as continuing with the communication using interaction via the first communication modality or such as continuing with the communication using interaction at least partially via a second communication modality. At least in such an example scenario, transmission of a message to continue the communication, including but not limited to a content of the message, may depend at least partly on a selection by a local user 104L of at least one option provided by the user interface feature. For an example implementation, a local communication device 102L may enable a local user 104L to select a communication modality after a communication notification has been received. However, claimed subject matter is not limited to any particular described embodiments, implementations, examples, etc.

For certain example embodiments, an operation 730 may be directed at least partially to presenting to a local user converted user communication data that is converted from corresponding to the first communication modality to corresponding to the second communication modality. By way of example but not limitation, a local communication device 102L may present to a local user 104L converted user communication data that is converted from corresponding to a first communication modality to corresponding to a second communication modality (e.g., in accordance with an action 412h, 414c, a combination thereof, etc.). For an example implementation, converted text data, which is converted from voice data provided by a remote user 104R to a remote communication device 102R, may be presented to a local user 104L by a local communication device 102L. However, claimed subject matter is not limited to any particular described embodiments, implementations, examples, etc.

Figure 7G:
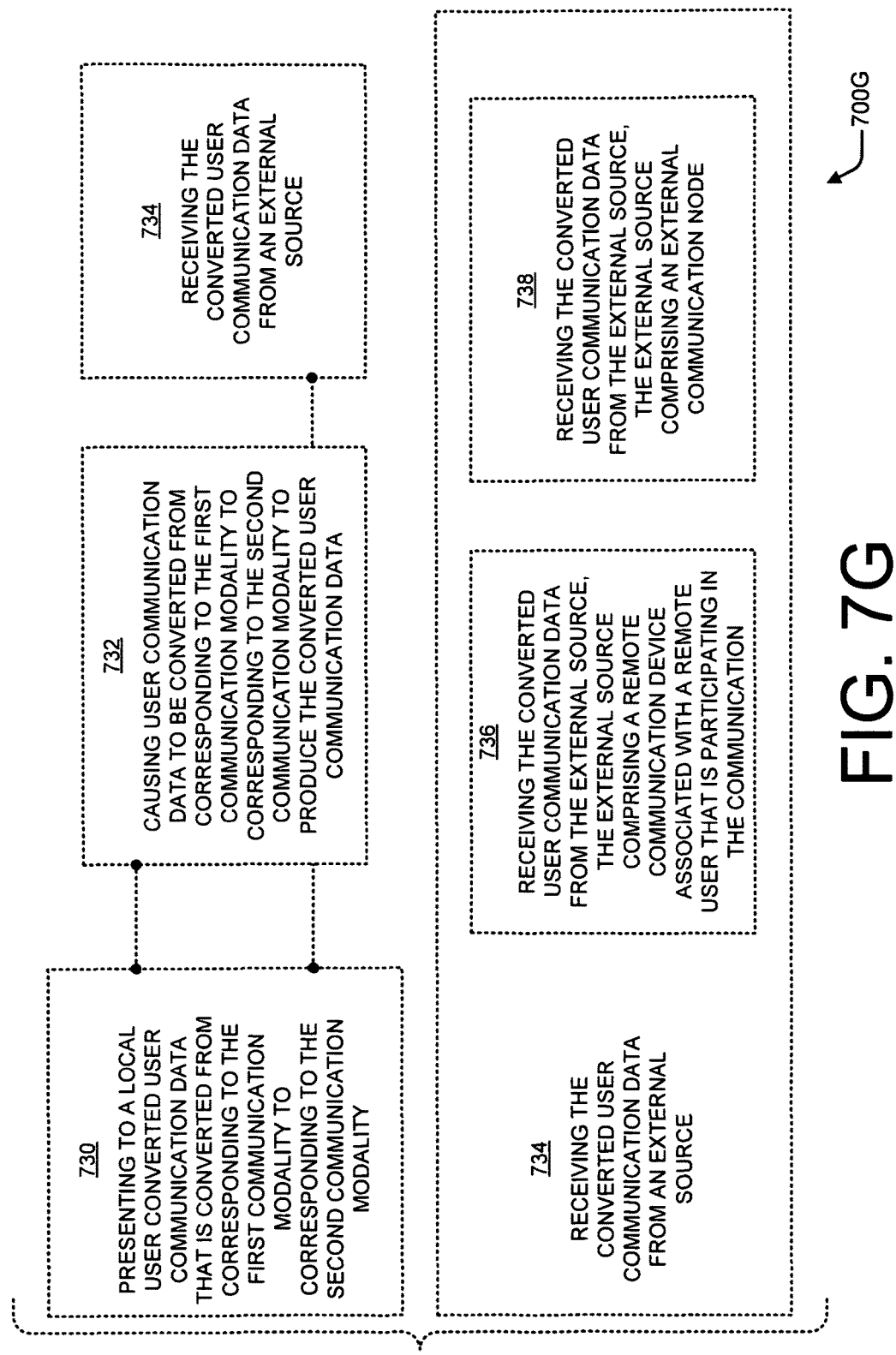

FIG. 7G illustrates example operations 732 or 734 and example operations 736 or 738, which may be in conjunction with operations 730 and 734, respectively. For certain example embodiments, an operation 732 may be directed at least partially to causing user communication data to be converted from corresponding to the first communication modality to corresponding to the second communication modality to produce the converted user communication data. By way of example but not limitation, a local communication device 102L may cause user communication data to be converted from corresponding to a first communication modality to corresponding to a second communication modality (e.g., in accordance with an action 412g, etc.). For an example implementation, a local communication device 102L may cause voice communication data to be converted to text communication data. However, claimed subject matter is not limited to any particular described embodiments, implementations, examples, etc.

For certain example embodiments, an operation 734 may be directed at least partially to receiving the converted user communication data from an external source. By way of example but not limitation, a local communication device 102L may receive converted user communication data from an external source that has performed a conversion from user communication data (e.g., in accordance with an action 414b, etc.). For an example implementation, a local communication device 102L may receive converted text data, which has been converted from voice data, from an external source. By way of example but not limitation, an external source may comprise a remote communication device 102R, a conversion node 408, an intermediate node between remote communication device 102R and local communication device 102L along a channel 108 (e.g., a telecommunications node, a gateway node, a server node, an internet-based node, some combination thereof, etc.), a combination thereof, and so forth. However, claimed subject matter is not limited to any particular described embodiments, implementations, examples, etc.

For certain example embodiments, an operation 736 may be directed at least partially to wherein the receiving the converted user communication data from an external source (e.g., of operation 734) comprises receiving the converted user communication data from the external source, the external source comprising a remote communication device associated with a remote user that is participating in the communication. By way of example but not limitation, a local communication device 102L may receive converted user communication data from a remote communication device 102R that is associated with a remote user 104R that is participating in a communication with a local user 104L that is associated with local communication device 102L (e.g., in accordance with an action 414b, etc.). For an example implementation, a remote communication device 102R may convert voice communication data accepted from a remote user 104R to produce converted text communication data, and remote communication device 102R may transmit the converted text communication data to a local communication device 102L. However, claimed subject matter is not limited to any particular described embodiments, implementations, examples, etc.

For certain example embodiments, an operation 738 may be directed at least partially to wherein the receiving the converted user communication data from an external source (e.g., of operation 734) comprises receiving the converted user communication data from the external source, the external source comprising an external communication node. By way of example but not limitation, a local communication device 102L may receive converted user communication data from a conversion node 408, from an intermediate node between remote communication device 102R and local communication device 102L along a channel 108 that is at least partly responsible for conversion (e.g., a telecommunications node, a gateway node, a server node, an internet-based node, some combination thereof, etc.), a combination thereof, and so forth. However, claimed subject matter is not limited to any particular described embodiments, implementations, examples, etc.

Figure 7H:
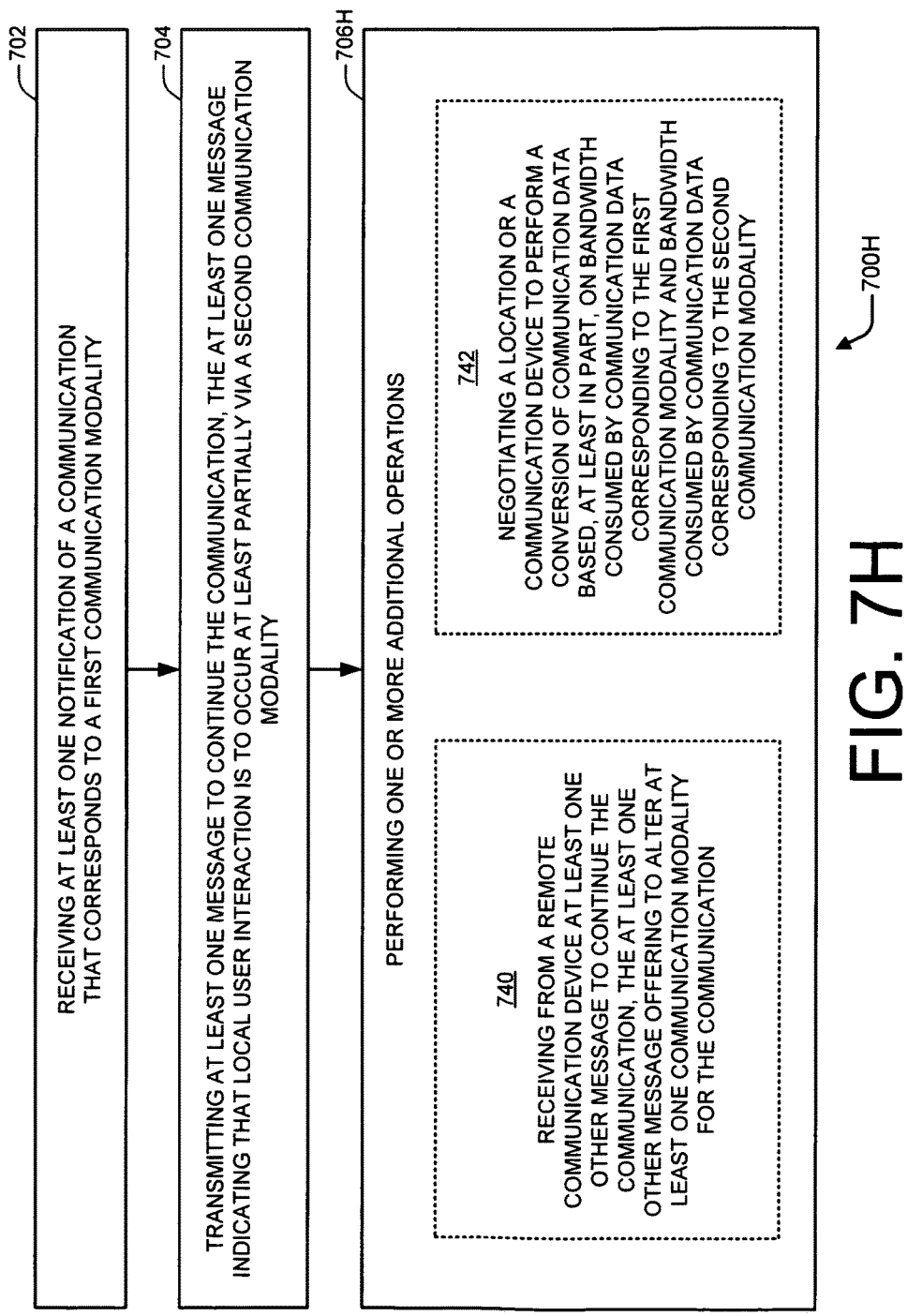
Figure 71:
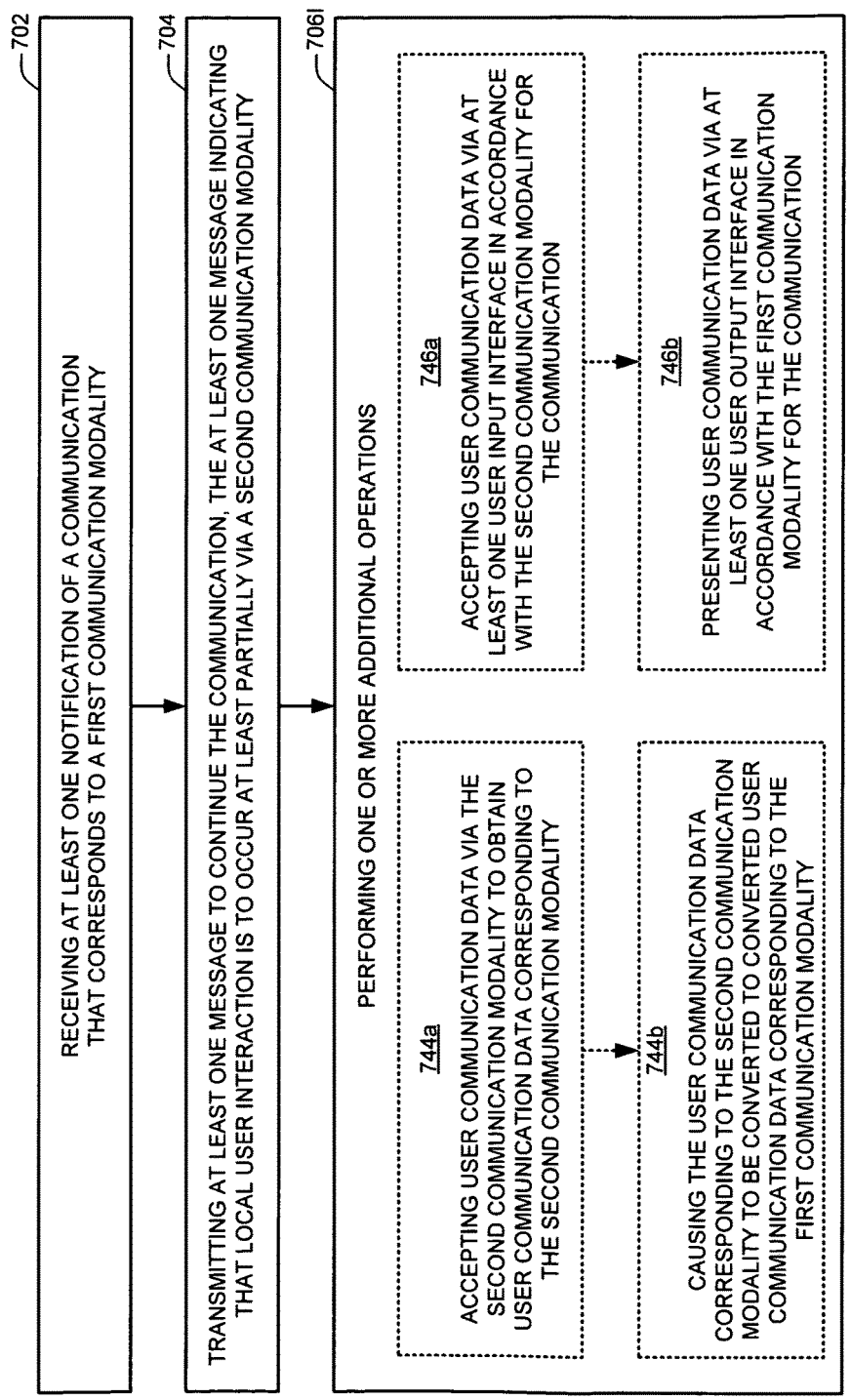

FIG. 7H illustrates an example operation 706H of performing one or more additional operations, such as example operation 740 or 742. For certain example embodiments, an operation 740 may be directed at least partially to receiving from a remote communication device at least one other message to continue the communication, the at least one other message offering to alter at least one communication modality for the communication. By way of example but not limitation, a local communication device 102L may receive from a remote communication device 102R a message to continue a communication with the message requesting a change in at least one communication modality of the communication. For an example implementation, a message may request that a communication be migrated fully to a second communication modality, be migrated fully or partially to a third communication modality, be migrated to a third and a fourth communication modality, be changed such that a remote user 104R is to interact with remote communication device 102R via a second communication modality for an input interface or an output interface (e.g., but continue to interact via a first communication modality for the other interface), be changed such that a local user 104L interacts with a local communication device 102L for at least one of input interaction or output interaction using other than a second communication modality, any combination thereof, and so forth. However, claimed subject matter is not limited to any particular described embodiments, implementations, examples, etc.

For certain example embodiments, an operation 742 may be directed at least partially to negotiating a location or a communication device to perform a conversion of communication data based, at least in part, on bandwidth consumed by communication data corresponding to the first communication modality and bandwidth consumed by communication data corresponding to the second communication modality. By way of example but not limitation, a local communication device 102L may negotiate with a remote communication device 102R, with an intermediate node, with a conversion node, a combination thereof, etc. to determine a location or a communication device that is to perform a conversion. For an example implementation, a negotiation may be based at least partly on a bandwidth (e.g., a communication bandwidth, a storage bandwidth, a processing bandwidth, a combination thereof, etc.) consumed by (unconverted) communication data versus a bandwidth consumed by converted communication data during transmission, during storage, during conversion, any combination thereof, and so forth. For instance, if transmission bandwidth is at a premium, a negotiation may result in voice data being converted to text data prior to transmission. Additionally or alternatively, if processing bandwidth (e.g., at a remote communication device 102R, a local communication device 102L, an intermediate or other node, a combination thereof, etc.) is at a premium, a negotiation may result in a conversion being performed at a location having relatively more processing power, relatively more available processing capacity, a combination thereof, and so forth. However, claimed subject matter is not limited to any particular described embodiments, implementations, examples, etc.

FIG. 7I illustrates an example operation 706I of performing one or more additional operations, such as example operations 744a and 744b or example operations 746a and 746b. For certain example embodiments, an operation 744a or 744b may be directed at least partially to accepting user communication data via the second communication modality to obtain user communication data corresponding to the second communication modality or causing the user communication data corresponding to the second communication modality to be converted to converted user communication data corresponding to the first communication modality, respectively. By way of example but not limitation, a local communication device 102L may accept user communication data from a local user 104L via a second communication modality and may cause the accepted user communication data to be converted to converted user communication data corresponding to a first communication modality (e.g., in accordance with actions 412i and 412j, actions 414d and 416a, actions 418g and 418h, a combination thereof, etc.). For an example implementation, a local communication device 102L may accept text data via a text-based input interface in accordance with a textual communication modality and may cause the text data to be converted to voice data. However, claimed subject matter is not limited to any particular described embodiments, implementations, examples, etc.

For certain example embodiments, an operation 746a or 746b may be directed at least partially to accepting user communication data via at least one user input interface in accordance with the second communication modality for the communication and presenting user communication data via at least one user output interface in accordance with the first communication modality for the communication, respectively. By way of example but not limitation, a local communication device 102L may accept user communication data via at least one user input interface 516a in accordance with a second communication modality (e.g., text) and may present user communication data via at least one user output interface 516b in accordance with a first communication modality (e.g., voice) for a given communication (e.g., in accordance with an action 418g and an action 418f, respectively, etc.). However, claimed subject matter is not limited to any particular described embodiments, implementations, examples, etc.

Figure 7J:
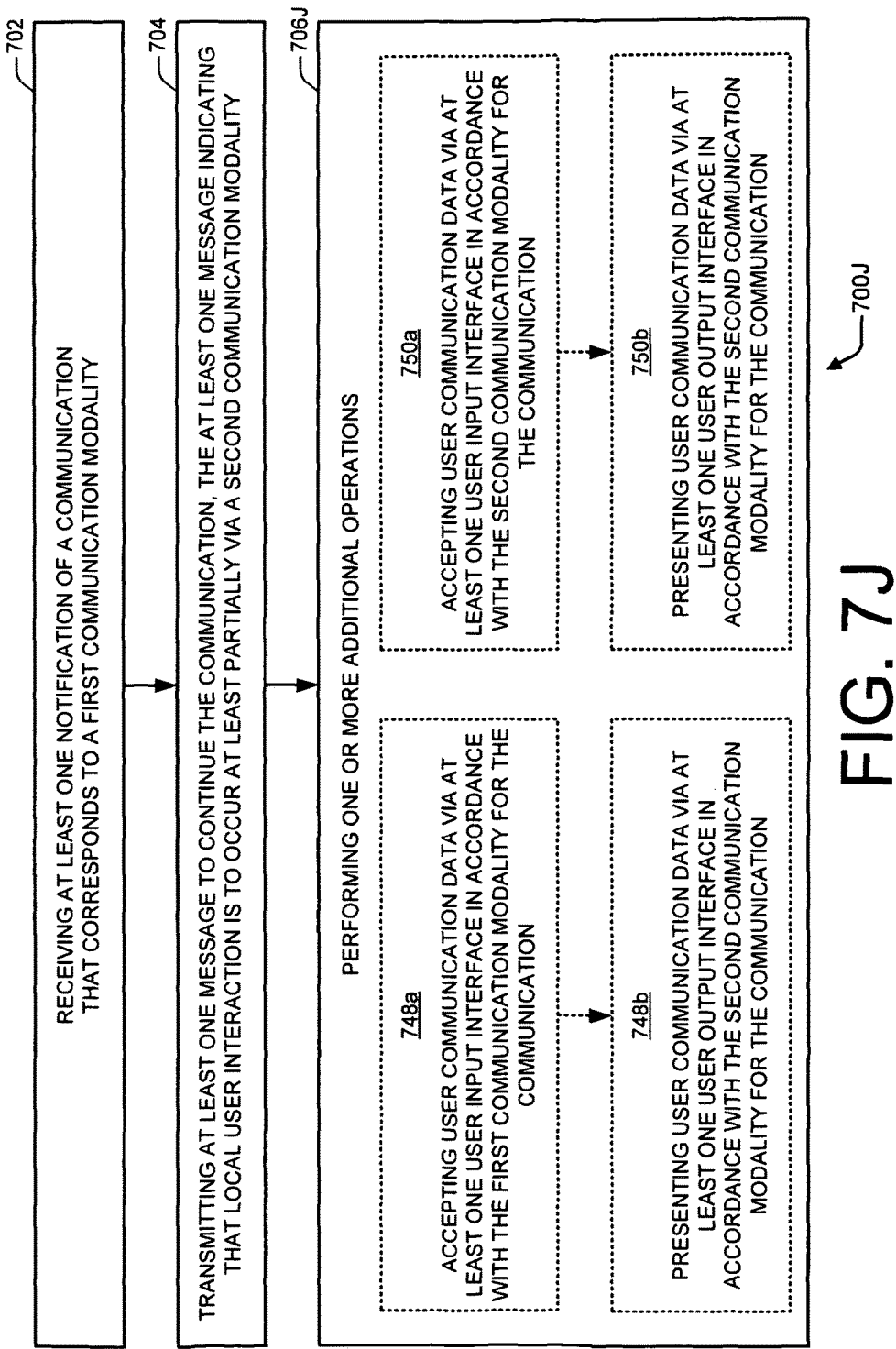

FIG. 7J illustrates an example operation 706J of performing one or more additional operations, such as example operations 748a and 748b or example operations 750a and 750b. For certain example embodiments, an operation 748a or 748b may be directed at least partially to accepting user communication data via at least one user input interface in accordance with the first communication modality for the communication or presenting user communication data via at least one user output interface in accordance with the second communication modality for the communication. By way of example but not limitation, a local communication device 102L may accept user communication data via at least one user input interface 516a in accordance with a first communication modality (e.g., voice) and may present user communication data via at least one user output interface 516b in accordance with a second communication modality (e.g., text) for a given communication. For an example implementation, for a given communication in which a remote user 104R initiates a communication and intends to interact with a remote communication device 102R via voice for both input and output, a local communication device 102L may accept voice input from a local user 104L and may present text output to local user 104L. However, claimed subject matter is not limited to any particular described embodiments, implementations, examples, etc.

For certain example embodiments, an operation 750a or 750b may be directed at least partially to accepting user communication data via at least one user input interface in accordance with the second communication modality for the communication or presenting user communication data via at least one user output interface in accordance with the second communication modality for the communication, respectively. By way of example but not limitation, a local communication device 102L may accept user communication data via at least one user input interface 516a in accordance with a second communication modality (e.g., text) and present user communication data via at least one user output interface 516b in accordance with the second communication modality for a given communication (e.g., in accordance with actions 412i and 412h, actions 414d and 414c, a combination thereof, etc.). However, claimed subject matter is not limited to any particular described embodiments, implementations, examples, etc.

Figure 7K:
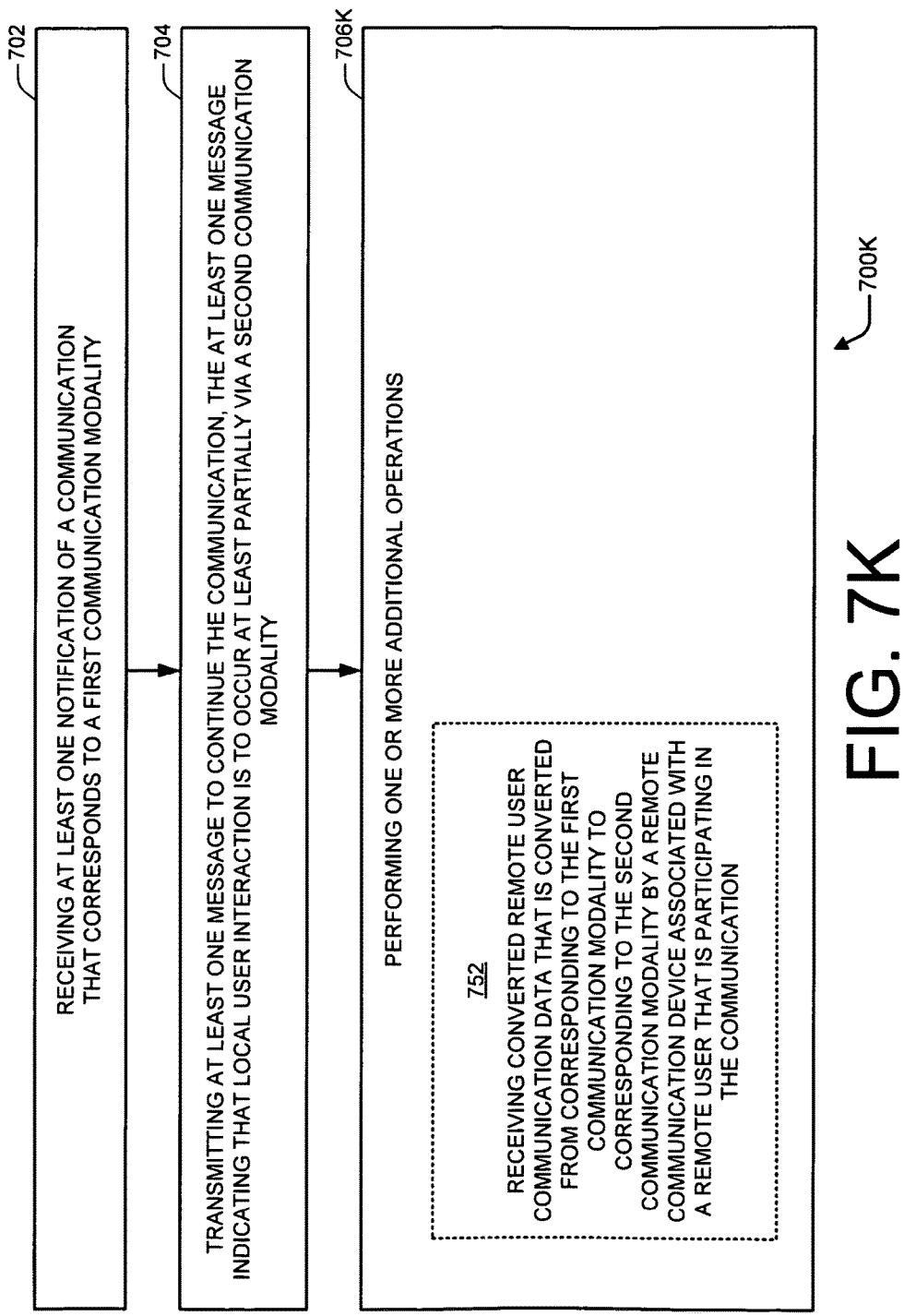

FIG. 7K illustrates an example operation 706K of performing one or more additional operations, such as example operation 752. For certain example embodiments, an operation 752 may be directed at least partially to receiving converted remote user communication data that is converted from corresponding to the first communication modality to corresponding to the second communication modality by a remote communication device associated with a remote user that is participating in the communication. By way of example but not limitation, a local communication device 102L may receive converted remote user communication data (e.g., converted voice data, converted text data, a combination thereof, etc.) that is converted from corresponding to a first communication modality (e.g., voice or text) to corresponding to a second communication modality (e.g., text or voice, respectively) by a remote communication device 102R that is associated with a remote user 104R that is participating in a communication with a local user 104L (e.g., in accordance with an action 414b for a converted text data example, etc.). However, claimed subject matter is not limited to any particular described embodiments, implementations, examples, etc.

FIG. 7L illustrates an example operation 706L of performing one or more additional operations, such as example operation 754a, 754b, or 754c. For certain example embodiments, an operation 754a, 754b, or 754c may be directed at least partially to accepting local user communication data via the second communication modality to obtain local user communication data corresponding to the second communication modality, causing the local user communication data corresponding to the second communication modality to be converted to converted local user communication data corresponding to the first communication modality, or transmitting the converted local user communication data corresponding to the first communication modality to the remote communication device, respectively. By way of example but not limitation, a local communication device 102L may accept local user text data as input by a local user 104L, may cause the local user text data to be converted to converted local user voice data, and may transmit the converted local user voice data to a remote communication device 102R (e.g., in accordance with actions 412*i*, 412*j*, and 412*k*; actions 414*d*, 416*a*, and 416*b*; or actions 418*g*, 418*h*, and 418*i*; a combination thereof; etc.). Additionally or alternatively, a local communication device 102L may accept local user voice data, convert it to converted local user text data, and transmit the converted local user text data. However, claimed subject matter is not limited to any particular described embodiments, implementations, examples, etc.

FIG. 7M illustrates an example operation 706M of performing one or more additional operations, such as example operation 756*a*, 756*b*, or 756*c*. For certain example embodiments, an operation 756*a*, 756*b*, or 756*c* may be directed at least partially to receiving remote user communication data corresponding to the first communication modality, causing the remote user communication data corresponding to the first communication modality to be converted to converted remote user communication data corresponding to the second communication modality, and presenting the converted remote user communication data corresponding to the second communication modality to a local user via at least one user output interface in accordance with the second communication modality, respectively. By way of example but not limitation, a local communication device 102L may receive remote user voice data, may cause the remote user voice data to be converted to converted remote user text data, and may present the converted remote user text data to a local user 104L via at least one user output interface 516*b* (e.g., in accordance with actions 412*f*, 412*g*, and 412*h*; etc.). Additionally or alternatively, a local communication device 102L may receive remote user text data, may cause the remote user text data to be converted to converted remote user voice data, and may present the converted remote user voice data. However, claimed subject matter is not limited to any particular described embodiments, implementations, examples, etc.

FIG. 7N illustrates example operations 758*a* and 758*b* or example operations 760*a* and 760*b*, which may be in conjunction with operations 758*a* or 758*b*, respectively. For certain example embodiments, an operation 758*a* or 758*b* may be directed at least partially to wherein the first communication modality comprises voice communication, and the second communication modality comprises textual communication, and wherein the transmitting at least one message to continue the communication, the at least one message indicating that local user interaction is to occur at least partially via a second communication modality, comprises transmitting a first message to accept the communication or transmitting a second message to indicate that the local user interaction is to occur at least partially in accordance with the textual communication, respectively. By way of example but not limitation, a local communication device 102L may transmit a first message in accordance with at least one voice signaling protocol to accept a communication and may transmit a second message to indicate that interaction by a local user 104L is to occur at least partially via textual communication. For an example implementation, a first message may traverse a different channel from that of a second message. However, claimed subject matter is not limited to any particular described embodiments, implementations, examples, etc.

For certain example embodiments, an operation 760*a* or 760*b* may be directed at least partially to wherein the transmitting a first message to accept the communication comprises transmitting the first message to answer a voice call or establish a voice connection or to wherein the transmitting a second message to indicate that the local user interaction is to occur at least partially in accordance with the textual communication comprises transmitting the second message to cause a remote communication device to play an audible message to a remote user to indicate that the local user interaction is to occur at least partially in accordance with the textual communication, respectively. By way of example but not limitation, a first message to accept a voice communication may comprise a message to answer a call (e.g., signaling an off-hook condition) or to establish a voice connection (e.g., an ACK message, an OK message, a combination thereof, etc.). By way of example but not limitation, a second message may cause a remote communication device 102R to play an audible message to a remote user 104R to indicate that interaction by a local user 104L is to occur at least partially via a textual interface. However, claimed subject matter is not limited to any particular described embodiments, implementations, examples, etc.

For certain example embodiments, a method, a process, etc. may further be directed at least partially to wherein the second message comprises the audible message, and the audible message comprises sounds in a voice of a local user for the remote user to hear. By way of example but not limitation, a second message transmitted by a local communication device 102L may include an audible message that includes sounds in a voice of a local user 104L that may be played for a remote user 104R to listen to. For an example implementation, an audible message may be spoken if or when a local user 104L determines to change a communication modality that may be expected by a remote user 104R, may be pre-recorded for retrieval from memory of a local communication device 102L if or when a local user 104R determines to change a communication modality, may be pre-recorded for retrieval from memory of a local communication device 102L if it is to be sent responsive to ascertainment of at least one intimacy setting, any combination thereof, and so forth. However, claimed subject matter is not limited to any particular described embodiments, implementations, examples, etc.

Figure 8B:
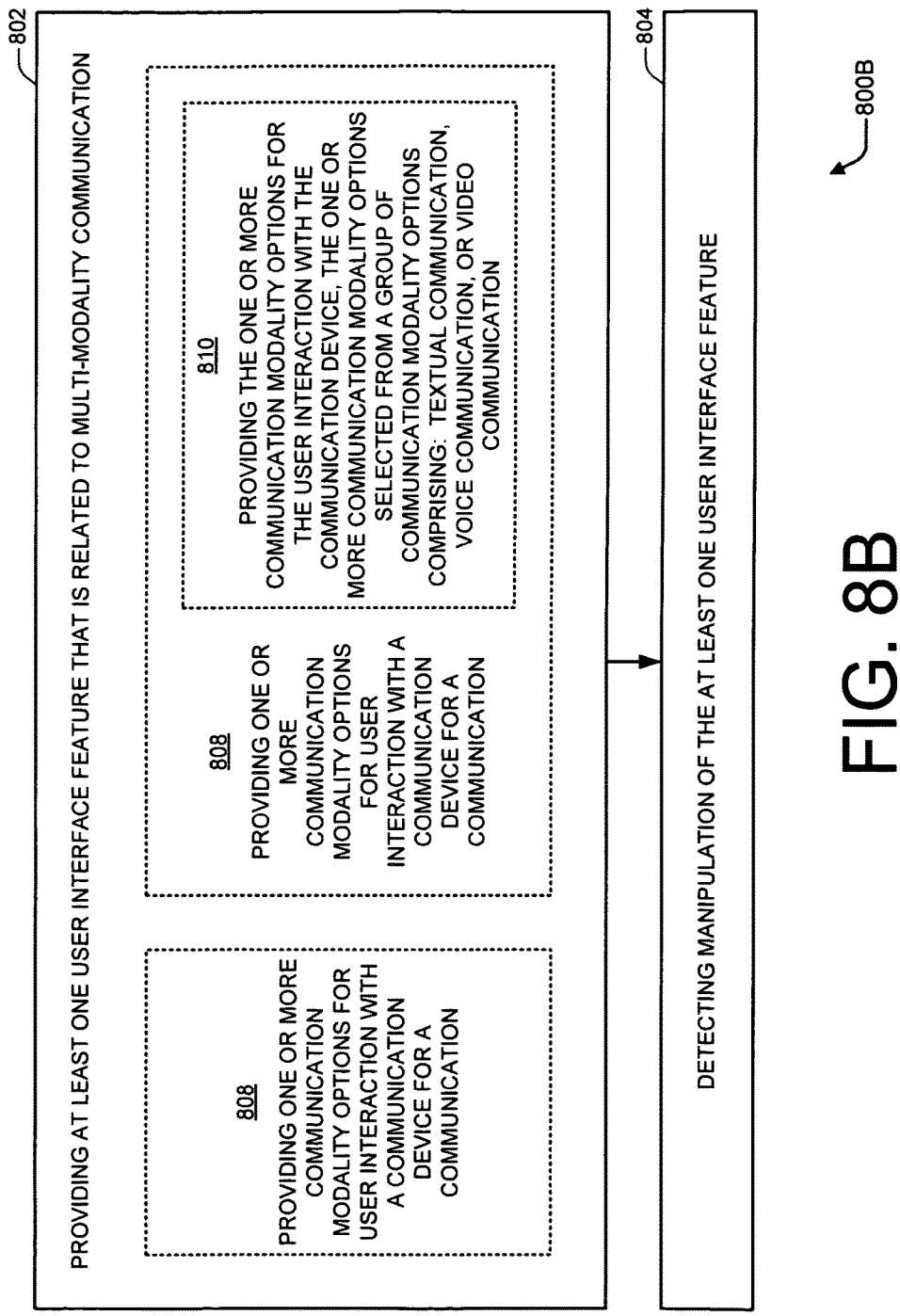

FIG. 8A is a flow diagram 800A illustrating an example method for realizing a multi-modality communication user interface, in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operations of flow diagram 800A may be performed so as to be fully or partially overlapping with other operation(s). By way of example and not limitation, certain operations of FIGS. 8A-8I are described herein below with particular reference to FIGS. 3B-3F. However, claimed subject matter is not limited to any particular described embodiments, implementations, examples, etc.

For certain example embodiments, a method for facilitating multi-modality communication, in which the method being at least partially implemented using hardware, may comprise an operation 802 or an operation 804. An operation 802 may be directed at least partially to providing at least one user interface feature that is related to multi-modality communication. By way of example but not limitation, a communication device 102 (e.g., a local communication device 102L) may provide at least one user interface feature 310 that is related to multi-modality communication. For an example implementation, a user interface feature provider 312 may provide one or more of user interface features

310*a*-310*f*. An operation 804 may be directed at least partially to detecting manipulation of the at least one user interface feature. By way of example but not limitation, a communication device 102 may detect manipulation of at least one user interface feature 310. For an example implementation, a user interface feature manipulation detector 308 may detect if a user manipulates a physical component 316 or a virtual component 318 of a user interface feature 310. However, claimed subject matter is not limited to any particular described embodiments, implementations, examples, etc.

For certain example embodiments, a method may further be directed at least partially to wherein the multi-modality communication comprises at least one communication in which one or more participants interact with one or more communication devices via at least two communication modalities that differ from each other. By way of example but not limitation, a multi-modality communication may include one or more participants (e.g., a local user 104L, a remote user 104R, a combination thereof, etc.) that interact with one or more communication devices (e.g., a local communication device 102L, a remote communication device 102R, a combination thereof, etc.) via a first communication modality 106-1 and a second communication modality 106-2 that differ from one another (e.g., voice versus text, text-only versus video and text, a combination thereof, etc.). However, claimed subject matter is not limited to any particular described embodiments, implementations, examples, etc.

FIGS. 8B-8I depict example alternatives for a flow diagram of FIG. 8A in accordance with certain example embodiments. As illustrated, flow diagrams of FIGS. 8B-8I may include any of the illustrated or described operations. Although operations are shown or described in a particular order, it should be understood that methods may be performed in alternative manners without departing from claimed subject matter, including, but not limited to, with a different order or number of operations or with a different relationship between or among operations. Also, at least some operations of flow diagrams of FIGS. 8B-8I may be performed so as to be fully or partially overlapping with other operation(s).

FIG. 8B illustrates example operations 808 and 810, which may be performed in conjunction with operation 808. For certain example embodiments, an operation 808 may be directed at least partially to wherein the providing at least one user interface feature that is related to multi-modality communication comprises providing one or more communication modality options for user interaction with a communication device for a communication. By way of example but not limitation, a user interface feature provider 312 of a communication device 102 may provide one or more communication modality options 314 for user interaction with communication device 102 for a given communication. However, claimed subject matter is not limited to any particular described embodiments, implementations, examples, etc.

For certain example embodiments, an operation 810 may be directed at least partially to wherein the providing one or more communication modality options for user interaction with a communication device for a communication (e.g., of operation 808) comprises providing the one or more communication modality options for the user interaction with the communication device, the one or more communication modality options selected from a group of communication modality options comprising: textual communication, voice communication, or video communication. By way of example but not limitation, one or more communication modality options 314 may be provided that are selected from textual communication, voice communication, or video communication. For an example implementation, communication modality options 314 that correspond to textual communication, voice communication, or video communication may be provided physically or virtually as shown by user interface feature 310*c* (e.g., of FIG. 3E). However, claimed subject matter is not limited to any particular described embodiments, implementations, examples, etc.

Figure 8C:
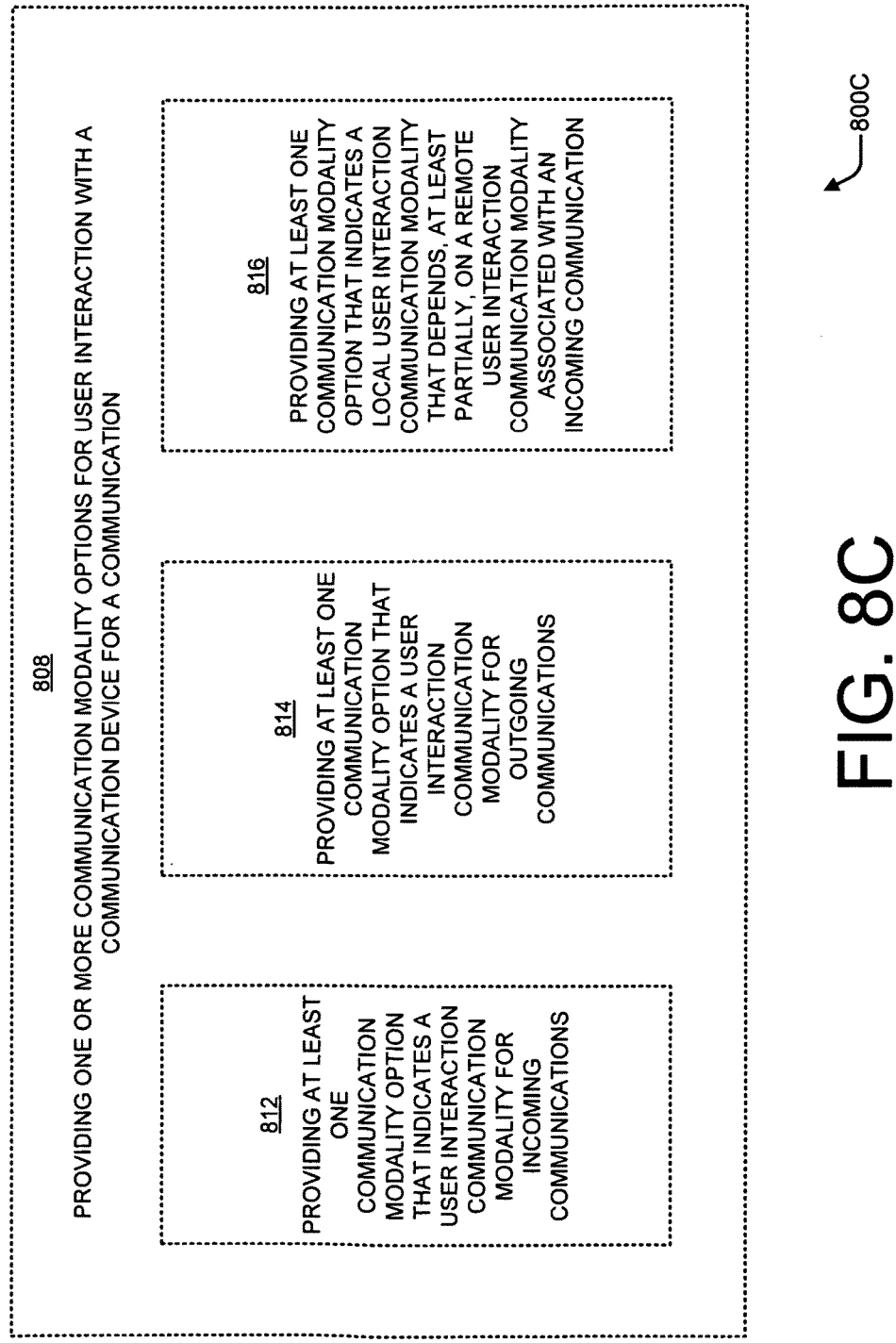

FIG. 8C illustrates example operations 812, 814, and 816, which may be performed in conjunction with operation 808. For certain example embodiments, an operation 812 may be directed at least partially to wherein the providing one or more communication modality options for user interaction with a communication device for a communication (e.g., of operation 808) comprises providing at least one communication modality option that indicates a user interaction communication modality for incoming communications. By way of example but not limitation, at least one communication modality option 314 may be provided that indicates a local user interaction communication modality for incoming communications (e.g., communications that are initiated by a remote user). However, claimed subject matter is not limited to any particular described embodiments, implementations, examples, etc.

For certain example embodiments, an operation 814 may be directed at least partially to wherein the providing one or more communication modality options for user interaction with a communication device for a communication (e.g., of operation 808) comprises providing at least one communication modality option that indicates a user interaction communication modality for outgoing communications. By way of example but not limitation, at least one communication modality option 314 may be provided that indicates a local user interaction communication modality for outgoing communications (e.g., for communications that are initiated by a local user). However, claimed subject matter is not limited to any particular described embodiments, implementations, examples, etc.

For certain example embodiments, an operation 816 may be directed at least partially to wherein the providing one or more communication modality options for user interaction with a communication device for a communication (e.g., of operation 808) comprises providing at least one communication modality option that indicates a local user interaction communication modality that depends, at least partially, on a remote user interaction communication modality associated with an incoming communication. By way of example but not limitation, at least one communication modality option 314*d* (e.g., of FIG. 3*e*) that indicates a local user interaction communication modality that depends, at least partially, on a remote user interaction communication modality associated with an incoming communication (e.g., in accordance with a user interface feature 310*d* or a display 318*c* (e.g., of FIG. 3E)) may be provided. However, claimed subject matter is not limited to any particular described embodiments, implementations, examples, etc.

Figure 8D:
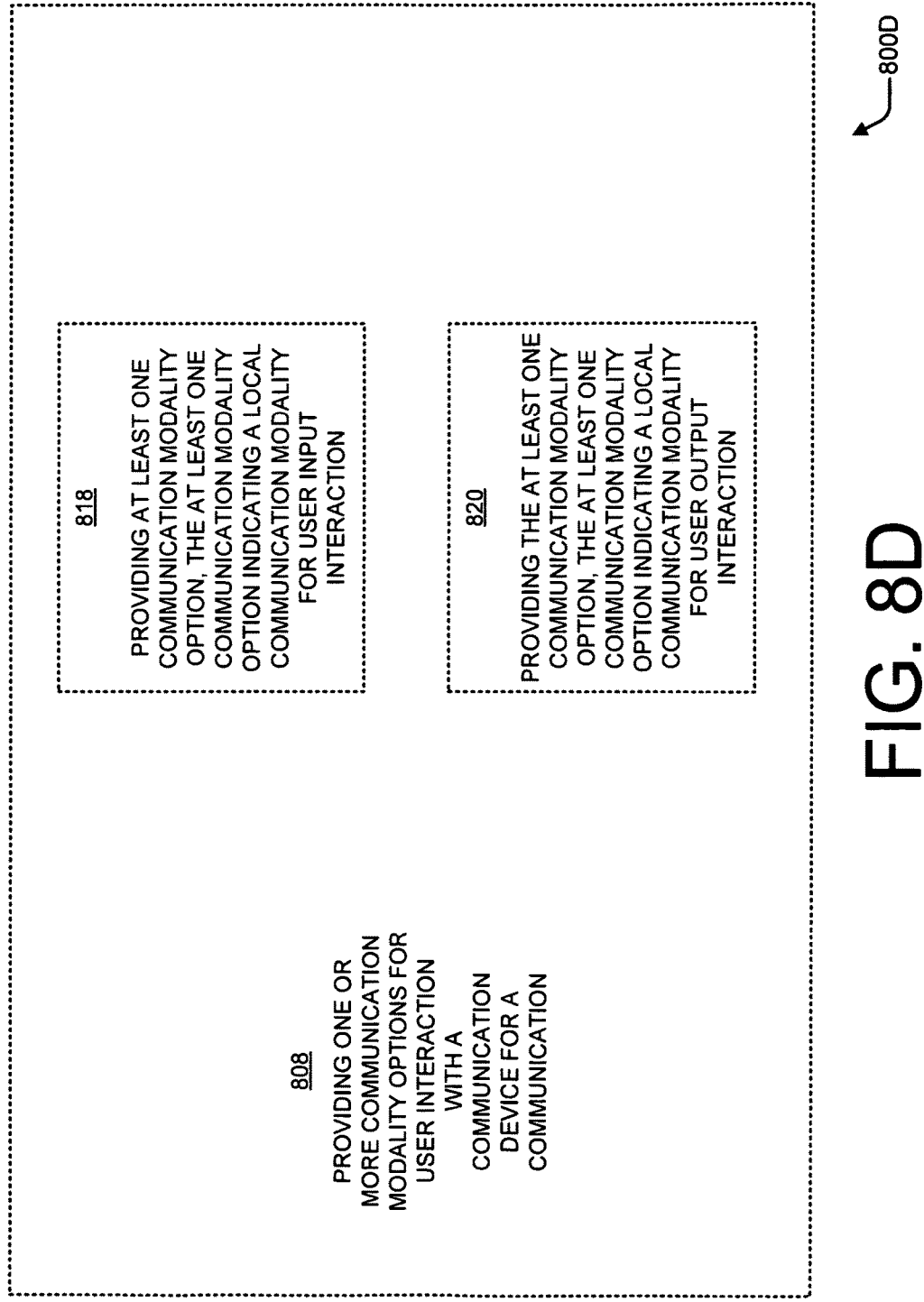

FIG. 8D illustrates example operations 818 and 820, which may be performed in conjunction with operation 808. For certain example embodiments, an operation 818 may be directed at least partially to wherein the providing one or more communication modality options for user interaction with a communication device for a communication (e.g., of operation 808) comprises: providing at least one communication modality option, the at least one communication modality option indicating a local communication modality for user input interaction. By way of example but not limitation, at least one communication modality option 314c or 314f may be provided that indicates a local communication modality for user input interaction (e.g., in accordance with an upper row of a user interface feature 310c or a display 318b (e.g., of FIG. 3E), in accordance with user interface feature 310f or display 318e (e.g., of FIG. 3F), a combination thereof, etc.). However, claimed subject matter is not limited to any particular described embodiments, implementations, examples, etc.

For certain example embodiments, an operation 820 may be directed at least partially to wherein the providing one or more communication modality options for user interaction with a communication device for a communication (e.g., of operation 808) further comprises providing the at least one communication modality option, the at least one communication modality option indicating a local communication modality for user output interaction. By way of example but not limitation, at least one communication modality option 314c or 314f may be provided that indicates a local communication modality for user output interaction (e.g., in accordance with a lower row of a user interface feature 310c or a display 318b (e.g., of FIG. 3E), in accordance with a user interface feature 310f or a display 318e (e.g., of FIG. 3F), a combination thereof, etc.). Additionally or alternatively, a separate slider or dial (e.g., of FIG. 3D) in virtual or physical form may be provided for user input interaction and for user output interaction. However, claimed subject matter is not limited to any particular described embodiments, implementations, examples, etc.

For certain example embodiments, a method may further be directed at least partially to wherein the at least one communication modality option comprises a communication modality option that indicates both the local communication modality for user input interaction and the local communication modality for user output interaction, the local communication modality for user input interaction and the local communication modality for user output interaction comprising different communication modalities. By way of example but not limitation, a communication modality option 314f may be provided that indicates the local communication modality both for user input interaction and for user output interaction (e.g., in accordance with a user interface feature 310f or a display 318e (e.g., of FIG. 3F)), in which the communication modality for user input interaction differs from that of user output interaction. However, claimed subject matter is not limited to any particular described embodiments, implementations, examples, etc.

For certain example embodiments, a method may further be directed at least partially to wherein the local communication modality for user input interaction comprises textual communication, and the local communication modality for user output interaction comprises voice communication. By way of example but not limitation, a top-most button (e.g., reading "Incoming Voice-Outgoing Text") of communication modality options 314f (e.g., of FIG. 3F) may be selected by a user. However, claimed subject matter is not limited to any particular described embodiments, implementations, examples, etc.

Figure 8E:
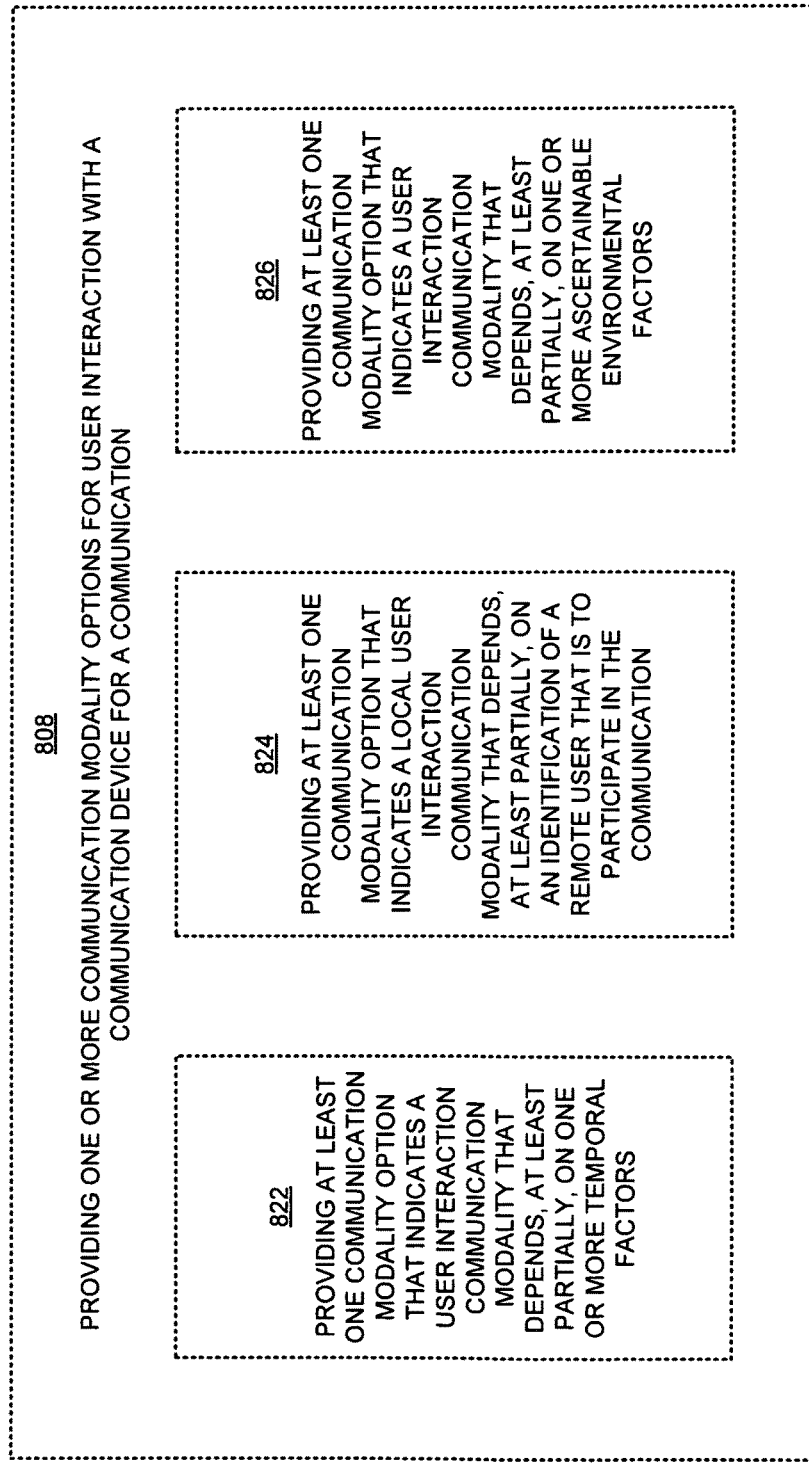

FIG. 8E illustrates example operations 822, 824, and 826, which may be performed in conjunction with operation 808. For certain example embodiments, an operation 822 may be directed at least partially to wherein the providing one or more communication modality options for user interaction with a communication device for a communication (e.g., of operation 808) comprises providing at least one communication modality option that indicates a user interaction communication modality that depends, at least partially, on one or more temporal factors. By way of example but not limitation, a communication device 102 may provide a user interface feature 310 having communication modality options 314 that are associated with one or more temporal factors. Temporal factors may include, but are not limited to, a time of the day, a day of the week, a conflicting event (e.g., from a scheduling calendar), any combination thereof, and so forth. For an example implementation, a user may establish via a display 318a of a virtual component 318 of a user interface feature 310 that communications are accepted in accordance with textual communication user interaction weekdays between 8-9 am and 5-6 pm, when the user is engaged in a noisy commute to work. However, claimed subject matter is not limited to any particular described embodiments, implementations, examples, etc.

For certain example embodiments, an operation 824 may be directed at least partially to wherein the providing one or more communication modality options for user interaction with a communication device for a communication (e.g., of operation 808) comprises providing at least one communication modality option that indicates a local user interaction communication modality that depends, at least partially, on an identification of a remote user that is to participate in the communication. By way of example but not limitation, a communication device 102 may provide a user interface feature 310 having communication modality options 314 that are associated with people or numbers of a contacts listing. For an example implementation, a local user interaction may depend, at least partly, on a remote user identification matching a person in a contact listing who is associated with a particular local user interaction communication modality in accordance with at least one intimacy setting, which intimacy setting may be established by user selection of a communication modality option 314 that is linked to the matching person. However, claimed subject matter is not limited to any particular described embodiments, implementations, examples, etc.

For certain example embodiments, an operation 826 may be directed at least partially to wherein the providing one or more communication modality options for user interaction with a communication device for a communication (e.g., of operation 808) comprises providing at least one communication modality option that indicates a user interaction communication modality that depends, at least partially, on one or more ascertainable environmental factors. By way of example but not limitation, at least one communication modality option 314 may be provided that indicates how a user interaction communication modality depends at least partially on at least one environmental factor that is ascertainable by a communication device 102. Examples of ascertainment of environmental factors may include, but are not limited to, ascertaining if detected motion correlates with movement in a car, ascertaining if silence is detected, ascertaining an ambient lighting level, ascertaining if a headset is connected to a communication device, ascertaining a location (e.g., textual communication may be selected if a user is at work) of a communication device (e.g., via cell towers, Wi-Fi networks, GPS, a combination thereof, etc.), any combination thereof, and so forth. For an example implementation, any one or more of such environmental factors may be ascertained and a corresponding multi-modality communication implementation may be automatically activated based at least partly on such ascertainment. However, claimed subject matter is not limited to any particular described embodiments, implementations, examples, etc.

Figure 8F:
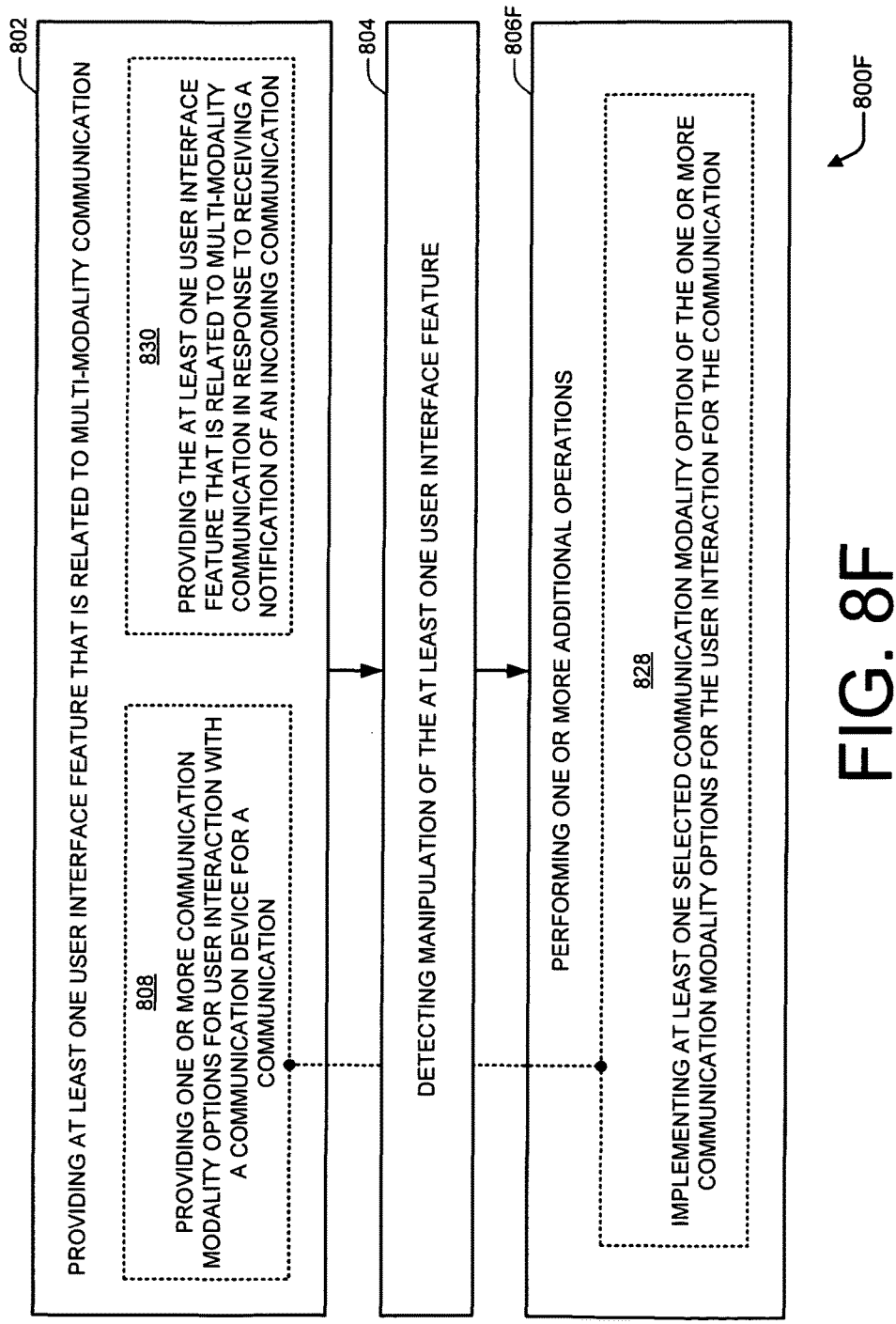

FIG. 8F illustrates example operation 828, which may be performed in conjunction with operation 808, and example operation 830. For certain example embodiments, an operation 828 may be directed at least partially to implementing at least one selected communication modality option of the one or more communication modality options for the user interaction for the communication. By way of example but not limitation, a user interface feature controller 306 may implement a selected communication modality option 314 of one or more communication modality options 314 for user interaction with respect to a given communication. For example implementations, a user interface feature controller 306, e.g.—in conjunction with other functionality of a communications device 102, may adjust (e.g., establish, set, change, a combination thereof, etc.) at least one intimacy setting 204, may initiate a communication in accordance with a selected communication modality option 314 or an intimacy setting 204, may accept an incoming communication on condition that a selected communication modality option 314 or an intimacy setting 204 is agreeable to a remote user that initiated the incoming communication, may configure a user input interface 516a or a user output interface 516b in for a communication in accordance with a selected communication modality option 314 or an intimacy setting 204, may attempt to migrate an existing communication from one communication modality to another communication modality in accordance with a selected communication modality option 314 or an intimacy setting 204, any combination thereof, and so forth. However, claimed subject matter is not limited to any particular described embodiments, implementations, examples, etc.

For certain example embodiments, an operation 830 may be directed at least partially to wherein the providing at least one user interface feature that is related to multi-modality communication comprises providing the at least one user interface feature that is related to multi-modality communication at least partially in response to receiving a notification of an incoming communication. By way of example but not limitation, a user interface feature provider 312 may provide a user interface feature 310 at least partially in response to receiving a notification of an incoming communication. For an example implementation, a user interface feature 310e or 310f of a display 318d or 318e (e.g., of FIG. 3F), respectively, that is related to multi-modality communication may be provided in response to receiving an incoming communication notification (e.g., in accordance with action 412a (e.g., of FIGS. 4D-4G)). However, claimed subject matter is not limited to any particular described embodiments, implementations, examples, etc.

Figure 8G:
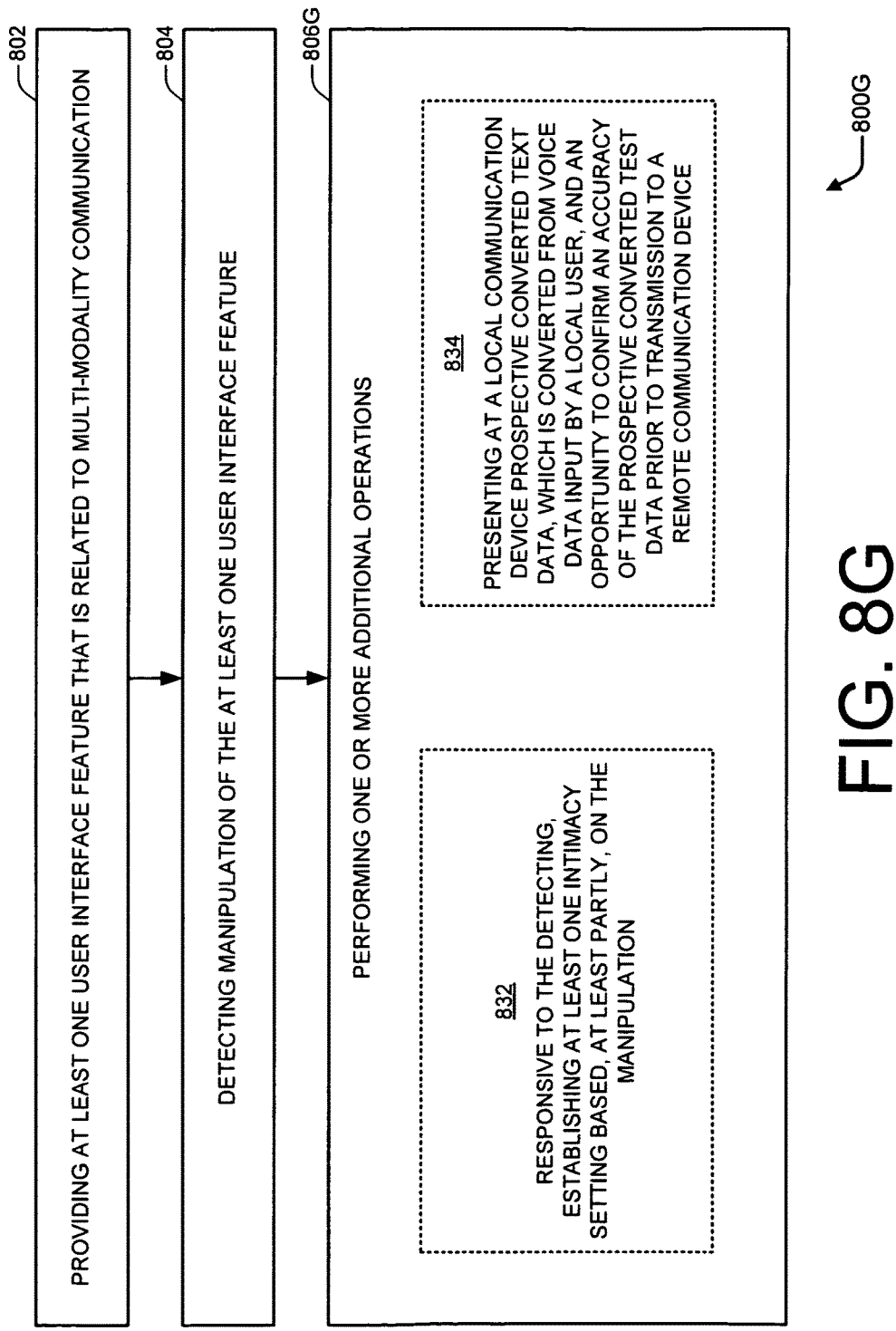

FIG. 8G illustrates example operations 832 and 834. For certain example embodiments, an operation 832 may be directed at least partially to responsive at least partly to the detecting, establishing at least one intimacy setting based, at least partly, on the manipulation. By way of example but not limitation, a user interface feature manipulation detector 308 may detect that a user has selected (e.g., by physical movement of a physical component 316, by touch (e.g., with finger presses, swipes, multi-finger touches, a combination thereof, etc.) of a virtual component 318, by speaking a command, by moving a body part (e.g., by moving a finger or hand that is visible to a camera of a communication device), by moving a communication device (e.g., that possesses one or more motion sensors), some combination thereof, etc.) a communication modality option 314 that represents a communication modality. At least partly in response to such detection, a user interface feature controller 306 may store at least one corresponding indication, value, combination thereof, etc. as at least one intimacy setting 204. However, claimed subject matter is not limited to any particular described embodiments, implementations, examples, etc.

For certain example embodiments, a method may further be directed at least partially wherein the at least one intimacy setting represents at least one degree of communicative exposure that a local user may establish for a local device. By way of example but not limitation, an intimacy setting 204 may represent a degree to which a local user wishes to expose communication capabilities of a local device. For an example implementation, such degrees may correspond to communicative degrees represented by communication modality options 314b of user interface feature 310b (e.g., of FIG. 3D). However, claimed subject matter is not limited to any particular described embodiments, implementations, examples, etc.

For certain example embodiments, an operation 834 may be directed at least partially to presenting at a local communication device prospective converted text data, which is converted from voice data input by a local user, and an opportunity to confirm an accuracy of the prospective converted test data prior to transmission to a remote communication device. By way of example but not limitation, a user interface feature controller 306 may present to a local user 104L prospective converted text, which is converted from voice data that is input by local user 104L, and may further present an opportunity to confirm an accuracy of a conversion prior to transmission of converted text to a remote communication device. For an example implementation, if prospective converted text is not approved, user interface feature controller 306 may provide a local user 104L another opportunity to speak to input voice data. However, claimed subject matter is not limited to any particular described embodiments, implementations, examples, etc.

FIG. 8H illustrates example operations 836 and 838. For certain example embodiments, an operation 836 may be directed at least partially to wherein the providing at least one user interface feature that is related to multi-modality communication comprises providing at least one physical component for the at least one user interface feature. By way of example but not limitation, a user interface feature provider 312 may provide at least one user interface feature 310 that includes at least one physical component 316. However, claimed subject matter is not limited to any particular described embodiments, implementations, examples, etc. For certain example embodiments, a method may further be directed at least partially wherein the at least one physical component comprises at least one of: at least one knob, at least one dial, at least one slider, at least one switch, one or more keys, one or more buttons, at least one trackball, at least one track wheel, at least one joystick, or at least one touch-sensitive surface. By way of example but not limitation, a physical component 316 may comprise a screen 316a, a switch 316b, a trackball or track wheel 316c, a button or key 316d, a dial or knob 316e, a slider 316f, any combination thereof, and so forth. However, claimed subject matter is not limited to any particular described embodiments, implementations, examples, etc.

For certain example embodiments, an operation 838 may be directed at least partially to wherein the providing at least one user interface feature that is related to multi-modality communication comprises providing at least one virtual component for the at least one user interface feature on at least one display. By way of example but not limitation, a user interface feature provider 312 may provide at least one user interface feature 310 that includes at least one virtual component 318. However, claimed subject matter is not limited to any particular described embodiments, implementations, examples, etc. For certain example embodiments, a method may further be directed at least partially to wherein the at least one virtual component comprises at least one of: at least one knob, at least one dial, at least one slider, at least one switch, one or more keys, one or more buttons, at least a portion of at least one menu, or at least one pop-up window. By way of example but not limitation, a virtual component 318 may comprise a display 318a, 318b, 318c, 318d, or 318e; a virtual version of a switch 316b, a virtual version of a button or key 316d, a virtual version of a dial or knob 316e, a virtual version of a slider 316f, one or more radio-style buttons, a menu, a scrolling menu, a pop-up menu, any combination thereof, and so forth. However, claimed subject matter is not limited to any particular described embodiments, implementations, examples, etc.

Figure 8I:
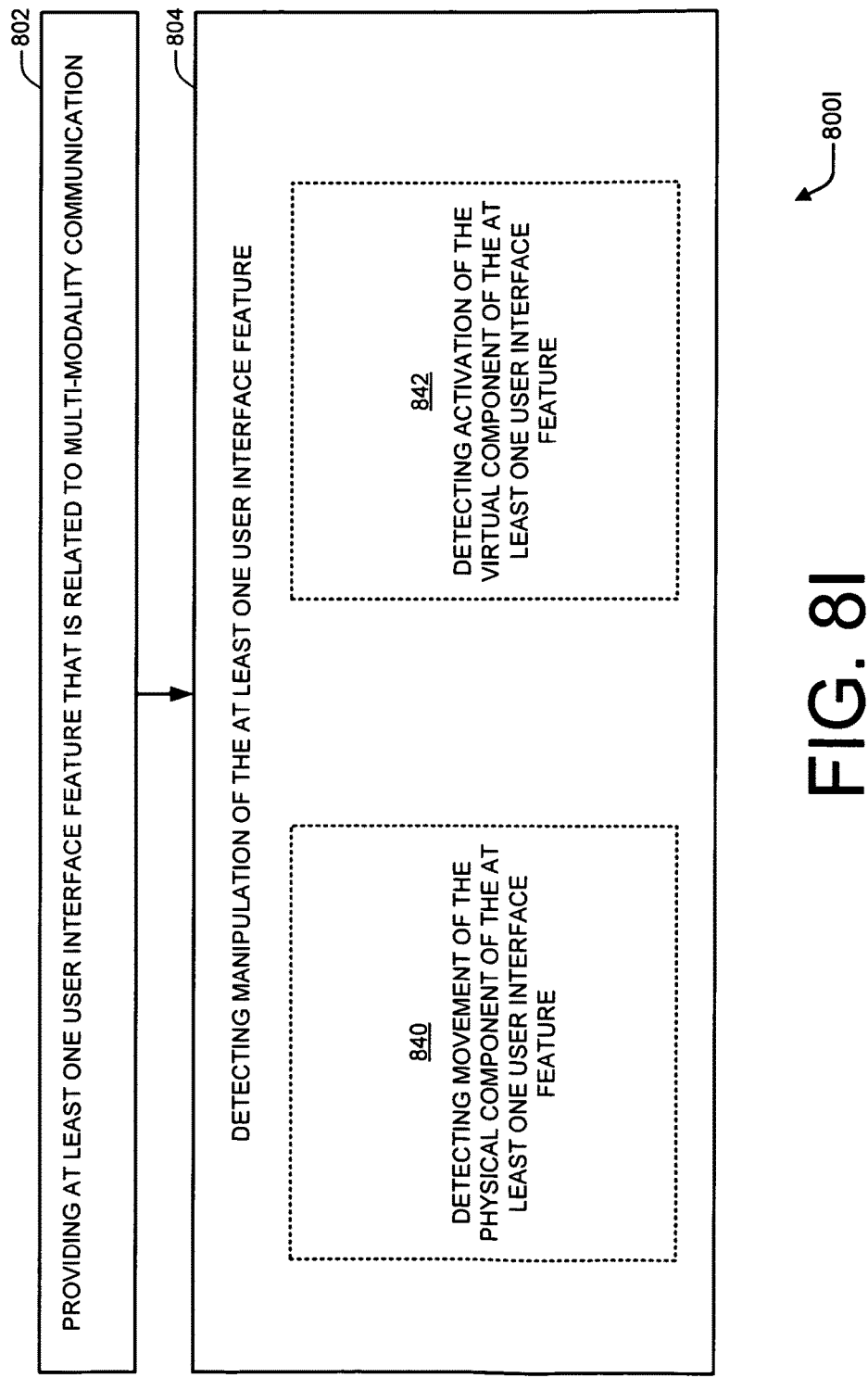

FIG. 8I illustrates example operations 840 and 842. For certain example embodiments, an operation 840 may be directed at least partially to wherein the at least one user interface feature includes a physical component that may be moved by a user and wherein the detecting manipulation of the at least one user interface feature comprises detecting movement of the physical component of the at least one user interface feature. By way of example but not limitation, at least one user interface feature 310 may comprise a physical component 316 that may be moved by a user, and a user interface feature manipulation detector 308 may detect physical movement (e.g., a press, a slide, a rotation, any combination thereof, etc.) of a physical component 316. However, claimed subject matter is not limited to any particular described embodiments, implementations, examples, etc.

For certain example embodiments, an operation 842 may be directed at least partially to wherein the at least one user interface feature includes a virtual component that may be activated by a user and wherein the detecting manipulation of the at least one user interface feature comprises detecting activation of the virtual component of the at least one user interface feature. By way of example but not limitation, at least one user interface feature 310 may comprise a virtual component 318 that may be activated by a user, and a user interface feature manipulation detector 308 may detect activation by the user. For certain example implementations, activation by a user may comprise touching (e.g., with finger presses, swipes, drags, multi-finger touches, stylus pressure, a combination thereof, etc.), speaking a command, moving a body part (e.g., by moving a finger or hand that is visible to a camera of a communication device), moving a communication device (e.g., that possesses one or more motion sensors), utilizing a person-machine interface device (e.g., a keyboard, a mouse, a stylus, a combination thereof, etc.), any combination thereof, and so forth. However, claimed subject matter is not limited to any particular described embodiments, implementations, examples, etc.

It should be appreciated that the particular embodiments (e.g., processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain acts, operations, etc. need not be performed in the order described, and they may be modified and/or may be omitted entirely, depending on the circumstances. Moreover, in various implementations, the acts or operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, and so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, and so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   (a) circuitry configured for providing at least one user interface feature, of a communication device, that is related to multi-modality communication that includes at least modality conversion, including at least:
      (1) circuitry for providing at least one virtual component for the at least one user interface feature on at least one display;
      (2) circuitry for providing at least one communication modality option indicative of a user interaction communication modality that depends, at least partially, on one or more temporal factors;
      (3) circuitry for providing at least one user interface feature configured to permit a user of the communication device to enter at least one user interaction setting for an incoming communication from a remote communication device when the incoming communication is indicative of a remote user interacting with the remote communication device at least partly via voice, the at least one user interface feature configured to permit the user to enter as the at least one user interaction setting a setting that, based on a detection of at least one environmental factor that is at least partly detectable by the communication device, selects between either a local user interaction communication modality for the incoming communication that is at least partly via text or a local user interaction communication modality for the incoming communication that is at least partly via video, including for at least:
         (i) circuitry for determining that a local user interaction communication modality for the incoming communication is to be at least partly via text if an identity of the remote user is determined not to match that of one or more particular persons, including at least:
            (A) circuitry for providing a user interface feature that permits a user to enter a user interaction setting for determining that a local user interaction communication modality for the incoming communication is to be at least partly via text based at least in part on detection of the environmental factor based on input from one or more sensors and based at least in part on determining that the identity of the remote user is determined not to match with one or more names in a contact list that are associated with a communication modality option that includes video;
            (B) circuitry configured for detecting manipulation of the at least one user interface feature of the communication device;
            (C) circuitry for establishing at least one user interaction setting, including at least establishing that the local user interaction communication modality for the incoming communication is to be at least partly via text, wherein the at least one user interaction setting represents at least one communication modality option for a local user with respect to a local device;
            (D) circuitry for presenting at a local communication device prospective converted text data, which text data is converted from voice data that is input by a local user; and
            (E) circuitry for providing an opportunity to approve transmission of the prospective converted text data prior to transmission to a remote communication device; or
         (ii) circuitry for determining that a local user interaction communication modality for the incoming communication is to be at least partly via video if the identity of the remote user is determined to match that of the one or more particular persons, including at least:
            (A) circuitry configured for detecting manipulation of the at least one user interface feature of the communication device;
            (B) circuitry for establishing at least one user interaction setting, including at least establishing that the local user interaction communication modality for the incoming communication is to be at least partly via video, wherein the at least one user interaction setting represents at least one communication modality option for a local user with respect to a local device.

2. The system of claim 1, wherein the multi-modality communication includes at least a communication in which two or more participants interact in at least one manner that is facilitated by the modality conversion with two or more communication devices via at least two communication modalities that differ from each other.

3. The system of claim 1, wherein the circuitry configured for providing at least one user interface feature, of a communication device, that is related to multi-modality communication that includes at least modality conversion comprises:
   circuitry for providing one or more communication modality options for user interaction with the communication device for a communication, the one or more communication modality options including at least one of: textual communication, voice communication, or video communication.

4. The system of claim 3, wherein the circuitry for providing one or more communication modality options for user interaction with the communication device for a communication comprises:
   circuitry for providing the one or more communication modality options for the user interaction with the communication device, the one or more communication modality options including at least one of: incoming voice and outgoing text, incoming text and outgoing voice, or incoming voice and outgoing video and text.

5. The system of claim 3, wherein the circuitry for providing one or more communication modality options for user interaction with the communication device for a communication comprises:
   circuitry for providing at least one communication modality option indicative of a user interaction communication modality for incoming voice communication.

6. The system of claim 3, wherein the circuitry for providing one or more communication modality options for user interaction with the communication device for a communication comprises:
   circuitry for providing at least one communication modality option indicative of a user interaction communication modality for outgoing communications.

7. The system of claim 3, wherein the circuitry for providing one or more communication modality options for user interaction with the communication device for a communication comprises:

circuitry for providing at least one communication modality option indicative of a local user interaction communication modality that depends, at least partially, on a remote user interaction communication modality associated with an incoming communication.

8. The system of claim 3, wherein the circuitry for providing one or more communication modality options for user interaction with the communication device for a communication comprises:
circuitry for providing at least one communication modality option, the at least one communication modality option indicative of a local communication modality for user input interaction.

9. The system of claim 3, wherein the circuitry for providing one or more communication modality options for user interaction with the communication device for a communication comprises:
circuitry for displaying at least one communication modality option indicative of a local user interaction communication modality setting that depends, at least partially, on an identification of a remote user that is to participate in the communication.

10. The system of claim 3, wherein the circuitry for providing one or more communication modality options for user interaction with the communication device for a communication comprises:
circuitry for providing at least one communication modality option indicative of a user interaction communication modality that depends, at least partially, on one or more environmental factors that are ascertainable by the communication device.

11. The system of claim 3, further comprising:
circuitry for implementing at least one selected communication modality option of the one or more communication modality options for the user interaction for the communication.

12. The system of claim 1, wherein the circuitry configured for providing at least one user interface feature, of a communication device, that is related to multi-modality communication that includes at least modality conversion comprises:
circuitry for implementing at least one physical component for the at least one user interface feature.

13. The system of claim 12, wherein the at least one physical component comprises at least one of:
at least one knob, at least one dial, at least one slider, at least one switch, one or more keys, one or more buttons, at least one trackball, at least one track wheel, at least one joystick, or at least one touch-sensitive surface.

14. The system of claim 1, wherein the at least one virtual component comprises at least one of:
at least one knob, at least one dial, at least one slider, at least one switch, one or more keys, one or more buttons, at least a portion of at least one menu, or at least one pop-up window.

15. The system of claim 1, wherein the at least one user interface feature includes at least a physical component that may be moved by a user; and wherein the circuitry configured for detecting manipulation comprises:
circuitry for detecting movement of the physical component of the at least one user interface feature.

16. The system of claim 1, wherein the at least one user interface feature includes at least a virtual component that may be activated by a user; and wherein the circuitry configured for detecting manipulation comprises:

circuitry for detecting activation of the virtual component of the at least one user interface feature.

17. The system of claim 1, wherein the circuitry configured for providing at least one user interface feature, of a communication device, that is related to multi-modality communication that includes at least modality conversion comprises:
circuitry for providing at least one user interface feature that is related to multi-modality communication that includes at least one conversion from voice data to text data.

18. The system of claim 1, wherein said circuitry for determining that a local user interaction communication modality for the incoming communication is to be at least partly via video if the identity of the remote user is determined to match that of the one or more particular persons comprises:
circuitry for providing a user interface feature that permits a user to enter a user interaction setting for determining that a local user interaction communication modality for the incoming communication is to be at least partly via video based at least in part on detection of the environmental factor based at least partly on input from one or more sensors and based at least in part on determining that the identity of the remote user is a match with one or more names in a contact list that are associated with a communication modality option that includes video.

19. The system of claim 1, wherein said circuitry for determining that a local user interaction communication modality for the incoming communication is to be at least partly via text if an identity of the remote user is determined not to match that of one or more particular persons comprises:
circuitry for providing a user interface feature that permits a user to enter an intimacy setting for at least partial conversion of voice data associated with the incoming communication to at least text data, wherein the at least partial conversion is to occur automatically, without further user intervention, based at least in part upon detection of an incoming voice communication, detection of the at least one environmental factor, and identification of the remote user; and
wherein said circuitry for determining that a local user interaction communication modality for the incoming communication is to be at least partly via video if the identity of the remote user is determined to match that of the one or more particular persons comprises:
circuitry for providing a user interface feature that permits a user to enter an intimacy setting for at least partial conversion of voice data associated with the incoming communication to at least video data, wherein the at least partial conversion is to occur automatically, without further user intervention, based at least in part upon detection of an incoming voice communication, detection of the at least one environmental factor, and identification of the remote user.

20. The system of claim 1, wherein said circuitry for providing at least one communication modality option indicative of a user interaction communication modality that depends, at least partially, on one or more temporal factors comprises:
circuitry for providing at least one communication modality option indicative of a user interaction communication modality that depends, at least partially, on at least one of a time of the day, a day of the week, or a conflicting event.

21. The system of claim 1, wherein said circuitry for providing at least one user interface feature configured to permit a user of the communication device to enter at least one user interaction setting for an incoming communication from a remote communication device when the incoming communication is indicative of a remote user interacting with the remote communication device at least partly via voice, the at least one user interface feature configured to permit the user to enter as the at least one user interaction setting a setting that, based on a detection of at least one environmental factor that is at least partly detectable by the communication device, selects between either a local user interaction communication modality for the incoming communication that is at least partly via text or a local user interaction communication modality for the incoming communication that is at least partly via video, comprises:

circuitry for providing at least one user interface feature configured to permit the user to enter as the at least one user interaction setting a setting that is at least partly dependent on a detection of at least one environmental factor that is at least partly detectable by the communication device and that includes at least one of (i) that the communication device is in a moving vehicle; or (ii) that there is a change in ambient lighting in a vicinity of the communication device.

22. A system comprising:
(A) circuitry for providing at least one user interface feature, associated with a communication device, that is related to multi-modality communication, including at least:
  (1) circuitry for providing at least one virtual component for the at least one user interface feature on at least one display;
  (2) circuitry for providing at least one communication modality option indicative of a user interaction communication modality that depends, at least partially, on one or more temporal factors;
  (3) circuitry for providing at least one user interface feature configured to permit a user of the communication device to enter at least one user interaction setting for an incoming communication from a remote communication device when the incoming communication is indicative of a remote user interacting with the remote communication device at least partly via voice, the at least one user interface feature configured to permit the user to enter as the at least one user interaction setting a setting that, based on a detection of at least one environmental factor that is at least partly detectable by the communication device, selects between either a local user interaction communication modality for the incoming communication that is at least partly via text or a local user interaction communication modality for the incoming communication that is at least partly via video including for at least:
    (i) circuitry for determining that a local user interaction communication modality for the incoming communication is to be at least partly via text if an identity of the remote user is determined not to match that of one or more particular persons, including at least:
      (a) circuitry configured for detecting manipulation of the at least one user interface feature of the communication device;
      (b) circuitry for establishing at least one user interaction setting, including at least establishing that the local user interaction communication modality for the incoming communication is to be at least partly via text, wherein the at least one user interaction setting represents at least one communication modality option for a local user with respect to a local device;
      (c) circuitry for presenting at a local communication device prospective converted text data, which text data is converted from voice data that is input by a local user; and
      (d) circuitry for providing an opportunity to approve transmission of the prospective converted text data prior to transmission to a remote communication device; or
    (ii) circuitry for determining that a local user interaction communication modality for the incoming communication is to be at least partly via video if the identity of the remote user is determined to match that of the one or more particular persons, including at least:
      (a) circuitry for providing a user interface feature that permits a user to enter a user interaction setting for determining that a local user interaction communication modality for the incoming communication is to be at least partly via video based at least in part on detection of the environmental factor based at least partly on input from one or more sensors and based at least in part on determining that the identity of the remote user is a match with one or more names in a contact list that are associated with a communication modality option that includes video;
(B) circuitry for detecting manipulation of the at least one user interface feature of the communication device; and
(C) circuitry for establishing at least one user interaction setting, including at least establishing that the local user interaction communication modality for the incoming communication is to be at least partly via video, wherein the at least one user interaction setting represents at least one communication modality option for a local user with respect to a local device.

23. A computer program product comprising:
at least one non-transitory computer-readable medium including at least:
(a) one or more instructions for providing at least one user interface feature, of a communication device, that is related to multi-modality communication that includes at least modality conversion, including at least:
  (1) one or more instructions for providing at least one virtual component for the at least one user interface feature on at least one display;
  (2) one or more instructions for providing at least one communication modality option indicative of a user interaction communication modality that depends, at least partially, on one or more temporal factors;
  (3) one or more instructions for providing at least one user interface feature configured to permit a user of the communication device to enter at least one user interaction setting for an incoming communication from a remote communication device when the incoming communication is indicative of a remote user interacting with the remote communication device at least partly via voice, the at least one user interface feature configured to permit the user to enter as the at least one user interaction setting a setting that, based on a detection of at least one environmental factor that is at least partly detectable by the communication device, selects between either a local user interaction communication modality for the incoming communication that is at least partly via text or a local user interaction communication modality for the incoming communication that is at least partly via video including at least:

(i) one or more instructions for determining that a local user interaction communication modality for the incoming communication is to be at least partly via text if an identity of the remote user is determined not to match that of one or more particular persons, including at least:
  (A) one or more instructions for providing a user interface feature that permits a user to enter a user interaction setting for at least partial conversion of voice data associated with the incoming communication to at least text data, wherein the at least partial conversion is to occur automatically, without further user intervention, based at least in part upon detection of an incoming voice communication, detection of the at least one environmental factor, and identification of the remote user;
  (B) one or more instructions configured for detecting manipulation of the at least one user interface feature of the communication device;
  (C) one or more instructions for establishing at least one user interaction setting, including at least establishing that the local user interaction communication modality for the incoming communication is to be at least partly via text, wherein the at least one user interaction setting represents at least one communication modality option for a local user with respect to a local device;
  (D) one or more instructions for presenting at a local communication device prospective converted text data, which text data is converted from voice data that is input by a local user; and
  (E) one or more instructions for providing an opportunity to approve transmission of the prospective converted text data prior to transmission to a remote communication device; or (ii) one or more instructions for determining that a local user interaction communication modality for the incoming communication is to be at least partly via video if the identity of the remote user is determined to match that of the one or more particular persons, including at least:
  (A) one or more instructions for providing a user interface feature that permits a user to enter a user interaction setting for at least partial conversion of voice data associated with the incoming communication to at least video data, wherein the at least partial conversion is to occur automatically, without further user intervention, based at least in part upon detection of an incoming voice communication, detection of the at least one environmental factor, and identification of the remote user;
  (B) one or more instructions for detecting manipulation of the at least one user interface feature of the communication device;
  (C) one or more instructions for establishing at least one user interaction setting, including at least establishing that the local user interaction communication modality for the incoming communication is to be at least partly via video, wherein the at least one user interaction setting represents at least one communication modality option for a local user with respect to a local device.

24. The computer program product of claim 23, wherein the multi-modality communication includes at least a communication in which two or more participants interact in at least one manner that is facilitated by the modality conversion with two or more communication devices via at least two communication modalities that differ from each other.

25. The computer program product of claim 23, wherein the one or more instructions for providing at least one user interface feature, of a communication device, that is related to multi-modality communication that includes at least modality conversion comprises:
  one or more instructions for providing one or more communication modality options for user interaction with the communication device for a communication, the one or more communication modality options including at least one of: textual communication, voice communication, or video communication.

26. The computer program product of claim 25, wherein the one or more instructions for providing one or more communication modality options for user interaction with the communication device for a communication comprises:
  one or more instructions for providing the one or more communication modality options for the user interaction with the communication device, the one or more communication modality options including at least one of: incoming voice and outgoing text, incoming text and outgoing voice, or incoming voice and outgoing video and text.

27. The computer program product of claim 25, wherein the one or more instructions for providing one or more communication modality options for user interaction with the communication device for a communication comprises:
  one or more instructions for providing at least one communication modality option indicative of a user interaction communication modality for incoming voice communication.

28. The computer program product of claim 25, wherein the one or more instructions for providing one or more communication modality options for user interaction with the communication device for a communication comprises:
  one or more instructions for providing at least one communication modality option indicative of a user interaction communication modality for outgoing communications.

29. The computer program product of claim 25, wherein the one or more instructions for providing one or more communication modality options for user interaction with the communication device for a communication comprises:
  one or more instructions for providing at least one communication modality option indicative of a local user interaction communication modality that depends, at least partially, on a remote user interaction communication modality associated with an incoming communication.

30. The computer program product of claim 25, wherein the one or more instructions for providing one or more communication modality options for user interaction with the communication device for a communication comprises:

one or more instructions for providing at least one communication modality option at least in part via a display interface of the communication device, the at least one communication modality option indicative of a local communication modality for user input interaction.

31. The computer program product of claim 30, wherein the one or more instructions for providing one or more communication modality options for user interaction with the communication device for a communication comprises:

one or more instructions for providing the at least one communication modality option at least in part via a display interface of the communication device, the at least one communication modality option indicative of a local communication modality for user output interaction.

32. The computer program product of claim 31, wherein the at least one communication modality option provided via the display interface of the communication device includes at least a communication modality option indicative of both the local communication modality for user input interaction and the local communication modality for user output interaction, with the local communication modality for user input interaction and the local communication modality for user output interaction including at least different communication modalities.

33. A method comprising:
  (a) providing, at least in part with one or more processing devices, at least one user interface feature of a communication device that is related to multi-modality communication that includes at least modality conversion, including at least:
    (1) providing at least one virtual component for the at least one user interface feature on at least one display
    (2) providing at least one communication modality option indicative of a user interaction communication modality that depends, at least partially, on one or more temporal factors;
    (3) providing at least one user interface feature configured to permit a user of the communication device to enter at least one user interaction setting for an incoming communication from a remote communication device when the incoming communication is indicative of a remote user interacting with the remote communication device at least partly via voice, the at least one user interface feature configured to permit the user to enter as the at least one user interaction setting a setting that, based on a detection of at least one environmental factor that is at least partly detectable by the communication device, selects between either a local user interaction communication modality for the incoming communication that is at least partly via text or a local user interaction communication modality for the incoming communication that is at least partly via video including at least:
      (i) determining that a local user interaction communication modality for the incoming communication is to be at least partly via text if an identity of the remote user is determined not to match that of one or more particular persons, including at least:
        (A) providing a user interface feature that permits a user to enter a user interaction setting for determining that a local user interaction communication modality for the incoming communication is to be at least partly via text based at least in part on detection of the environmental factor based on input from one or more sensors and based at least in part on determining that the identity of the remote user is determined not to match with one or more names in a contact list that are associated with a communication modality option that includes video;
        (B) detecting manipulation of the at least one user interface feature of the communication device;
        (C) establishing at least one user interaction setting, including at least establishing that the local user interaction communication modality for the incoming communication is to be at least partly via text, wherein the at least one user interaction setting represents at least one communication modality option for a local user with respect to a local device;
        (D) presenting at a local communication device prospective converted text data, which text data is converted from voice data that is input by a local user; and
        (E) providing an opportunity to approve transmission of the prospective converted text data prior to transmission to a remote communication device; or
      (ii) determining that a local user interaction communication modality for the incoming communication is to be at least partly via video if the identity of the remote user is determined to match that of the one or more particular persons, including at least:
        (A) detecting manipulation of the at least one user interface feature;
        (B) establishing at least one user interaction setting, including at least establishing that the local user interaction communication modality for the incoming communication is to be at least partly via video, wherein the at least one user interaction setting represents at least one degree of communicative exposure for a local user with respect to a local device.

* * * * *